United States Patent
Arasu et al.

(10) Patent No.: US 10,396,991 B2
(45) Date of Patent: Aug. 27, 2019

(54) CONTROLLING VERIFICATION OF KEY-VALUE STORES

(71) Applicant: Microsoft Technology Licensing, LLC, Redmond, WA (US)

(72) Inventors: Arvind Arasu, Redmond, WA (US); Kenneth Eguro, Seattle, WA (US); Raghav Kaushik, Kirkland, WA (US); Donald Kossmann, Kirkland, WA (US); Ravishankar Ramamurthy, Redmond, WA (US); Pingfan Meng, San Diego, CA (US); Vineet Pandey, San Diego, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 261 days.

(21) Appl. No.: 15/199,673

(22) Filed: Jun. 30, 2016

(65) Prior Publication Data

US 2018/0006820 A1    Jan. 4, 2018

(51) Int. Cl.
| | |
|---|---|
| *G06F 21/64* | (2013.01) |
| *G06F 21/78* | (2013.01) |
| *H04L 9/32* | (2006.01) |
| *G06F 16/00* | (2019.01) |

(52) U.S. Cl.
CPC ............ *H04L 9/3234* (2013.01); *G06F 16/00* (2019.01); *G06F 21/645* (2013.01); *G06F 21/78* (2013.01); *H04L 9/3236* (2013.01); *H04L 9/3242* (2013.01)

(58) Field of Classification Search
None
See application file for complete search history.

(56) References Cited

U.S. PATENT DOCUMENTS

| | | | |
|---|---|---|---|
| 8,706,701 B1 | 4/2014 | Stefanov et al. | |
| 2010/0088528 A1* | 4/2010 | Sion | G06F 21/64 713/193 |
| 2010/0185847 A1* | 7/2010 | Shasha | G06F 11/1004 713/150 |
| 2010/0212017 A1* | 8/2010 | Li | G06F 21/57 726/26 |

(Continued)

FOREIGN PATENT DOCUMENTS

WO    2008147400 A1    12/2008

OTHER PUBLICATIONS

"International Search Report and Written Opinion Issued in PCT Application No. PCT/US2017/039359", dated Sep. 20, 2017, 12 Pages.

(Continued)

*Primary Examiner* — Fatoumata Traore
(74) *Attorney, Agent, or Firm* — Rainier Patents, P.S.

(57) ABSTRACT

Deferred verification of the integrity of data operations over a set of data that is hosted at an untrusted module (UM) is controlled. The controlling includes generating a request for a data operation on the set of data. The request includes an authentication portion. The request is sent to the UM. A response to the request is received from the UM. The response includes cryptographic verification information attesting the integrity of the data operation with respect to prior data operations on the set of data. The response includes results from deferred verification at a trusted module (TM).

21 Claims, 30 Drawing Sheets

(56) References Cited

U.S. PATENT DOCUMENTS

| | | | |
|---|---|---|---|
| 2013/0019095 A1* | 1/2013 | Cohen | H04L 9/3263 713/164 |
| 2013/0159725 A1 | 6/2013 | Koo et al. | |
| 2013/0332745 A1 | 12/2013 | Woodall | |
| 2016/0048703 A1* | 2/2016 | Brandenburger | G06F 21/6218 726/26 |

OTHER PUBLICATIONS

Anati, et al., "Innovative Technology for CPU Based Attestation and Sealing", In Proceedings of the 2nd International Workshop on Hardware and Architectural Support for Security and Privacy, Jun. 23, 2013, pp. 1-7.

Arasu, et al., "Transaction Processing on Confidential Data using Cipherbase", In Proceedings of 31st International Conference on Data Engineering, Apr. 13, 2015, 15 pages.

Bajaj, et al., "CorrectDB: SQL Engine with Practical Query Authentication", In Proceedings of the VLDB Endowment, vol. 6, No. 7, May 2013, pp. 529-540.

Baumann, et al., "Shielding Applications from an Untrusted Cloud with Haven", In Proceedings of 11th USENIX Symposium on Operating Systems Design and Implementation, Oct. 6, 2014, pp. 267-283.

Blum, et al., "Checking the Correctness of Memories", In Journal of Algorithmica, vol. 12, Issue 2-3, Sep. 1994, pp. 90-99.

Cooper, et al., "Benchmarking Cloud Serving Systems with YCSB", In Proceedings of the 1st ACM Symposium on Cloud Computing, Jun. 10, 2010, 12 pages.

Devanbu, et al., "Authentic Data Publication over the Internet", In Journal of Computer Security, vol. 11, Issue 3, Mar. 2003, pp. 1-22.

Drimer, Saar, "Volatile FPGA Design Security—A Survey", In Proceedings of IEEE Computer Society Annual Volume, Apr. 2008, pp. 1-51.

Eguro, et al., "FPGAs for Trusted Cloud Computing", In Proceedings of 22nd International Conference on Field Programmable Logic and Applications, Aug. 29, 2013, 8 pages.

Goodrich, et al., "Super-Efficient Verification of Dynamic Outsourced Databases", In Proceedings of the Cryptopgraphers' Track at the RSA Conference on Topics in Cryptology, Apr. 8, 2008, pp. 1-17.

Jain, et al., "Trustworthy Data from Untrusted Databases", In Proceedings of IEEE 29th International Conference on Data Engineering, Apr. 8, 2013, 12 pages.

Katz, et al., "Introduction to Modern Cryptography", In Publication of Chapman and Hall/CRC, Aug. 31, 2007, 512 pages.

Levandoski, et al., "The BW-Tree: A B-tree for New Hardware Platforms", In Proceedings of IEEE 29th International Conference on Data Engineering, Apr. 8, 2013, 12 pages.

Levandoski, et al., "High Performance Transactions in Deuteronomy", In Proceedings of 7th Biennial Conference on Innovative Data Systems Research, Jan. 4, 2015, 12 pages.

Li, et al., "Dynamic Authenticated Index Structures for Outsourced Databases", In Proceedings of the ACM SIGMOD International Conference on Management of Data, Jun. 27, 2006, 12 pages.

Malviya, et al., "Rethinking main Memory OLTP Recovery", In Proceedings of IEEE 30th International Conference on Data Engineering, Mar. 31, 2014, pp. 604-615.

McKeen, et al., "Innovative Instructions and Software Model for Isolated Execution", In Proceedings of the 2nd International Workshop on Hardware and Architectural Support for Security and Privacy, Jun. 23, 2013, pp. 1-8.

Merkle, Ralph C., "A Digital Signature Based on a Conventional Encryption Function", In Proceedings of Conference on the Theory and Applications of Cryptographic Techniques, Aug. 16, 1987, pp. 369-378.

Mueller, et al., "Data Processing on FPGAS", In Proceedings of the VLDB Endowment, vol. 2, Issue 1, Aug. 24, 2009, 12 pages.

Mykletun, et al., "Authentication and Integrity in Outsourced Databases", In Journal of ACM Transactions on Storage, vol. 2, Issue 2, May 2006, pp. 1-32.

Pang, et al., "Verifying Completeness of Relational Query Results in Data Publishing", In Proceedings of the ACM SIGMOD international conference on Management of data, Jun. 14, 2005, 12 pages.

Pang, et al., "Authenticating Query Results in Edge Computing", In Proceedings of the 20th International Conference on Data Engineering, Mar. 30, 2004, 12 pages.

Parno, et al., "Memoir: Practical State Continuity for Protected Modules", In Proceedings of the IEEE Symposium on Security and Privacy, May 22, 2011, pp. 379-394.

Putnam, et al., "A Reconfigurable Fabric for Accelerating Large-Scale Datacenter Services", In Proceeding of the 41st Annual International Symposium on Computer Architecuture, Jun. 14, 2014, 12 pages.

Singh, et al., "Ensuring Correctness over Untrusted Private Database", In Proceedings of the 11th International Conference on Extending Database Technology: Advances in Database Technology, Mar. 25, 2008, pp. 476-486.

Song, et al., "The Advanced Encryption Standard-Cipher-Based Message Authentication Code-Pseudo-Random-Function-128 (AES-CMAC-PRF-128) for the Internet Key Exchange Protocol (IKE)", Published on: Aug. 2006, Available at: https://tools.ietf.org/pdf/rfc4615.pdf.

Yang, Hsin-Jung, "Efficient Trusted Cloud Storage Using Parallel, Pipelined Hardware", In Master Thesis of Massachusetts Institute of Technology, Jun. 2012, pp. 1-90.

Yang, et al., "Authenticated Storage Using Small Trusted Hardware", In Proceedings of ACM Cloud Computing Security Workshop, Nov. 8, 2013, 12 pages.

Costan, et al., "Security Challenges and Opportunities in Adaptive and Reconfigurable Hardware", In Proceedings of IEEE International Symposium on Hardware-Oriented Security and Trust, Jun. 5, 2011, 5 pages.

Du, et al., "PsFS : a High-Throughput Parallel File System for Secure Cloud Storage System", In Proceedings of International Conference on Measurement, Information and Control, May 18, 2012, pp. 327-331.

Lim, et al., "SILT: A Memory-Efficient, High-Performance Key-Value Store", In Proceedings of 23rd ACM Symposium on Operating Systems Principles, Oct. 23, 2011, pp. 1-13.

Stefanov, et al., "Iris: A Scalable Cloud File System with Efficient Integrity Checks", In Proceedings of 28th Annual Computer Security Applications Conference, Dec. 3, 2012, pp. 229-238.

Tang, et al., "Outsourcing Multi-Version Key-Value Stores with Verifiable Data Freshness", In Proceedings of IEEE 30th International Conference on Data Engineering, Mar. 31, 2014, 4 pages.

Paladi, et al., "State of the Art and Hot Aspects in Cloud Data Storage Security", In SICS Technical Report T2013:01, Mar. 3, 2013, 26 pages.

Shraer, et al., "Venus: Verification for Untrusted Cloud Storage", In Proceedings of 2nd ACM Cloud Computing Security Workshop, Oct. 8, 2010, 12 pages.

Ouaarab, et al., "Performance Optimizations of Integrity Checking based on Merkle Trees", In Proceedings of Fourth Workshop on Hardware and Architectural Support for Security and Privacy, Jun. 13, 2015, 4 pages.

* cited by examiner

500

| TM performs a delete |
|---|
| 1: procedure DELETETM ($o_{del}, k_{del}, MAC_{op}, VM_{KV}[a_1], VM_{KV}[a_2]$) |
| 2:  check: uniqueness of $o_{del}$ |
| 3:  check: $MAC_{op} = MAC_{SKey}(o_{del} \| D \| k_{del})$ |
| 4:  check: $VM_{KV}[a_1].key \leq k_{del} < VM_{KV}[a_1].nextkey$ |
| 5:  check: $VM_{KV}[a_2].nextkey = VM_{KV}[a_1].key$ |
| 6:  if $VM_{KV}[a_1].key = k_{del}$ then |
| 7:    $VM_{KV}[a_2].nextkey \leftarrow VM_{KV}[a_1].nextkey$ |
| 8:    $VM_{KV}[a_1] \leftarrow \langle -, -, - \rangle$ |
| 9:    $MAC_{res} \leftarrow MAC_{SKey}(o_{del} \| succ)$ |
| 10:  else |
| 11:    $MAC_{res} \leftarrow MAC_{SKey}(o_{del} \| fail)$ |
| 12:  end if |
| 13:  send to UM $MAC_{res}, VM_{KV}[a_1], VM_{KV}[a_2]$ |
| 14: end procedure |

| Read and Write for a memory operation that reads in $VM[a] = \langle p, t \rangle$ and writes back $\langle p', t' \rangle$. Here $e$ (epoch) and $T$ (timestamp counter) are TM internal state variables. |
|---|
| 1: procedure READ $(a, p, t)$ |
| 2:  check: $t < T$ |
| 3:  $h_{rs}[e] \leftarrow h_{rs}[e] \oplus RF(a, p, t)$   ▷ $\mathcal{RS} \leftarrow \mathcal{RS} \cup \{\langle a, p, t \rangle\}$ |
| 4: end procedure |
| 5: procedure WRITE $(a, p')$ |
| 6:  $t' \leftarrow T$ |
| 7:  $T \leftarrow T + 1$ |
| 8:  $h_{ws}[e] \leftarrow h_{ws}[e] \oplus RF(a, p', t')$   ▷ $\mathcal{WS} \leftarrow \mathcal{WS} \cup \{\langle a, p', t' \rangle\}$ |
| 9:  $VM[a] \leftarrow \langle p_{new}, t_{new} \rangle$ |
| 10: end procedure |

FIG. 6

Epoch Transition from $e$ to $e + 1$

702 — 1: procedure BEGINTRANSITION
2:     $h_{rs}[e+1] \leftarrow 0$      ▷ $\mathcal{RS}[e+1] \leftarrow \phi$
3:     $h_{ws}[e+1] \leftarrow 0$      ▷ $\mathcal{WS}[e+1] \leftarrow \phi$
4: end procedure
5: procedure TRANSITIONCELL $(a, p, t)$
6:     check: $t < T$
704 — 7:     $h_{rs}[e] \leftarrow h_{rs}[e] \oplus RF(a, p, t)$
                               ▷ $\mathcal{RS}[e] \leftarrow \mathcal{RS}[e] \cup \{\langle a, p, t \rangle\}$
8:     $h_{ws}[e+1] \leftarrow h_{ws}[e+1] \oplus RF(a, p, 0)$
                               ▷ $\mathcal{WS}[e+1] \leftarrow \mathcal{WS}[e+1] \cup \{\langle a, p, 0 \rangle\}$
9:     $VM[a] \leftarrow \langle p, 0 \rangle$
10: end procedure
11: procedure ENDTRANSITIONANDVERIFY
706 — 12:     check: $h_{ws}[e] = h_{rs}[e]$
13:     $e \leftarrow e + 1$
14:     $T \leftarrow 1$
15: end procedure

CONTROLLING VERIFICATION OF KEY-VALUE STORES

BACKGROUND

Users of electronic devices frequently need to access data storage systems (e.g., key-value stores) to obtain various types of information and/or perform various operations. Many different techniques have been devised for controlling storage and retrieval of data items in data storage systems. Integrity of data operations is an ongoing concern, as owners of data may be unaware of tampering of their data stores or the functionality of operations on their data.

SUMMARY

According to one general aspect, a system for controlling verification of integrity of data operations may include at least one hardware device processor, and a memory storing a client secure key value, and storing executable instructions that, when executed, cause one or more of the at least one hardware device processor to control deferred verification of the integrity of data operations over a set of data that is hosted at an untrusted module (UM). The controlling includes generating a request for at least one data operation on the set of data, the request including an authentication portion. A response to the request is received from the UM. The response includes cryptographic verification information attesting the integrity of the at least one data operation with respect to prior data operations on the set of data, the response including results from deferred verification at a trusted module (TM).

According to another aspect, verification of the integrity of data operations over a set of data that is hosted at an untrusted module (UM) is controlled by receiving, at a trusted module (TM), a first message indicating a request from a client that shares a cryptographic key with the TM, the request for at least one data operation on the set of data, the request including an authentication portion from the client. A second message indicating a response to the received request is sent, the response including cryptographic verification information attesting the integrity of the at least one data operation with respect to prior data operations on the set of data.

According to another aspect, a system at least one server that includes at least one hardware device processor, and an untrusted module (UM) that includes a memory storing a set of data, and storing executable instructions that, when executed, cause one or more of the at least one hardware device processor to receive, from a client, a request for at least one data operation on the set of data, the request including an authentication portion. A response to the request is received from a trusted module (TM), the response including cryptographic verification information attesting the integrity of the at least one data operation with respect to prior data operations on the set of data. The TM includes a cryptographic key that is shared with the client. The received response to the request is forwarded to the client.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

BRIEF DESCRIPTION OF THE DRAWINGS

FIG. 5 illustrates example pseudocode for an example TM delete operation.

FIG. 6 illustrates example pseudocode for an example read and write for a memory operation.

FIG. 7 illustrates example pseudocode for an example epoch transition.

DETAILED DESCRIPTION

I. Introduction

Figure 1:
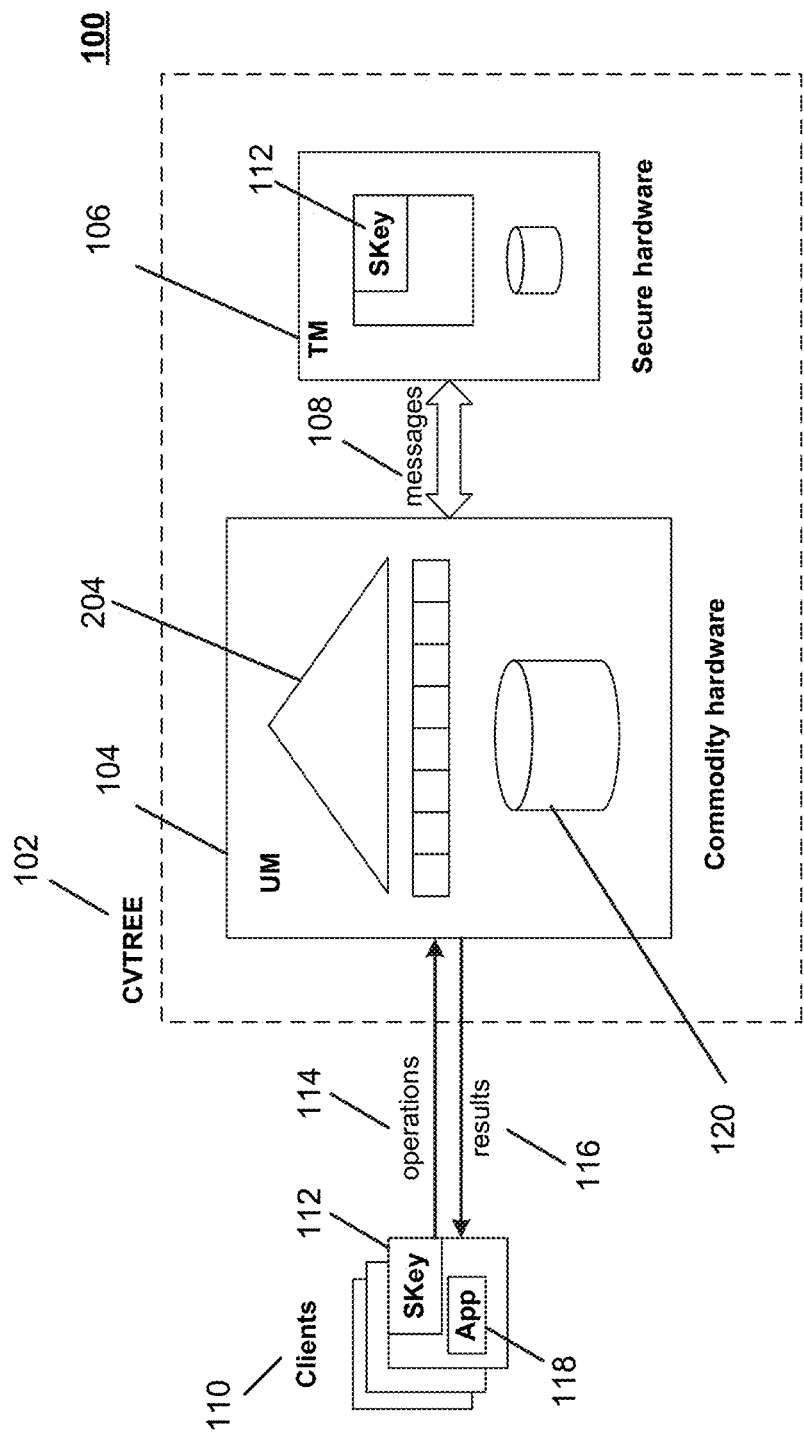
FIG. 1 is a block diagram of an example architecture for controlling security of data in an example data storage system.

Recent developments in hardware platforms have exploited various processors, and various storage devices, in efforts to provide higher performance (e.g., speed, efficiency) and more secure processing of confidential data. Integrity of data operations is an ongoing concern, as owners of data may be unaware of tampering of their data stores or the functionality of operations on their data.

Example techniques discussed herein may provide a key-value store that provides strong integrity guarantees, while advantageously maintaining high performance competitive with current systems that may not provide such guarantees. As used herein, "integrity guarantees" refer to guarantees such that that any tampering of the key-value store (e.g., database) or its functionality may be provably detected. Example techniques discussed herein may be highly parallel to handle concurrent operations efficiently and may use a small trusted computing base (e.g., a secure, trusted computing base).

Example techniques discussed herein may provide a design of untrusted-trusted functionality to minimize the trusted functionality footprint (e.g., trusted computing base).

Example techniques discussed herein may provide optimizations for implementing the untrusted functionality.

Further, example techniques discussed herein may provide optimizations for implementing the trusted functionality.

Further, example techniques discussed herein may provide parallelization of the trusted functionality.

Example techniques discussed herein may include techniques for implementation of the trusted functionality on a Field-programmable gate array (FPGA).

An example goal of designing tamper-proof database systems is to ensure, using cryptographic techniques, that unauthorized and potentially malicious users cannot change the state of a database. Conventional approaches may employ MERKLE trees; however, this technique may involve performance, at best, on the order of hundreds of operations per second. Example techniques discussed herein, may provide tamper-proof systems that can handle millions of operations per second. Such example approaches may be based on FPGA secure co-processors and a protocol that periodically verifies the integrity of the database. Such example approaches may be highly parallelizable to handle concurrent requests. Such example approaches may further advantageously involve a small, verifiable trusted code base so that bugs may be less likely to compromise the security of the system.

Integrity is an example of a security guarantee that many cloud providers may desire to provide to their customers. As discussed herein, a system that implements integrity detects if an unauthorized user makes changes to the state of a service, such as a file system, database system, or key-value store. For example, integrity safeguards may detect if an attacker who has acquired root access on a machine that runs such a service changes the salary of an employee in an HR (human resources) database. For example, integrity may also provide help against "replay attacks" in which an unauthorized user attempts to roll back the state of a service, thereby removing the effects of recent changes such as an electronic payment.

Conventional techniques for implementing integrity may rely on cryptographic hashing and MERKLE trees. For example, a cryptographic hash of the system state (data values) may be stored at a secure location, which may typically be the client. The collision-free property of the hash implies that any unauthorized change to the data also changes its hash and may thus be detected by comparing a newly computed hash with the hash stored in the secure location. MERKLE trees are an example technique to make such cryptographic hashing incrementally updatable and locally verifiable; thus, it is not necessary to scan the entire database to update or verify hashes. This approach may provide integrity guarantees against substantially powerful attackers, such as system administrators and database administrators who have root access to the service and the machines that run the service. In a cloud scenario, this means the cloud provider is untrusted for the purposes of integrity verification. Assumptions underlying this approach include the collision-free property of hashing and the security of the location storing the hash.

However, the MERKLE-tree-based approach may provide challenges in efforts to implement the approach in a performant way. For example, a recent implementation based on MERKLE trees (see, e.g., Jain et al., "Trustworthy Data from Untrusted Databases," In *Proceedings of the 29th IEEE International Conference on Data Engineering (ICDE)*, 2013, pages 529-540) reports a throughput of a few hundred key-value operations per second. This performance may be insufficient for many cloud services, so in practice integrity may only be implemented for a few high-security applications. One potential performance concern of the MERKLE-tree-based approach is that read and write operations may involve logarithmic overhead to navigate and update the nodes of the MERKLE tree. Another potential concern is that MERKLE trees may limit concurrency because every operation (including reads) may need to update the root of the MERKLE tree. As a result, the root node may become a hot spot and all operations may need to be serialized in order to update the root of the MERKLE tree in the correct order. This serialization may limit parallelism and, by extension, potential throughput. Further, the conventional approach of using the client as the secure location to store the hashes may introduce performance overheads due to network latency.

Figure 12:
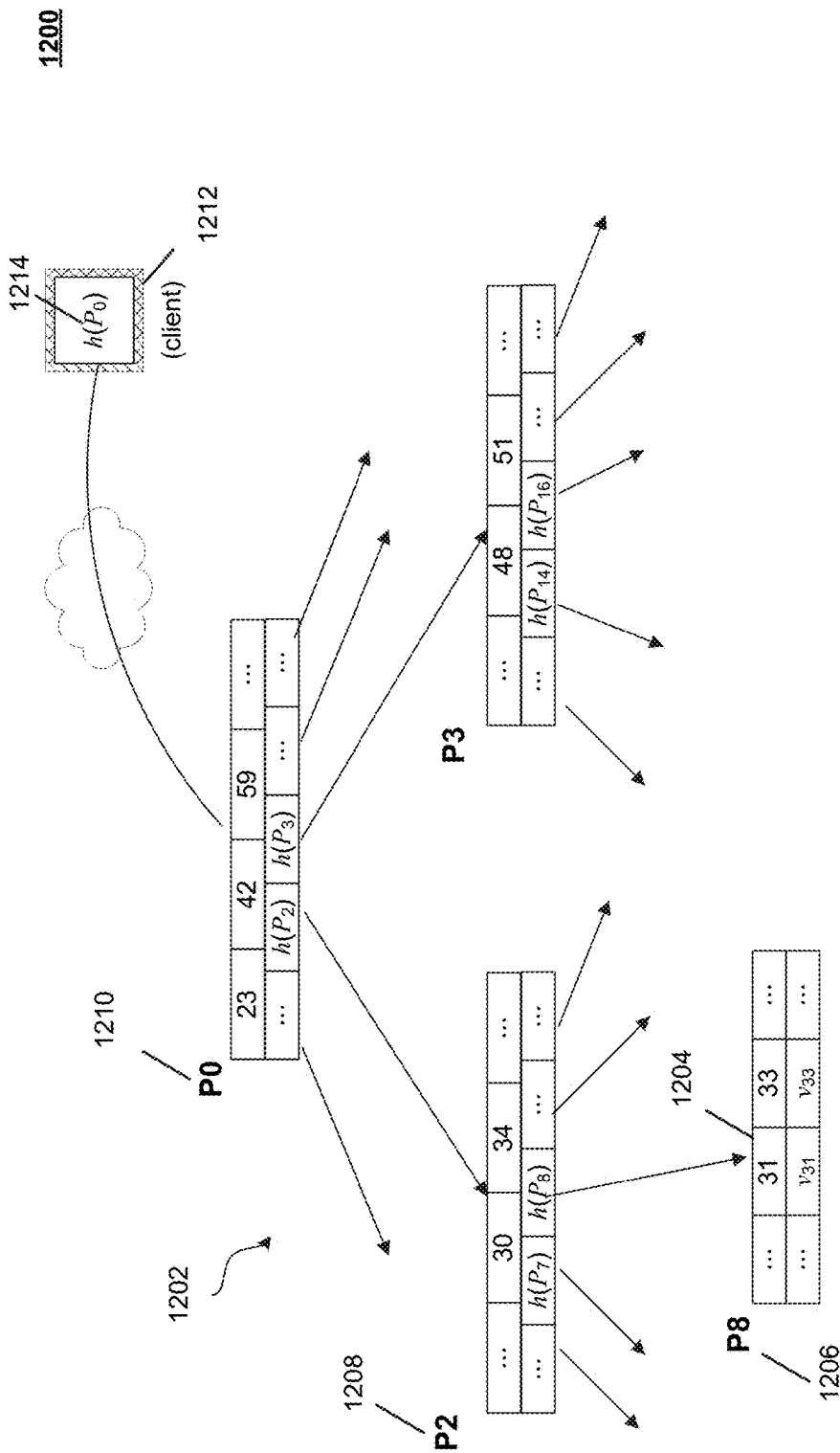
FIG. 12 illustrates an example MERKLE tree implementation.

There has been substantial work on providing integrity guarantees over outsourced databases (see, e.g., Jain et al., supra; Devanbu et al., "Authentic Data Publication over the Internet," *Journal of Computer Security*, 11(3), 2003, pp. 291-314; Li et al., "Dynamic Authenticated Index Structures for Outsourced Databases," *Proceedings of the ACM SIGMOD International Conference on Management of Data*, 2006, pages 121-132; Singh et al., "Ensuring Correctness over Untrusted Private Database," *Proceedings of the 11th International Conference on Extending Database Technology* (EDBT), 2008, pages 476-486). Much of the work relies on MERKLE tree (MHT) (see, e.g., R. C. Merkle, "A Digital Signature Based on a Conventional Encryption Function," *Proceedings of the 1987 Conference on the Theory and Applications of Cryptographic Techniques* (CRYPTO), 1987, pages 369-378) variants and stores the hash of the MERKLE tree at the client. As shown in FIG. 12, MERKLE trees can be used to generate proofs of correctness and completeness of data stored in the outsourced database. FIG. 12 shows one representative MHT variant; Li et al., supra, provides a survey of other example variants. FIG. 12 illustrates a B-Tree based MHT 1202. As shown in FIG. 12, the proof for a key 31 (1204) is the path that includes nodes P8, P2, and P0 (1206, 1208, 1210). A client 1212 who has a cryptographic hash 1214 of P0 1210 is able to verify that key 31 (1204) is present in the database. The same proof also shows that key 32 is not present.

In much of this work, MERKLE tree is constructed directly over data, meaning that the leaf nodes of the tree comprise records in the database. This approach may not be update friendly: any changes to the database may induce (non-commutative) structural changes to the MERKLE tree, which may involve exclusive access to the root, which may limit concurrency. Accordingly, much of the conventional work focuses in a data publishing setting and assumes infrequent changes. An exception is the work by Jain et al., supra, which presents an example protocol for ensuring transactional integrity of updates from multiple clients. That example protocol works by having a special client (data owner) keep track of MHT root hash changes over transactions. For a key-value workload they report numbers in the range of hundreds of transactions per second. However, their solution is general.

An exception to the trend of using the client to store MHT hashes is discussed by Bajaj et al., "CorrectDB: SQL Engine with Practical Query Authentication," *Proc. of the VLDB Endowment,* 6(7), 2013, pp. 529-540, which discusses using server colocated secure hardware; however their work focuses on analytical, not transactional workloads. For example, Goodrich et al. ("Super-efficient Verification of Dynamic Outsourced Databases," *Proceedings of the* 2008 *Cryptographers' Track at the RSA Conference* (CTRSA), 2008, pages 407-424) present algorithmic ideas over MHTs resulting in sub-logarithmic verification.

Some work on database integrity relies on public-key cryptography and digital signatures (see, e.g., Pang et al., "Authenticating Query Results in Edge Computing," *Proceedings of the* 20*th IEEE International Conference on Data Engineering* (ICDE), 2004, pages 560-571; Pang et al., "Verifying Completeness of Relational Query Results in Data Publishing," *Proceedings of the ACM SIGMOD International Conference on Management of Data,* 2005, pages 407-418; Mykletun et al., "Authentication and Integrity in Outsourced Databases," *ACM Transactions on Storage* (TOS), Vol. 2, Issue 2, 2006, pp. 107-138). However, the performance of these systems may be less advantageous than those using MERKLE trees since they rely on substantially slower public-key cryptography. Pang et al., "Verifying Completeness of Relational Query Results in Data Publishing," supra, presents an example notion of signatures on pairs of adjacent keys.

Using example techniques discussed herein, it may be possible, at least, to implement integrity and sustain throughput of millions of operations per second. One example design and implementation of a high-performance, highly scalable key-value store may be referred to herein as a CVTREE, although the discussion herein is not intended to be limited to this one example implementation. Although example results are demonstrated herein in the context of a key-value store, one skilled in the art will appreciate that the example techniques discussed herein may also be applied more broadly, for example in file systems and more general database systems.

An example implementation of integrity in CVTREE is different from conventional techniques in at least two ways. First, CVTREE may use secure (e.g., cloud-based) hardware to store secrets and perform computations on those secrets. Specifically, CVTREE may use secure (e.g., cloud-based) FPGAs (see, e.g., Eguro et al., "FPGAs for Trusted Cloud Computing," *International Conference on Field-Programmable Logic, Reconfigurable Computing, and Applications,* 2012, pp. 63-70), where every server has an integrated FPGA, allowing integrity checks to be performed within the server without incurring network latency. For example, the FPGAs may be designed in such a way that not even the cloud provider who offers the CVTREE service can tamper with the FPGAs or violate integrity without users detecting this violation.

Second, CVTREE may be based on a deferred verification model. Rather than verifying the integrity with every read or write operation (which is the model typically implemented with MERKLE trees), CVTREE may, for example, adapt an algorithm by Blum et al. (see, e.g., Blum et al., "Checking the Correctness of Memories," *Algorithmica,* Vol. 12, Issue 2-3, 1994, pp. 225-244). For example, the integrity of the entire key-value store may be periodically verified. When a violation is detected, the application may roll back the key value store to the last verified state. As a result, an example CVTREE implementation may be subject to a performance/usability tradeoff: the lower the frequency of verifications, the higher performance, but the more work lost in the event of an integrity breach.

Example techniques discussed herein may integrate integrity verification into a substantially high-performance key-value store. For example, such an adaptation may include techniques for application to the specific model of a key-value store and to achieve advantageous performance by making use of techniques such as batching. One example advantageous benefit of this approach is that it may incur constant overhead per read and write operation (e.g., in contrast with logarithmic overhead for approaches based on MERKLE trees).

Example techniques discussed herein may achieve substantially unlimited concurrency and parallelism. Conventional approaches to implement integrity (including MERKLE-tree based approaches and the approach discussed in Blum et al. (see, e.g., Blum et al., id) involve executing substantially all operations in a serial order. In contrast, the CVTREE principles were designed to enable concurrent operation and maximize parallelism opportunities. In contrast, in testing of example techniques discussed herein, the performance of the system has scaled well to at least 18 cores, and potentially well beyond.

Example techniques discussed herein may leverage FPGAs in order to maintain and compute secrets which may be advantageous to solutions of the integrity problem.

The end-to-end functionality of CVTREE is discussed below. An example CVTREE implementation may provide key-value store functionality. An example data model is a key-value pair with keys drawn from an ordered domain and values (which are uninterpreted) drawn from an arbitrary domain. Example supported operations include inserting a new key-value pair, looking up or updating the value associated with an existing key, and deleting a stored key-value pair. With modifications, an example CVTREE may be extended to support other common key-value store operations such as upserts.

These four operations can be invoked concurrently by authorized clients and CVTREE may ensure that the effect of concurrent operations is substantially equivalent to some serial execution of the operations. CVTREE may also support range lookups but the result of range lookups may not be guaranteed to be serialized with respect to other operations. Further, the result of any committed operation—an operation whose result has been communicated back to the client—may be guaranteed to be durable. These example semantics for the operations are for the case of untampered processing. Example guarantees and semantics when there is adversarial tampering is discussed below.

In examples discussed herein, CVTREE may be architected so that most of its processing and data storage occurs in an untrusted environment (e.g., a commodity cloud infrastructure). Even if this example infrastructure is compromised, CVTREE may guarantee that any adversarial attempts to tamper with data or processing is provably detected. An example implementation of CVTREE relies on a small trusted module (TM) running on secure hardware; the TM along with the secure hardware forms the example trusted computing base (TCB) of CVTREE, and, for this example, these are the only components that a client needs to trust for correct key-value store functionality.

To formalize the protection provided by the example CVTREE while relying on secure hardware, an example malicious adversary, MALLORY, is introduced. As discussed herein, MALLORY may have administrative privileges to the system running CVTREE, except for the secure hardware. They can alter CVTREE processing in the untrusted system, modify memory and disk contents and any external and internal communications (including those to the secure hardware). They cannot observe or arbitrarily change processing within the secure hardware or its internal data; however, they can reset the secure hardware which causes the trusted module running within to revert to its initial state.

For example, CVTREE may provide functional integrity against MALLORY. As discussed herein, such "functional integrity" means that MALLORY cannot induce errors without being detected and flagged. If no anomalous behavior is detected, then the results of any set of (possibly concurrent) committed operations on CVTREE may be substantially identical to the results obtained for some serial execution of these operations on a correct, uncompromised key-value store. It may be noted that functional integrity may imply data integrity since data tampering would lead to incorrect results for some subsequent operation. For this example, the durability guarantee of CVTREE is valid only when there is not tampering by MALLORY—which can delete the entire contents of the database. Further, the integrity guarantees may be slightly different for range scan; the records returned by a range may be guaranteed to be valid in some contiguous window of time.

The functional integrity guarantees of CVTREE may be provided by a posteriori verification, where (informally) the TM may verify that no errors were introduced by MALLORY before attesting the result of an operation (e.g., the client does not trust the result of an operation without a TM attestation). Distinguishing between online and deferred verification: in the online case, the verification of the validity of an operation occurs before the operation is committed and its result sent to the client, while in the deferred case, the verification occurs outside the context of a particular client operation, e.g., once every five minutes. In this case, for example, MALLORY could engage in tampering for the duration of five minutes before being detected.

The discussion herein presents slight variants of CVTREE for both deferred and online verification. As an example, the weaker guarantees of deferred verification can be exploited for more advantageous performance and code simplicity.

While a focus of the discussion herein involves functional integrity, and much of the discussion and evaluation involves plaintext data, CVTREE is capable of handling encrypted data. For example, the values stored in CVTREE may be uninterpreted blobs, so a client could store encrypted values instead of plaintext ones. Four example basic key-value store operations (insert, lookup, delete, and update) may involve only equality operations on keys; thus, an example CVTREE as discussed herein may support deterministically encrypted keys.

An example implementation of CVTREE may not provide guarantees related to progress of an operation. In particular, MALLORY may arbitrarily slow down an operation or induce it to abort. MALLORY may also affect the serialization order of operations.

In an example implementation, as shown in FIG. 1, a CVTREE server 102 may include an untrusted module (UM) 104 that runs on a cloud server, and a trusted module (TM) 106 that runs on secure hardware. For example, the TM 106 and UM 104 may be conceptually two processes that exchange messages 108 to implement the server functionality. An example design goal may include keeping the TM 106 functionality simple: a small TM 106 may offer security advantages, allow formal verification, and place fewer constraints on the choice of secure hardware (see, e.g., Arasu et al., "Transaction Processing on Confidential Data using Cipherbase," In *Proceedings of the 31st IEEE International Conference on Data Engineering* (ICDE), 2015).

An example CVTREE server 102 may interact with one or more clients 110 which use the operations discussed above to generate and query key-value data. For example, the server 102 may authenticate legitimate clients 110 using standard Public Key Infrastructure mechanisms. Since the TM 106 is trusted by client 110, they may verify the integrity of the TM 106 functionality. These details may be specific to the secure hardware; e.g., on INTEL SGX, CPU-based attestation (see, e.g., Anati et al., "Innovative Technology for CPU Based Attestation and Sealing," In *Proceedings of the 2nd Workshop on Hardware and Architectural Support for Security and Privacy* (HASP), 2013) can be used for this purpose.

In the following, for simplicity it is assumed that legitimate clients 110 and the TM 106 share a secret symmetric key SKey 112 that remains valid for the lifetime of the (key-value) database. In practice, it may be desirable to use short-lived session keys, and example techniques discussed herein are adaptable to handle this setting.

Table 1, as shown below, summarizes an example protocol that may be used by a client 110 to send key-value operations 114 and by the server 102 to send back (i.e., return) results 116. As shown in FIG. 1, an application 118 hosted at the client 110 may send the key-value operations 114 to the server 102 and receive the results 116 from the server 102.

TABLE 1

| Operation | Client Sends | Server Responds |
|---|---|---|
| Lookup | ⟨oid, L, key⟩<br>$MAC_{SKey}$ (oid ∥ L ∥ key) | ⟨oid, roid, val⟩<br>$MAC_{SKey}$ (oid ∥ roid)<br>$MAC_{SKey}$ (roid ∥ val) |
| Update | ⟨oid, U, key, val⟩<br>$MAC_{SKey}$ (oid ∥ U ∥ key)<br>$MAC_{SKey}$ (oid ∥ val) | ⟨oid, succ⟩<br>$MAC_{SKey}$ (oid ∥ succ) |
| Insert | ⟨oid, I, key, val⟩<br>$MAC_{SKey}$ (oid ∥ I ∥ key)<br>$MAC_{SKey}$ (oid ∥ val) | ⟨oid, succ⟩<br>$MAC_{SKey}$ (oid ∥ succ) |
| Delete | ⟨oid, D, key⟩<br>$MAC_{SKey}$ (oid ∥ D ∥ key) | ⟨oid, succ⟩<br>$MAC_{SKey}$ (oid ∥ succ) |

Parameters and results shown in Table 1 are integrity protected by Message Authentication Codes (MACs) generated using SKey 112. As used herein, a Message Authentication Code (MAC) (see, e.g., Katz et al., *Introduction to Modern Cryptography*, Chapman and Hall/CRC Press, 2007) refers to a keyed cryptographic checksum for a message that can be used to protect its integrity. Only parties with access to the secret key can generate and verify MACs generated using that key; further, any changes to the message change its MAC and so can be detected with substantial probability. Thus, only clients 110 and the TM 106 who have access to SKey 112 can generate such MACs. In particular, the client 110 may take the server generated MAC for a query result with attestation by the TM 106 that the result 116 is valid.

Table 1 illustrates an example client-CVTREE protocol for operations that succeed. As shown in Table 1, oid is a unique operation id (identifier), L, I, U, D denote identifiers for operations, and succ encodes a successful operation. The server 102 responds with (oid, fail), $MAC_{SKey}$(oid‖succ) for a failed operation.

Two details of the example protocol are noted: first, each operation is associated with an operation id (oid) that is unique across all clients 110. For example, the uniqueness may be checked by the TM 106 to prevent any replay attacks by MALLORY, which may simply resubmit a previous legitimate client operation. Second, an insert/update operation with operation id $o_v$ generating a new value v, sends a separate $MAC_{SKey}$ ($o_v$‖v) protecting the value. This may simplify value processing in the server 102 where $o_v$ may be used as an identifier for value v, as discussed further below. If the server 102 needs to return value v for a subsequent lookup operation with operation id $o_l$, it responds with ⟨$o_l$, $o_v$, v⟩, $MAC_{SKey}$ ($o_l$‖$o_v$), and $MAC_{SKey}$ ($o_v$‖v); the second MAC is simply the one sent previously by the client 110 that generated operation $o_v$.

An example implementation of a CVTREE server 102 may rely on an abstraction of verified memory. For example, an instance of verified memory may be a collection of addressed memory locations referred to herein as verified cells (vcells), physically stored in UM memory 120, that only allows TM 106 authorized modifications. Any modifications not initiated by the TM 106 (such as those by MALLORY) are detected by the TM 106 and flagged as an integrity violation. Operations on verified memory may occur through message passing 108: the UM 104 sends the address and contents of a vcell to the TM 106, which responds with any changes.

An example of verified memory implementation is discussed further below. When the UM 104 sends a vcell to the TM 106, a "lower" layer in the UM 104 adds proof that the cell was not tampered; a corresponding layer within the TM 106 checks the proof and forwards the vcell to a "higher" TM 106 layer for further processing. A discussion follows below on how example key-value store functionality may be implemented in an example CVTREE implementation, assuming the verified memory abstraction.

Figure 2:
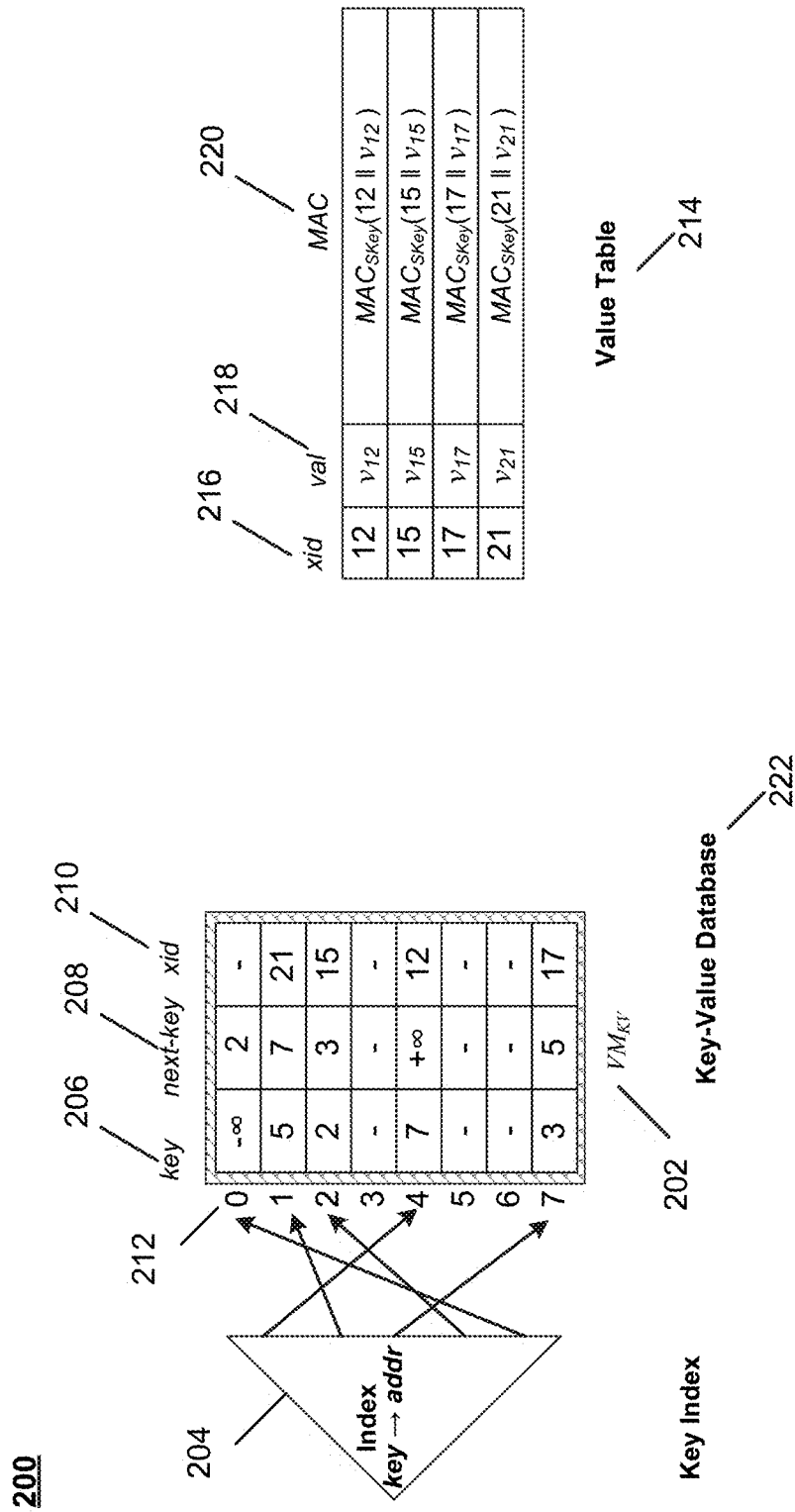
FIG. 2 is a block diagram of an example untrusted module (UM) key-value database using an example index.

An instance of verified memory, $VM_{KV}$, may be used to store the key-value database. For this discussion, $(k_1, v_1)$, . . . , $(k_n, v_n)$ denote the current key-value pairs in the database and $o_1, \ldots, o_n$ denote, respectively, the ids of operations that last updated these keys. Furthermore, and without loss of generality, assume $k_0 \triangleq -\infty < k_1 < \ldots < k_n < k_{n+1} \triangleq +\infty$, where $-\infty$ and $+\infty$ denote the minimum and maximum values, respectively, of the key domain (i.e., the values that the key may assume). For example, triples of the form ⟨$k_i$, $k_{i+1}$, $o_i$⟩ are stored in (n+1) arbitrary locations of $VM_{KV}$. All other locations of $VM_{KV}$ may store a special value ⟨-, -, -⟩ indicating an empty cell. This relationship between $VM_{KV}$ and the current key-value database may be referred to herein as the state invariant. FIG. 2 illustrates one possible example $VM_{KV}$ state for a database of four key-value pairs. FIG. 2 shows an example UM 104 state for a key-value database 222 with verified memory $VM_{KV}$ 202: ⟨2, $v_{15}$⟩, ⟨3, $v_{17}$⟩, ⟨5, $v_{21}$⟩, and ⟨7, $v_{12}$⟩ inserted by operations 15, 17, 21, and 12, respectively. As shown, the database 222 utilizes a key index 204. Each entry in the verified memory $VM_{KV}$ 202 includes a key value 206, a next-key value 208, and an xid value 210. Further, each entry in the verified memory $VM_{KV}$ 202 may be located by an address value 212.

In the following discussion, $VM_{KV}$[a] denotes the vcell at address a (212), and $VM_{KV}$[a].key, $VM_{KV}$[a].nextkey, and $VM_{KV}$[a].oid denote the three fields (206, 208, 210) of this cell. In FIG. 2, $VM_{KV}$[4].key=7.

The cell $VM_{KV}$[a]=⟨$k_i$, $k_{i+1}$, $o_i$⟩ is viewed as being associated with the half-open interval [$k_i$, $k_{i+1}$). From the $VM_{KV}$ state invariant, it follows that the set of intervals associated with nonempty cells partition the key domain. This observation may be used to define the "proof" cell of a key k as the unique cell $VM_{KV}$[a]=⟨$k_i$, $k_{i+1}$, $o_i$⟩ such that $k_i \leq k < k_{i+1}$; it is noted that the proof cell of k is sufficient to establish whether or not the key k is currently in the database. In FIG. 2, the proof cell of key 4 is $VM_{KV}$[7]=(3, 5, 17) (which establishes that key 4 does not exist in the database).

As shown in FIG. 2, the UM 104 also stores a value table 214 of all ⟨$o_i$, $v_i$, $MAC_{SKey}$ ($o_i$‖$v_i$)⟩ triples, indexed by $o_i$, mapping operation ids $o_i$ (216) to values $v_i$ (218) and value MACs (220), $MAC_{SKey}$ ($o_i$‖$v_i$); the latter is the value MAC sent by the client 110 that originated operation $o_i$ as discussed above.

An example implementation of the four key-value operations is discussed below.

Figure 3:
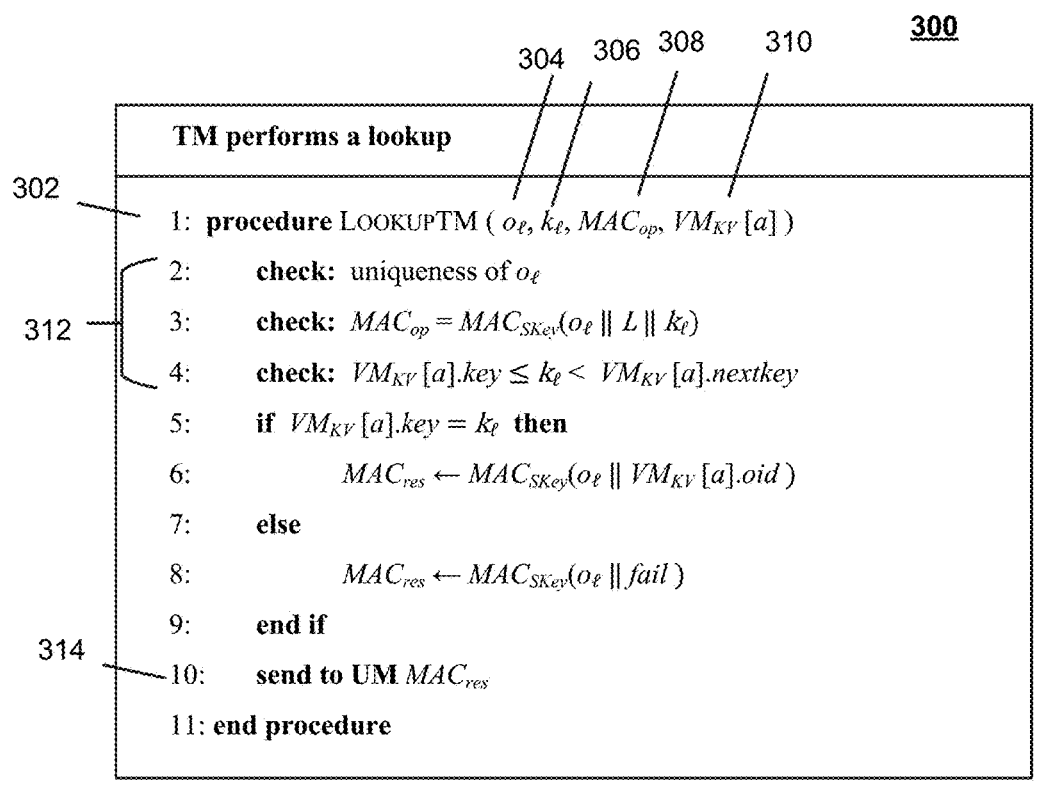
FIG. 3 illustrates example pseudocode for an example trusted module (TM) lookup operation.

FIG. 3 illustrates example pseudocode 300 for an example trusted module (TM) lookup operation. For a lookup operation 302 with key $k_l$ (304) and operation id $o_l$ (306), the UM 104 sends the TM 106 the parameters $k_l$ (304), $o_l$ (306), the operation MAC (308), and the proof cell $VM_{KV}$[a] (310) for $k_l$, the operation MAC (308) is the MAC sent by the client 110 protecting the integrity of $o_l$ and $k_l$ as discussed above. The TM 106 steps for the lookup operation are shown in FIG. 3. The TM 106 checks (312) the integrity of the lookup operation using the operation MAC (308) and checks that $VM_{KV}$[a] (310) is the correct proof cell for $k_l$ (306); the second check may be performed since MALLORY can induce the UM 104 to send an invalid proof cell. Assuming these checks pass, the TM 106 infers that the lookup succeeds if $VM_{KV}$[a].key=$k_l$ and fails, otherwise. Assume the lookup succeeds with $VM_{KV}$[a]=⟨$k_i$, $k_{i+1}$, $o_i$⟩ with $k_i$=$k_l$. The TM 106 sends $MAC_{SKey}$($o_l$‖$o_i$) back to the UM 104. To complete the lookup, the UM 104 looks up from the value table 214, the value $v_i$ (218) associated with $k_i$ and the value MAC (220), $MAC_{SKey}$ ($o_i$‖$v_i$) and sends the client 110 the result tuple ⟨$o_l$, $o_i$, $v_i$⟩ along with $MAC_{SKey}$ ($o_l$‖$o_i$) and $MAC_{SKey}$ ($o_i$‖$v_i$). The result is sent (314) to the client 110 via the UM 104.

Figure 4:
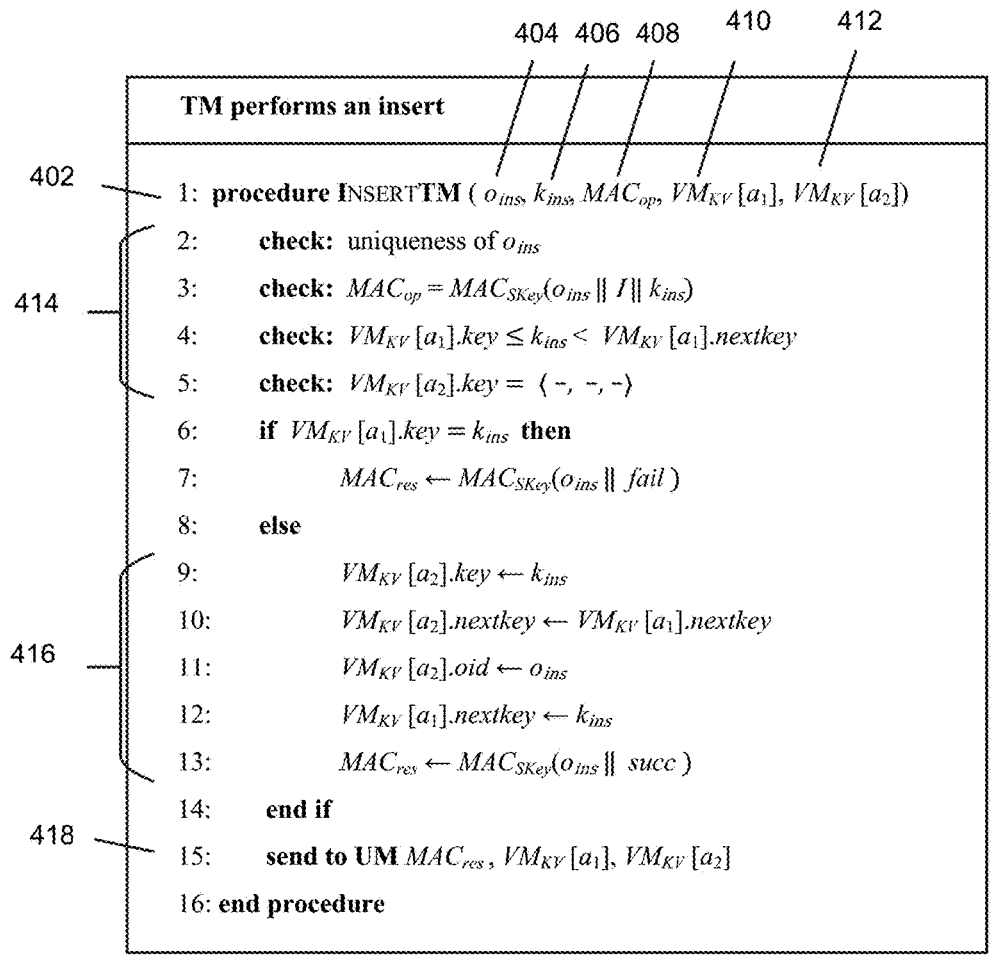
FIG. 4 illustrates example pseudocode for an example TM insert operation.

FIG. 4 illustrates example pseudocode 400 for an example TM insert operation. For an example insertion 402 of the pair ⟨$k_{ins}$, $v_{ins}$⟩ with transaction id $o_{ins}$, the UM 104 sends the TM 106 the parameters $o_{ins}$ (404) and $k_{ins}$ (406), the operation MAC (408), the proof cell $TM_{KV}$[$a_1$] (410) of $k_{ins}$, and an empty cell $TM_{KV}$[$a_2$] (412). The TM 106 checks the integrity of the insertion parameters using the provided MAC, checks (414) that $VM_{KV}$[$a_1$] is the correct proof cell of $k_{ins}$, and checks that $TM_{KV}$[$a_2$] is an empty cell. Assuming $TM_{KV}$[$a_1$]=⟨$k_i$, $k_{i+1}$, $o_i$⟩, the insertion succeeds if $k_i < k_{ins} < k_{i+1}$. In this case, the TM 106 updates (416) $TM_{KV}$[$a_1$] ← ⟨$k_i$, $k_{ins}$, $o_i$⟩ and $TM_{KV}$[$a_2$]←⟨$k_{ins}$, $k_{i+1}$, $o_i$⟩. It may be noted that this update maintains the $VM_{KV}$ state invariant. If $k_i$=$k_{ins}$, then $k_{ins}$ is a duplicate of an existing key $k_i$, and the insertion fails without any state changes. The TM 106 sends (418) the UM 104 the updated cells and the MAC attesting the success or failure of the operation, which is forwarded to the client 110 by the UM 104. If the insertion succeeds, the UM 104 also adds the new entry ⟨$o_{ins}$,$v_{ins}$, $MAC_{SKey}$($o_{ins}$‖$v_{ins}$)⟩ to the value table 214.

FIG. 5 illustrates example pseudocode 500 for an example TM delete operation 502. For an example implementation for deleting the key $k_{del}$ (504) with transaction id $o_{del}$ (504), the UM 104 sends $MAC_{op}$ (508), and the proof cell $VM_{KV}$[$a_1$] (510) of $k_{del}$ and its preceding cell, the cell $VM_{KV}$[$a_2$]

(512) with the property $VM_{KV}[a_2].nextkey=VM_{KV}[a_1].key$. The TM 106 checks (514) the validity of the parameters and the cells $VM_{KV}[a_1]$ and $VM_{KV}[a_2]$. Assume $VM_{KV}[a_1]=\langle k_i, k_{i+1}, o_i \rangle$ and $VM_{KV}[a_2]=\langle k_{i-1}, k_{i+1}, o_i \rangle$. If $k_{del}=k_i$, the deletion succeeds and TM 106 updates (516) $VM_{KV}[a_2]\leftarrow \langle k_{i-1}, k_{i+1}, o_{i-1} \rangle$ and $VM_{KV}[a_1]\leftarrow \langle -, -, - \rangle$ to reflect the deletion; otherwise, $VM_{KV}$ remains unchanged (518). In either case, the TM 106 sends (520) the updated cells and the MAC attesting the result of the operation, which is forwarded to the client 110 by the UM 104.

An example implementation of an update operation may be similar to the implementation of other operations. For all the four operations, the TM 106 may also check the uniqueness of the operation id, i.e., the operation id has not been previously seen. An efficient implementation of this check (e.g., that does not require the TM 106 to store all operation ids) may depend on how clients generate unique operation ids. For example, a hash function over sets discussed below may be used for this purpose.

In an example implementation, MALLORY cannot affect the integrity of key-value store operations. MALLORY may not introduce operations of its own since it may not generate MACs for the operations; it may not replay an earlier operation since the TM 106 checks for uniqueness of operation ids. Therefore, the TM 106 may evaluate only legitimate client operations. The current state of the key-value database 202 is completely encoded in the cells of $VM_{KV}$ with transaction ids used as a "proxy" for values. By construction, MALLORY may not alter $VM_{KV}$ and all changes to $VM_{KV}$ occur securely within the TM 106. Finally, once the TM 106 has determined the result of an operation, MALLORY may not alter the result due to the TM-generated MAC protecting the result.

An example UM 104 step in all the operations includes identifying the proof cell $VM_{KV}[a]=\langle k_i, k_{i+1}, o_i \rangle$ with the property that $k_i \leq k_{op} < k_{i+1}$ for a client specified key $k_{op}$. To efficiently implement this step, the UM 104 may maintain a key-value index 204 mapping keys to $VM_{KV}$ addresses: for each nonempty $VM_{KV}[a]=\langle k_i, k_{i+1}, o_i \rangle$, the index 204 stores the pair $\langle k_i, a \rangle$. This index 204 does not involve any integrity protection: if MALLORY tampers with the index 204, the UM 104 will pick a wrong proof cell which will be detected by the TM 106 (e.g., Step 4 in FIG. 3).

Example techniques that may be used in CVTREE to implement verified memory using deferred verification are discussed below. It may be convenient to view operations on verified memory as TM reads and writes—each vcell access is either a read or a read followed by write—noting that the UM 104 picks the vcells that TM 106 reads/writes. Therefore, a goal of the TM 106 may be to verify that each read sees the contents of the last TM 106 write to the same location. As used herein, the term "payload" may refer to the actual contents stored in a vcell; e.g., as used in the discussion above, the payload may be a triple $\langle k_i, k_{i+1}, o_i \rangle$.

In deferred verification, the verification step may be decoupled from normal memory operations. To implement deferred verification, memory may be viewed as existing in an epoch, and operations may be performed within that epoch. Periodically, as specified by an external configuration, memory may be transitioned to the next epoch and a verification step may be run at the TM 106 that checks that the memory behaved correctly during the previous epoch. For presentation simplicity, it may be initially assumed that normal memory operations are suspended during epoch transitions (an example non-quiescent implementation is discussed further below).

Each vcell is associated with a timestamp that denotes when the vcell was last accessed by the TM in the current epoch; here, "time" refers to the position of access and may be implemented using a simple counter within the TM. In this section, a vcell is denoted as the pair $VM[a]=\langle p, t \rangle$, where p denotes the payload, and t, the timestamp. For an operation over VM[a], the UM sends the pair $\langle p, t \rangle$ and the TM may respond with a new timestamp t' and (optionally) a new payload p' if the operation is a read-write. An example characteristic of deferred verification is that a new timestamp may be generated even for reads, with implications for logging for recovery discussed further below. The timestamp and the payload of a vcell may be both stored in UM memory, so MALLORY can modify them. It may be desirable to ensure that integrity breaches are detected even if MALLORY does modify these values in the UM.

To help explain verification, it may be useful to imagine the TM 106 as maintaining a read-set, $\mathcal{RS}$, and a write-set, $\mathcal{WS}$, of timestamped vcell contents. Elements of these sets are triples of the form $\langle a, p, t \rangle$; when part of $\mathcal{RS}$, the element $\langle a, p, t \rangle$ indicates that the TM 106 saw the vcell $VM[a]=\langle p, t \rangle$ for a read operation; when part of $\mathcal{WS}$, the element $\langle a, p, t \rangle$ indicates that TM 106 wrote back $VM[a]=\langle p, t \rangle$ as output of an operation. Under correct memory behavior, the TM 106 reads back what it wrote, so verification involves checking $\mathcal{RS}=\mathcal{WS}$. To reduce TM 106 space requirements, a hash function, h, defined over sets of $\langle addr, payload, timestamp \rangle$ triples may be used. The hash function is (1) collision-free, meaning different sets hash to different values with substantial probability; and (2) incrementally updateable, meaning $h(S \cap \{\langle a, p, t \rangle\})$ can be computed from h(S) and $\langle a, p, t \rangle$. The TM 106 maintains $h(\mathcal{RS})$ and $h(\mathcal{WS})$ and verification now involves checking the equality of these two hash values.

The TM 106 steps for deferred verification are presented in FIGS. 6-7. The maintenance of "imagined" sets $\mathcal{RS}$ and $\mathcal{WS}$ that are used herein for discussing verification correctness are shown within comments (denoted by "▷"). The TM 106 internally maintains the current epoch (e), the timestamp counter (T), and hashes of $\mathcal{RS}$ ($h_{rs}$) and $\mathcal{WS}$ ($h_{ws}$); the hashes are indexed by epoch to indicate which epoch they correspond to. Epoch transitions are performed by calling a TRANSITIONCELL procedure on each vcell. Let N denote the size of the verified memory. After transitioning from e-1 to e, $\mathcal{RS}=\emptyset$ and $\mathcal{WS}$ contains N elements, one for each vcell, which are all initialized with timestamp 0 (Steps 8-9).

FIG. 6 illustrates example pseudocode 600 for an example read and write for a memory operation. As indicated in FIG. 6, the pseudocode 600 illustrates an example Read and Write for a memory operation that reads in VM $[a]=\langle p, t \rangle$ and writes back $\langle p', t' \rangle$. As indicated in FIG. 6, e (epoch) and T (timestamp counter) are TM internal state variables.

For example, consider an operation over VM $[a]=\langle p, t \rangle$. The TM 106 may first invoke a function (602) READ (a, p, t) which adds $\langle a, p, t \rangle$ to $\mathcal{RS}$ (604) before passing the vcell to higher layers. Assume the higher layer functionality updates the payload to p'. The TM 106 invokes a WRITE (a, p') method (606), which determines (608) the new timestamp t' and writes back (610) VM $[a]\leftarrow\langle p', t' \rangle$. This procedure also updates $\mathcal{WS}$ with $\langle a, p', t \rangle$. Under correct memory behavior, the element $\langle a, p, t \rangle$ would have been added to WS when VM [a] was accessed previously; therefore, the invariant that $\mathcal{RS}$ is a subset of $\mathcal{WS}$ with exactly N fewer elements, corresponding to the latest timestamps of each vcell, holds after each operation.

FIG. 7 illustrates example pseudocode 700 for an example epoch transition 702. When transitioning from epoch e to e+1, the TM 106 reads each vcell VM [a]=⟨p, t⟩ and adds (704) an element ⟨a, p, t⟩ to $\mathcal{RS}$, which makes $\mathcal{RS}=\mathcal{WS}$ at the end of the transition. MALLORY can change the payload or timestamp of a vcell when it is read into TM 106, and it may be proven that any such tampering results in $\mathcal{RS} \neq \mathcal{WS}$. Therefore, at the end of the epoch transition, the TM 106 checks $h_{rs}=h_{ws}$ (706) to verify that the memory behaved correctly in epoch e.

TABLE 2

| Operation | Δ $\mathcal{WS}$ | Δ $\mathcal{RS}$ | T |
|---|---|---|---|
| Epoch Transition in | ⟨0, $p_0$, 0⟩ | | 1 |
| | ⟨1, $p_1$, 0⟩ | | |
| r1 | ⟨1, $p_1$, 1⟩ | ⟨1, $p_1$, 0⟩ | 2 |
| w0($p'_0$) | ⟨0, $p'_0$, 2⟩ | ⟨0, $p_0$, 0⟩ | 3 |
| r1 | ⟨1, $p_1$, 3⟩ | ⟨1, $p_1$, 1⟩ | 4 |
| r0 | ⟨0, $p'_0$, 4⟩ | ⟨0, $p'_0$, 2⟩ | 5 |
| Epoch Transition out | | ⟨0, $p'_0$, 4⟩ | 1 |
| | | ⟨1, $p_1$, 3⟩ | |

Table 2 illustrates example changes to $\mathcal{RS}$ and $\mathcal{WS}$ during an epoch of deferred memory of size 2 with 4 operations. In Table 2, r1 indicates a read over vcell 1 that leaves the payload unchanged and w0($p'_0$) is a write that changes the payload of vcell 0 to $p'_0$.

Let RF denote a random function that maps ⟨addr, payload, timestamp⟩ to $\{0, 1\}^m$. An example hash function $h(S) \triangleq \bigoplus_{\langle a,p,t \rangle \in S} RF(a, p, t)$ may be implemented such that the hash of a set is simply the xor (exclusive-OR) of the image of its elements under RF. The hash function his incrementally updateable since $h(S \cap \{\langle a, p, t \rangle\}) = h(S) \oplus RF(a, p, t)$ and is collision-free:

LEMMA 1. If S≠S', $h(S) \neq h(S')$ with probability $(1-\frac{1}{2}^m)$ where the probability is taken over the choice of RF.

One subtlety is that $\mathcal{RS}$ could be a multiset with duplicate elements if MALLORY tampers with the memory; $\mathcal{WS}$ may be guaranteed to be duplicate-free due to distinct timestamps. A slight generalization of Lemma 1 can be used to show that $h(\mathcal{RS}) \neq h(\mathcal{WS})$ for any $\mathcal{RS} \neq \mathcal{WS}$ produced by the example deferred verification scheme. An example implementation may use an AES-based psuedo-random function (PRF) (see, e.g., Song et al., "The Advanced Encryption Standard-Cipher-based Message Authentication Code-Pseudo-Random Function-128 (AES-CMAC-PRF-128) Algorithm for the Internet Key Exchange Protocol (IKE)", 2006, RFC 4615) instead of RF with a key derived from SKey and e. Assuming MALLORY cannot distinguish the PRF from RF, it may be shown that any incorrect memory behavior would cause the verification to fail.

In an example non-quiescent implementation, a background UM 104 thread may continuously sweep the memory transitioning each vcell from the current epoch to the next; normal operations may occur concurrently in other threads. At any given point, some vcells would have transitioned to the next epoch (e+1) and the rest remain in epoch e. The TM 106 may maintain two read- and write-sets corresponding to the two active epochs: operations on vcell transitioned to e+1 update $\mathcal{RS}$[e+1] and $\mathcal{WS}$[e+1] and the operations on the rest update $\mathcal{RS}$[e] and $\mathcal{WS}$[e]. The TM 106 may also track using internal state what fraction of the epoch transitioning sweep has completed to help verify the epoch of each vcell.

This example technique may incur 2 PRF computations per operation and 2·N (separate) PRF computations for each epoch transition, where N is the size of the memory. If epochs are sufficiently long with Ω(N) operations, the overall amortized cost per operation may be O(1) PRF computations, which may compare advantageously to logarithmic (hashing) costs of MERKLE tree based approaches.

Conventional use of hashed read- and write-sets for offline verification is discussed, for example, in Blum et al., supra. However, in contrast, example techniques discussed herein may employ an example systems adaption to realize continuous, deferred verification. Such example techniques discussed herein may involve non-quiescent operation, concurrency, and recovery (discussed further below), which may be advantageous, at least, for performance and correctness. Another example difference relates to the hash function: an example conventional hash function may use a complex construction with the goal of minimizing the number of random bits used for its construction. In contrast, example techniques discussed herein may instead rely on conjectured hardness of standard crypto primitives (PRFs (pseudo-random functions)): an example hash function discussed herein may be simple and may ultimately rely on a widely available and optimized AES (Advanced Encryption Standard) block cipher (see, e.g., Song et al., supra).

Conventional UM-TM configurations may involve a non-trivial communication latency between the UM 104 and TM 106. For example, if an FPGA is used to implement TM 106 functionality, any communication may incur, at least, the latency of an external device access over a PCIe (Peripheral Component Interconnect Express) bus. Similar latency may arise in on-chip realizations of the TM 106 such as using INTEL SGX (see, e.g., Baumann et al., "Shielding Applications from an Untrusted Cloud with Haven," In *Proceedings of the 11th USENIX Symposium on Operating Systems Design and Implementation* (OSDI), 2014, pages 267-283).

An example implementation of CVTREE may amortize this latency across several transactions using batching. As used herein, a "batch" refers to a unit of communication between UM 104 and TM 106 and may comprise a sequence of operations (e.g., transactions) along with the vcells associated with those operations. For example, the TM 106 may process all the operations in a batch and respond with the result of all operations. The response includes the result MACs of the operations. For this example implementation, the TM 106 does not explicitly send the updated contents of the vcells. The UM 104 may "predict" how the TM 106 would update a vcell and may apply the update itself. It may be noted that the TM 106 timestamp counter, although internal to the TM 106, increases deterministically by 1 for every vcell write, so UM 104 may be able to predict the updated timestamps.

The fact that the UM 104 can itself compute UM-authorized updates to vcells enables decoupling of UM 104 and TM 106 processing. The UM 104 can queue-up any number of "future" batches to be processed by the TM 106 without waiting for the TM 106 to return the current batch.

Batching may also enable an example optimization that may reduce TM 106 verification work: When multiple operations within a batch touch the same vcell, the UM 104 sends only a single version of the vcell with the initial state prior to applying any of the operations in the batch; the TM 106 computes the final state after applying all the operations that touch the vcell. Only the initial version contributes to the read-set hash and the final version contributes to the write-set hash. Without batching, each intermediate version may contribute to read- and write-set hashes. This optimization may not affect integrity since the intermediate versions of the vcell exist within the TM 106 and are shielded from MALLORY.

Figure 8:
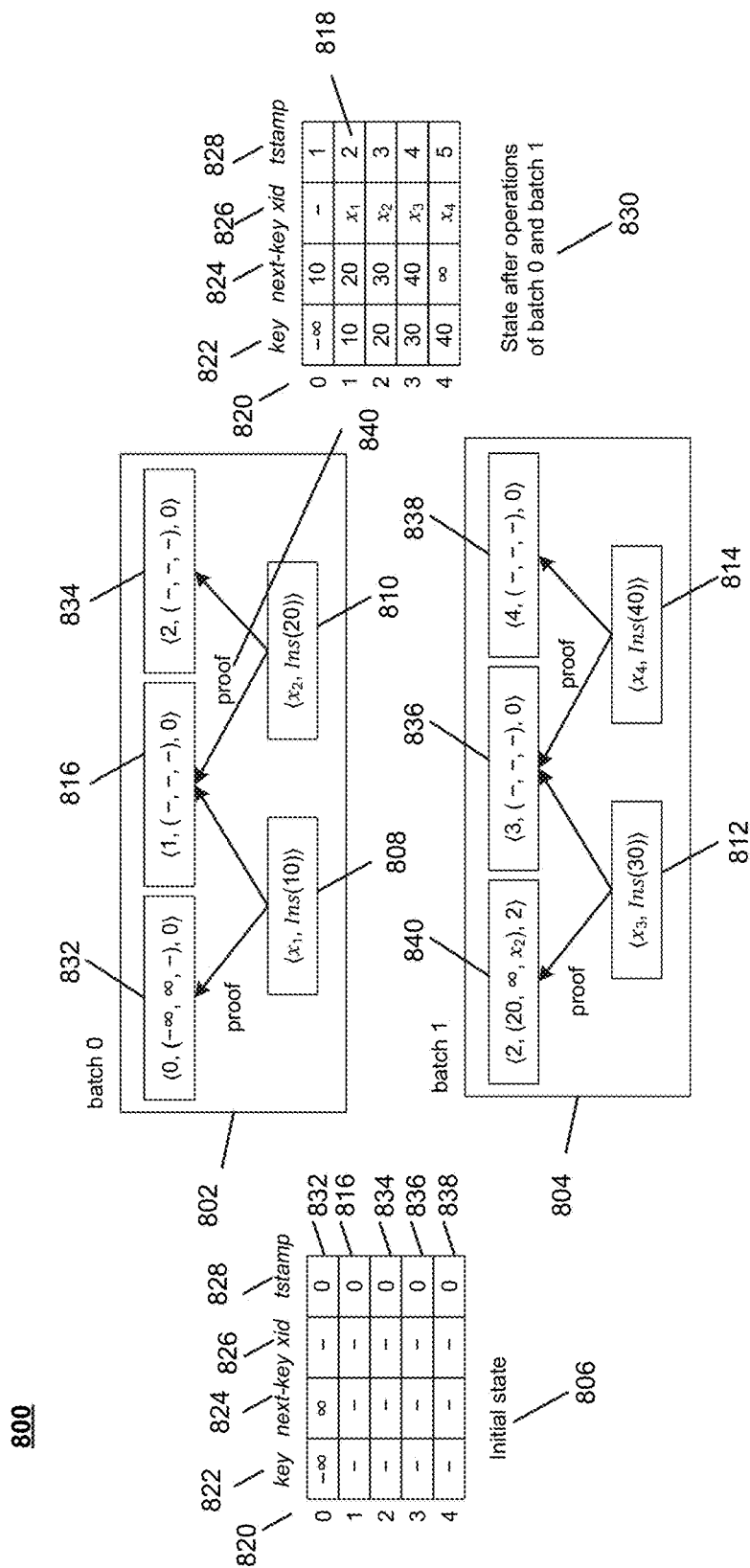
FIG. 8 is a block diagram of example batches generated by an example UM for TM processing.

FIG. 8 is a block diagram 800 of example batches 802, 804 generated by an example UM 104 for TM 106 processing. Further, FIG. 8 illustrates batching optimizations. In an initial state 806, CVTREE (e.g., UM 104) receives four insert operations 808, 810, 812, 814 with keys 10, 20, 30, 40, respectively, and these operations are sent to the TM 106 in the two batches 802, 804 (e.g., generated by the UM 104): the first two inserts 808, 810 in batch 0 (802) and the second two (812, 814) in batch 1 (804). The UM 104 may predict and update the state of the verified memory for the changes caused by the insert 808 (and thus create and send the insert 810 to the TM 106) before receiving the actual response from the TM 106.

Within batch 0 (802), the VM[1] is touched by both inserts 10 and 20 (808, 810). The first insert 808 logically changes the payload of VM[1] to (10, ∞, $o_1$); this version is the proof cell (see, e.g., proof 840) for the second insert operation 810 with key 20, which changes the payload to (10, 20, $o_1$). As part of batch 0 (802), the UM 104 sends only the initial state 816 of VM[1]:⟨1, (−, −, −), 0⟩. Within TM 106 this version is used to update the read-set hash. Only the final version ⟨1, (10, 20, $o_1$), 2⟩ is used to update the write-set hash. The UM 104 can predict that the final timestamp at the end of batch 0 for VM[1] is 2 (818), and can update its state of verified memory without requiring the TM 106 to send the timestamp.

As shown in FIG. 8, initial states 806 and states 830 after operations of the batches 802, 804, may include values for address 820, key 822, next-key 824, xid 826 (e.g., $x_1, x_2, \ldots, x_i$), and timestamp 828. As shown in FIG. 8, initial states 806 may include example states 816, 832, 834, 836, 838. As shown in FIG. 8, batch 1 (804) may include a state 840 that indicates an updated state 834 after processing the insert 810 of batch 0 (802).

For example, in processing the operation 808 (to insert 10 into $x_1$, the initial state 816 of $x_1$, (i.e., ⟨1, (−, −, −), 0⟩) is updated to have a key value of 10. In processing the operation 810, the next-key value for $x_1$ is updated to 20 (at address 1, for updated state 816), while the initial state 834 of $x_2$, (i.e., ⟨2, (−, −, −), 0⟩) is updated to have a key value of 20 (at address 2, for updated state 834).

The example UM 104 implementation discussed herein is multi-threaded and except for short-term vcell granularity spinlocks, is lock-free, meaning that all shared state is accessed and updated using atomic operations.

Each key-value operation may be processed (mostly) by a single UM 104 thread. The core of this processing may involve identifying the proof-vcell for the key of the operation. As discussed above, this is the unique vcell ⟨$k_i, k_{i+1}, o_1$⟩ with the property $k_i \le k < k_{i+1}$, where k is the key specified by the operation. To efficiently implement this step, in one example implementation, CVTREE may use a conventional key-value store to index the vcell addresses of the current database keys. For example, an implementation may use BW-TREE (see, e.g., Levandoski et al., "The Bw-Tree: A B-tree for new hardware platforms.," *Proceedings of the 29th IEEE International Conference on Data Engineering* (ICDE), 2013, pages 302-313), an example lock-free main-memory key value store that may exploit modern hardware including multiple CPU cores. Experimental results have suggested that most of the computational work in CVTREE (considering the work within TM 106 as well) is in traversing this index structure. For example, this may imply that future advances in indexing technology may be advantageously directly plugged into CVTREE for improved performance.

Once the thread identifies the proof-vcell, it locks the vcell, copies the contents of the vcell onto a batch bound for the TM 106, and updates the contents before unlocking the vcell. For example, each vcell may have an associated lock and the lock may be held for a substantially short duration (e.g., 10s of hardware instructions). For example, an implementation may be based on a spinlock.

It may be noted that the multi-threaded UM 104 implementation does not affect integrity discussions herein. For example, these may rely only on the TM 106 view of things which remains unchanged. Interestingly, the TM 106 view of things may fix the serialization order of the key-value operations, which is the order of operations that the TM 106 sees.

In accordance with example techniques discussed herein, there are many ways that a CVTREE TM may be implemented. For example, the CVTREE TM may be implemented on an FPGA. As another example, a C++ dynamic link library (DLL) intended to run on a platform such as INTEL SGX (see, e.g., McKeen et al., "Innovative instructions and software model for isolated execution," *Proceedings of the 2nd Workshop on Hardware and Architectural Support for Security and Privacy* (HASP), 2013) may be used. For example, a highly optimized FPGA TM implementation, which is able to perform verification at close to the line rate at which data may be transferred to the FPGA, may be used. An example FPGA implementation is discussed below.

As discussed herein, with batching, the TM 106 functionality may involve for each batch: (1) updating read-set hashes for all (or substantially all) vcells, (2) checking the MACs of operations to verify their integrity, (3) updating the contents of input vcells based on the operations, and (4) updating the write-hashes using the updated vcells, and (5) generating as output the MACs for the result to protect the integrity of the results sent to the client 110. For example, a PRF that may be used for set-hashes is AES-CMAC-PRF128 (see, e.g., Song et al., "The Advanced Encryption Standard-Cipher-based Message Authentication Code-Pseudo-Random Function-128 (AES-CMAC-PRF-128) Algorithm for the Internet Key Exchange Protocol (IKE)", 2006, RFC 4615); so the functionality for updating set-hashes and generating MACs may be the same.

An example central module used to implement AES-CMAC is an AES block computation, which involves multiple rounds of nearly similar computations. For example, these rounds may be unrolled to realize a fully pipelined implementation of each AES block computation. Assuming no data stalls, one instance of this implementation may achieve a throughput of one AES block computation per FPGA clock cycle.

Figure 9:
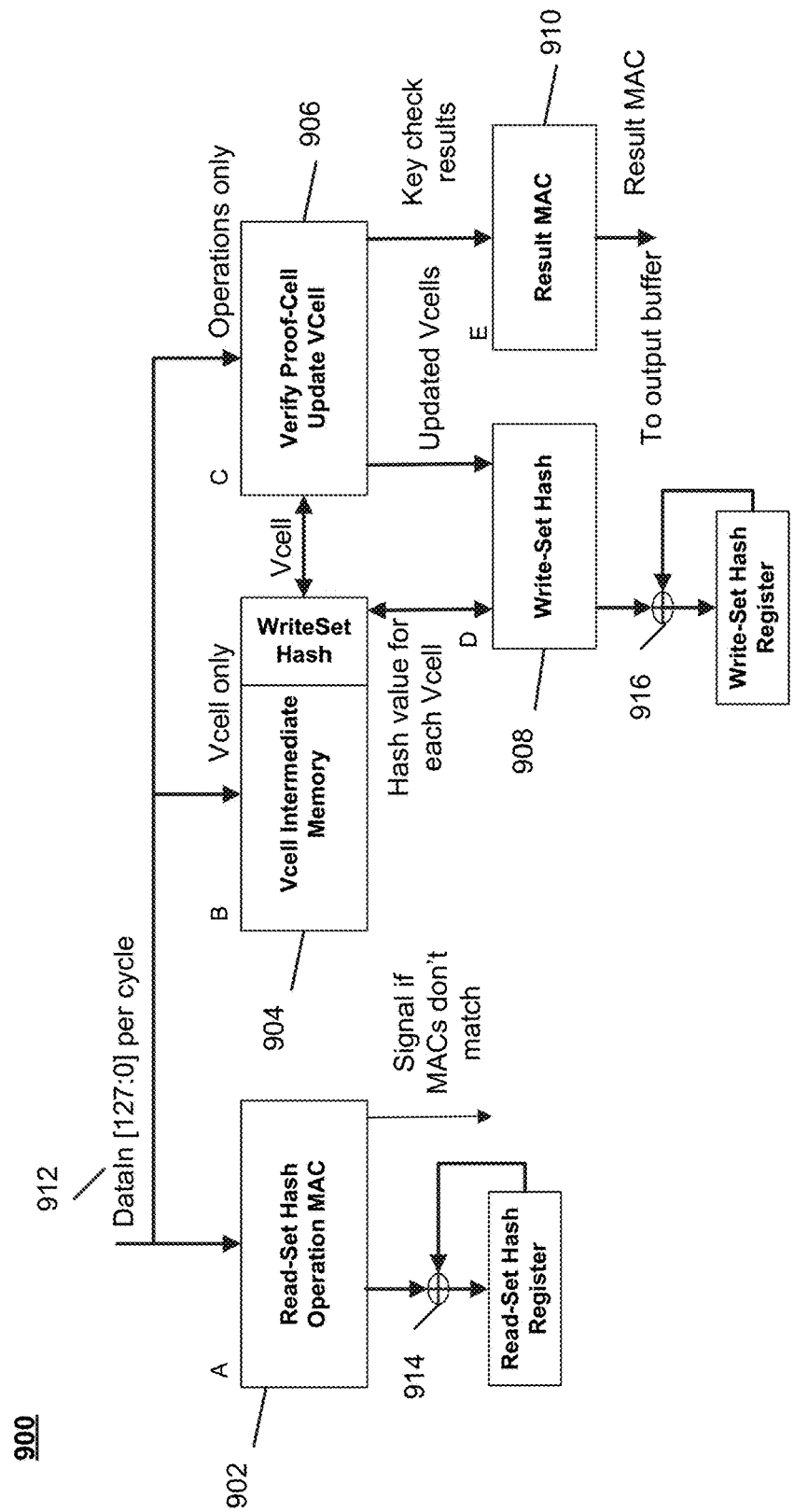
FIG. 9 is a block diagram of an example implementation of an example TM using a Field-programmable gate array (FPGA).

For example, each input batch may be serialized as sequences of vcells and operations: given that vcells and operations are streamed onto the FPGA and that an example AES block implementation may compute hash updates and MACs in completely pipelined fashion, the same AES module (e.g., A 902 in FIG. 9) may be used for both computations. FIG. 9 is a block diagram 900 of an example implementation of an example TM using an FPGA. VCells may be stored in internal memory (module B 904) and updated by the input operations (module C 906). As discussed above, a vcell could be updated by multiple operations and the final updated version of the vcell may be used to update the write-set hash. As an optimization, the write-set hash delta may be speculatively computed whenever a vcell is updated; if the same vcell is updated again, it may be possible to undo the previous update (e.g., by xor-ing (exclusive-OR) the previous hash delta) and apply the new delta.

For example, separate AES modules (e.g., D 908 and E 910) may be used for computing the write-set hashes and the result MACs. For example, the latter (910) may be streamed out, back to the UM 104.

Theoretically, an example FPGA architecture as discussed herein, may be able to stream one 128-bit data piece per cycle (912), for an example system where the parameters $o_{ins}$ (404) and $k_{ins}$ (406), the operation MAC (408), the proof cell $TM_{KV}$ [$a_1$] (410) of $k_{ins}$, and the empty cell $TM_{KV}$ [$a_2$] (412) are a total of 384 bits. At a frequency of 175 MHz, the example FPGA TM can process 19M insert operations/sec and 27M lookup operations/sec. As experimental results indicate, this is substantially higher than what a 20 core UM 104 implementation may generate as input. Further, an example implementation may use 21% of FPGA resources (e.g., on an ALTERA STRATIX V GSD5 board), so multiple TM 106 instances may be run using the example techniques discussed below.

As discussed above, an example UM 104 implementation may be multi-threaded, but a single stateful TM 106 instance has been assumed in the discussion above. Using experiments as discussed below, it may be shown that when there are a large number of UM 104 threads, they may generate enough TM 106 verification work that a single TM 106 instance may become a bottleneck. Therefore, an example extension to the example UM-TM protocol is discussed below, that allows any number of TM 106 instances to run concurrently in an almost decoupled manner, with the TM 106 instances needing to coordinate only during epoch transitions.

The integrity of CVTREE as discussed so far may rely on the sequential processing of operations by a single TM 106 over data stored within verified memory. For performance, operations may be batched into batches $b_0, b_1, \ldots$ ; operations in batch $b_i$ logically happen before those of $b_j$ (i<j). An example overall scheme for scaling to multiple TMs is to use these TMs to simulate the sequential processing by a single TM 106. To describe the simulation, the hypothetical single TM 106 may be denoted as STM and the multiple TMs as $TM_1, \ldots, TM_m$ in the discussion below.

As discussed above, the UM 104 can track the internal timestamp counter T of STM; it may exploit this to be able to generate batches of work decoupled from TM 106 processing. Let $T_i$ denote the value of the timestamp counter that STM would have had when it starts to process batch $b_i$. Thus, $T_0$=0 and if batch $b_i$ includes N vcells, $T_{i+1}$=$T_i$+N.

In the simulation of STM by $TM_1, \ldots, TM_m$, each $TM_i$ may no longer keep an internal timestamp counter. Instead, to process batch $b_j$, the UM 104 may pick some free $TM_i$ and provide $T_j$ as an additional input. STM has other internal state—the read- and write-set hashes—which the UM does not know. In the simulation, each TM may internally maintain read- and write-set hashes independent from other TMs. To process batch $b_j$, TM may reset its scratch timestamp counter to $T_j$ and process batch $b_j$ as STM would have processed, except for updating its own internal read- and write-set hashes. This simulation may not be exact since TM and STM update different hashes, but is mathematically equivalent. It may be understood that the read- and write-sets that STM would have seen is now partitioned across the read- and write-sets seen by different TMs TM. From the distributive property of the example hash function, it follows that the xor 914 of the read-sets hashes of TM is equal to the read-set hash of STM (resp. write-set hashes). At the end of an epoch, the TMs may aggregate read- and write-hashes for that epoch and check that the xor 914 of read-set hashes equals the xor 916 of write-set hashes. Assuming that UM 104 does not tamper with the $T_j$ values it provides as input to TMs, it may be understood that any verified memory tampering by MALLORY is detected with substantial probability.

However, a flaw in the above protocol is that MALLORY may induce the UM 104 to provide incorrect timestamp values as input and the simulation may no longer be equivalent to the processing by STM. To avoid this, for example, the global TM 106 counter may be stored in a special vcell. Thus, when UM 104 provides $T_j$ as input to $TM_i$ when processing batch $b_j$ with N vcells, the value $T_j$ may be used to update the read-set hash of TM and the updated value $T_j$+N at the end of processing $b_j$ may be used to update the write-set hash of $TM_i$. With these changes, any tampering of timestamp counter values may be detected at the next epoch transition.

As example additions to make this protocol formally correct, each $TM_i$ may keep a local count of the number of vcells it has processed; at epoch transitions, the sum of local counts may be checked against the high-water mark of timestamp counter seen by any $TM_i$. It may be noted that STM may use another internal counter to keep track of the progress of epoch transitions. For example, as described for timestamp, this counter may be kept in a vcell stored in UM 104 and provided as input to $TM_i$.

The TM 106 may be viewed as an example abstraction that provides a location for data and code execution that is not accessible to an adversary. For example, the CVTREE may rely on a small trusted module (TM) 106 implemented using secure hardware.

In an example implementation, a CVTREE may use FPGA-based secure hardware to realize the TM 106 (e.g., using special purpose hardware to provide isolation (e.g., memory protection)). FPGAs have been used for security applications (see, e.g., S. Drimer, "Volatile FPGA design security—a survey," Cambridge University, April 2008). In particular, there are several benefits to using an FPGA as secure hardware in a cloud setting, (see, e.g., Eguro et al., "FPGAs for Trusted Cloud Computing," *International Conference on Field-Programmable Logic, Reconfigurable Computing, and Applications*, 2012, pp. 63-70).

In an example implementation, an FPGA platform may communicate with the host CPU over a standard PCIe bus. Other alternative communication mechanisms exist, such as HyperTransport/QPI or deploying an array of FPGAs as a network appliance. There are also some performance characteristics that may be specific to an example FPGA/PCIe platform. For example, there may be two alternative ways of communicating over PCIe: (a) MMIO (memory-mapped I/O) and (b) DMA (direct memory access). For example, MMIO communication may be suitable for very small transfers. On the other hand, DMA may offer more advantageous performance for larger transfers, but may involve non-trivial startup cost. For example, in an example platform used for testing, DMA transfers from 4 B-16 KB incurred substantially the same latency. Another potential issue is that FPGAs are inherently highly parallel, but may have limited sequential compute power (see, e.g., Mueller et al., "Data Processing on FPGAs," *Proc. of the VLDB Endowment*, 2(1), 2009, pp. 910-921). Additionally, FPGAs may have a small amount of fast on-chip memory and substantially larger, slower off-chip memory (on the order of a few MBs vs. GBs respectively).

It may be noted that the design of CVTREE may be easily portable to other physical realizations of the TM. For example, this flexibility is a consequence of a minimal TM design. For example, a candidate for the TM 106 may include the INTEL SOFTWARE GUARD EXTENSIONS (SGX) (see, e.g., McKeen et al., "Innovative Instructions and Software Model for Isolated Execution," *Proceedings of the 2nd Workshop on Hardware and Architectural Support for Security and Privacy* (HASP), 2013). This example includes a set of instructions that allow the creation of a process within a protected address space, referred to as an "enclave." For example, data and computation within an enclave may be shielded from all other processes, including the OS.

Example mechanisms for recovery are discussed below. The goals of the recovery system are the following. First, in case of a legitimate crash (with no malicious activity), basic recovery may be supported and the key-value database may be restored to the last committed state. Second, in the presence of a malicious adversary, the system may be able to detect any attempts to restore the database to a tampered state.

As discussed above, the TM may maintain $h_{ws}[e]$ and $h_{rs}[e]$ which enables it to verify $\mathcal{RS}=\mathcal{WS}$. In order to enable a basic logging based recovery mechanism, the following extensions may be used. The TM may maintain an additional set of hashes ($h_{wscommit}[e]$ and $h_{rscommit}[e]$) that maintains the read-sets and the write-sets for all committed operations. For example, by leveraging a small amount of NVRAM it may be possible to ensure that the state can persist a TM crash. The UM may indicate the commit of an operation to the TM explicitly after it has persisted the log to stable storage. For example, techniques from Parno et al., "Memoir: Practical State Continuity for Protected Modules," 32*nd IEEE Symposium on Security and Privacy* (S&P 2011), May 2011, pages 379-394, may be implemented to use the TPM to store such shielded persistent state.

In case of a system crash, the UM may run a standard recovery algorithm where it can redo/undo any appropriate transactions. Any non-committed transactions may be discarded and the state at the end of running the recovery algorithm should be identical to the persisted state in the TM corresponding to all committed transactions (i.e., the computed $h_{ws}[e]$ and $h_{rs}[e]$ should match $h_{wscommit}[e]$ and $h_{rscommit}[e]$). The UM may signal the end of the recovery process explicitly to the TM at which point the above conditions will be checked. If the recovery algorithm passes these checks then it may be guaranteed that the recovered point is a legitimate untampered one. The TM may not accept any new operations until the recovery operation is complete and verified. In accordance with recovery algorithms, the system may leverage checkpointing to reduce the recovery time. An example checkpoint may also include the corresponding $h_{ws}[e]$ and $h_{rs}[e]$ values.

If MALLORY runs an erroneous recovery algorithm or tampers with the log or a previous checkpoint, the verification check at the end of the recovery process will fail. While the protocol may guarantee detection when there is a malicious attempt to restore the database to a modified state, it is possible that the database may be restored to an unrecoverable state. At this point, it may amount to a denial of service (DOS) attack since the TM would stop processing further operations. The only course of action for a client in this case may be to resort to any previous verified backups of the database that have been saved. It may be noted that commercial key value stores may assume a similar model where users may ultimately leverage periodic backups as a means to guarantee recoverability. However, this may only guarantee restoration to the last backed-up version of the database. This may be further improved by leveraging client query logs which have sufficient information to reconstruct the database (which may be somewhat similar to the notion of command logging (see, e.g., Malviya et al., "Rethinking Main Memory OLTP Recovery," 2014 *IEEE* 30*th International Conference on Data Engineering* (ICDE), March 2014, pages 604-615).

Figure 10:
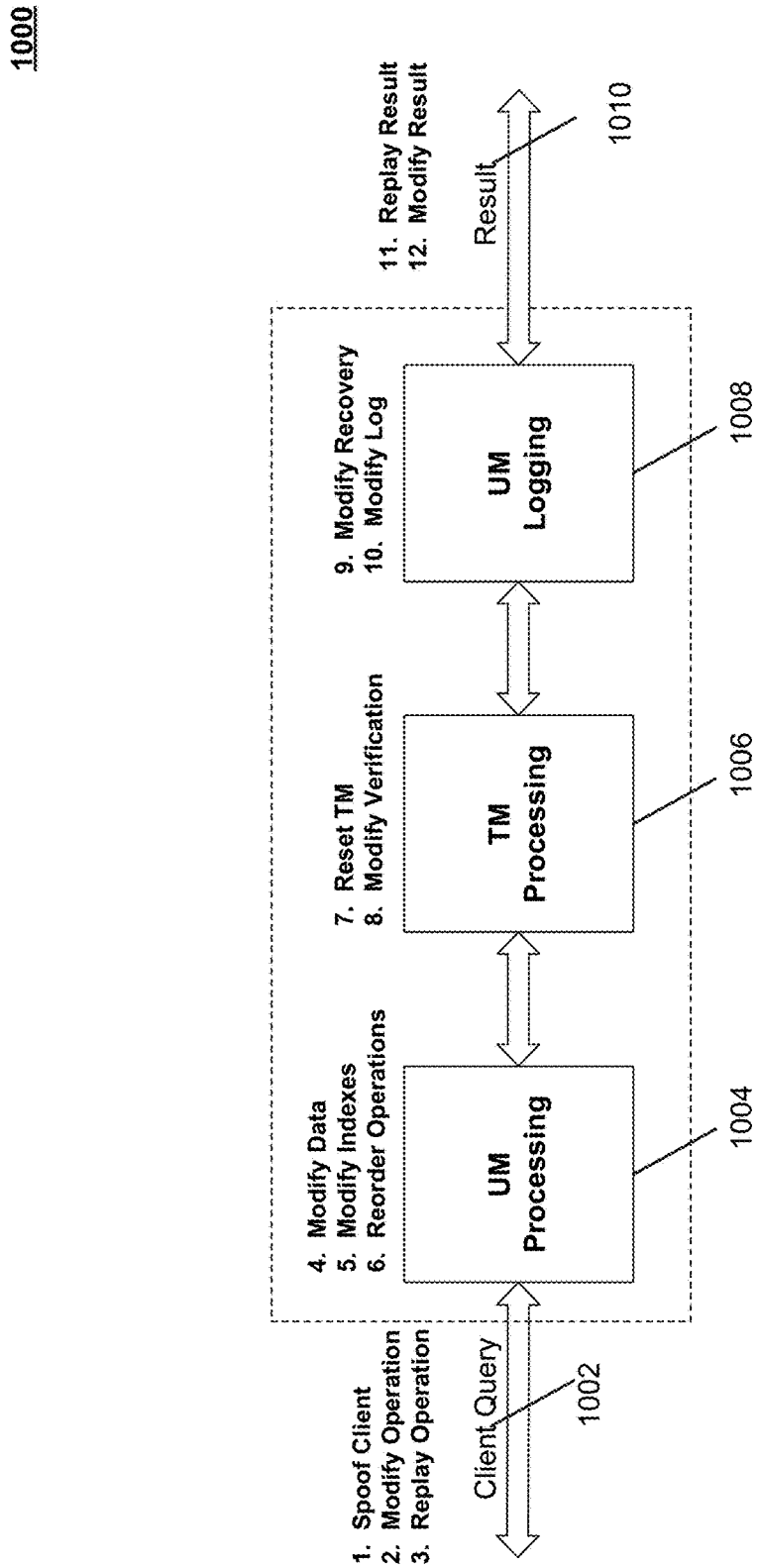
FIG. 10 is a block diagram of an example client workflow illustrating example possible attacks.

The following discussion illustrates how an example system may detect different attacks that an active adversary (e.g., MALLORY) may attempt (some of these attacks have already been discussed above). An example basic workflow 1000 for an example client 110 is shown in FIG. 10. For this example, every input client query 1002 involves the following steps:

1) Some processing 1004 in the UM 104.
2) Verified memory operations 1006 involving the TM 106.
3) Logging 1008 of the operations involving the UM/TM.
4) Result 1010 communication.

For this example, it is assumed that MALLORY can induce errors at any of these processing steps (FIG. 10 illustrates the different attack patterns and the different points in the workflow where MALLORY can induce them). In particular, the following attacks are considered. While these attacks are not meant to be exhaustive, they may highlight the robustness of the Client-CVTREE protocol for a variety of attack patterns.

1) Spoof Client Connection: MALLORY can try to spoof a client and run operations.
2) Modify Client Request: MALLORY can modify an input client request (e.g., modify the key used in a lookup operation).
3) Replay Client Request: MALLORY can replay an older client request (e.g., a previous update request).
4a) Modify KV Database: MALLORY can modify a cell in the Key-Value Database (e.g., Modify $VM_{KV}[7]=\langle 2, 3, 15\rangle$ to $VM_{KV}[7]=\langle 2, 4, 15\rangle$).
4b) Modify Value Table: MALLORY can swap values in the Value table (e.g., swap $v_{12}$ and $v_{15}$).
5) Modify Key Index: MALLORY can modify the key index (e.g., delete a key in the index).
6) Delay/Reorder Operation: MALLORY can order and delay the client requests.
7) Reset the TM 106: MALLORY can shut down the TM 106 and restart it.
8) Modify Verification Check: MALLORY can modify the inputs for the verification check.
9) Modify Recovery Algorithm: MALLORY can modify the recovery algorithm (e.g., to not REDO all committed transactions).
10) Modify Log File: MALLORY can modify the log file (e.g., delete committed log records).
11) Replay Result: MALLORY can cache and replay an older result for a particular lookup query.
12) Modify Result: MALLORY can modify the value returned in the result.

As shown in FIG. 10, the example attack patterns 1-3 may occur at the client query 1002, the example attack patterns 4a-6 may occur at the UM processing 1004, the example attack patterns 7-8 may occur at the UM processing 1006, the example attack patterns 9-10 may occur at the UM logging 1008, and the example attack patterns 11-12 may occur at the UM result 1010 communication.

Table 3 shown below indicates example detection mechanisms for the above attacks.

TABLE 3

| Attack Pattern | Detection Mechanism |
|---|---|
| Spoof Client Connection | $MAC_{op} = MAC_{SKey}(o_l \| L \| k_l)$ |
| Modify Client Request | $MAC_{op} = MAC_{SKey}(o_l \| L \| k_l)$ |
| Replay Client Request | Unique (oid) |
| Modify Key Index | $VM_{KV}[a]$: key $\leq k_l <$ nextkey |
| Modify KV Database | $h_{ws}[e] = h_{rs}[e]$ |
| Modify Value Table | $MAC_{result} = MAC_{SKey}(\text{oid} \| \text{val})$ |
| Delay/Reorder Operation | Does not affect Correctness |
| Reset the TM | TM state is re-initialized (DOS Attack) |
| Modify Verification Check | $h_{ws}[e] = h_{rs}[e]$ |
| Modify Recovery Algorithm | $h_{ws}[e] = h_{wscommit}[e]$ (DOS Attack) |
| Modify Log File | $h_{ws}[e] = h_{wscommit}[e]$ (DOS Attack) |
| Replay Result | $MAC_{result} = MAC_{SKey}(\text{roid} \| \text{val})$ |
| Modify Result | $MAC_{result} = MAC_{SKey}(\text{roid} \| \text{val})$ |

For each attack, the invariants are denoted that will detect the attack (checks for these invariants are explicitly included in FIGS. 3-7. It may be noted that some of the attacks (e.g., Spoof Client Connection, Modify Client Request, Modify Result, Replay Result) may be detected online. Some of the other attacks (e.g., Modify KV Database) may not be detected immediately but may be detected during the next verification check. MALLORY can also arbitrarily delay or reorder operations but this may only influence the commit order of the operations and may not influence the correctness of the system. Finally, some of these attacks (e.g., Reset the TM, Modify Recovery Algorithm, Modify Log File) may lead to denial of service (DOS) attacks. For example, in order to recover from these attacks, the client may resort to using suitable recovery options.

II. Example Operating Environment

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 11:
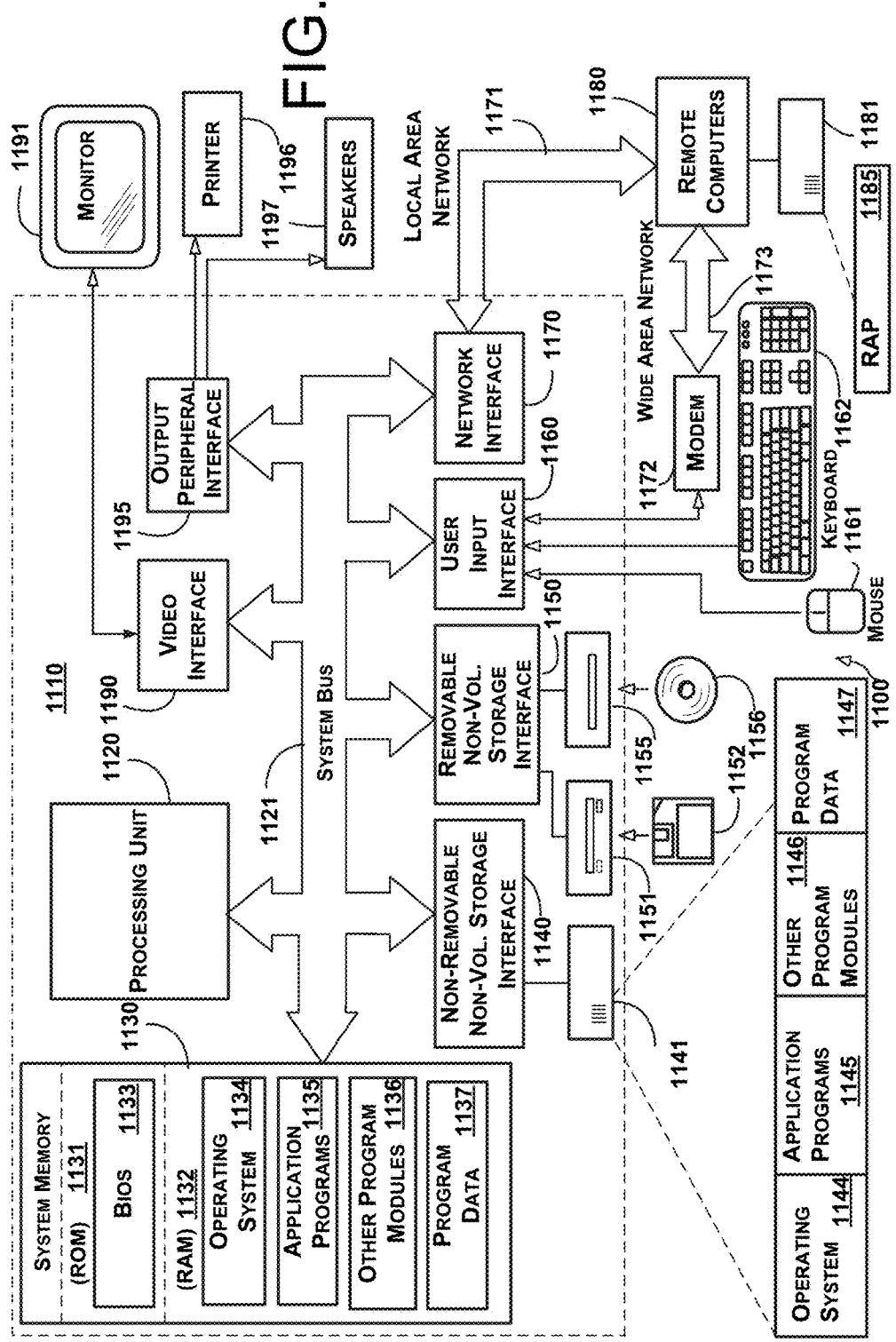
FIG. 11 is a block diagram of an example architecture for an example system for controlling security in an encrypted database management system.

FIG. 11 illustrates an example of a suitable computing system environment 1100 on which aspects of the subject matter discussed herein may be implemented. The computing system environment 1100 is only one example of a suitable computing environment and is not intended to suggest any limitation as to the scope of use or functionality of aspects of the subject matter discussed herein. Neither should the computing environment 1100 be interpreted as having any dependency or requirement relating to any one or combination of components illustrated in the example operating environment 1100.

Aspects of the subject matter discussed herein are operational with numerous other general purpose or special purpose computing system environments or configurations. Examples of well-known computing systems, environments, or configurations that may be suitable for use with aspects of the subject matter described herein comprise personal computers, server computers—whether on bare metal or as virtual machines—, hand-held or laptop devices, multiprocessor systems, microcontroller-based systems, set-top boxes, programmable and non-programmable consumer electronics, network PCs, minicomputers, mainframe computers, personal digital assistants (PDAs), gaming devices, printers, appliances including set-top, media center, or other appliances, automobile-embedded or attached computing devices, other mobile devices, phone devices including cell phones, wireless phones, and wired phones, distributed computing environments that include any of the above systems or devices, and the like. While various embodiments may be limited to one or more of the above devices, the term computer is intended to cover the devices above unless otherwise indicated.

Aspects of the subject matter described herein may be described in the general context of computer-executable instructions, such as program modules, being executed by a computer. Generally, program modules include routines, programs, objects, components, data structures, and so forth, which perform particular tasks or implement particular abstract data types. Aspects of the subject matter described herein may also be practiced in distributed computing environments where tasks are performed by remote processing devices that are linked through a communications network. In a distributed computing environment, program modules may be located in both local and remote computer storage media including memory storage devices.

Alternatively, or in addition, the functionality described herein may be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), and the like.

With reference to FIG. 11, an example system for implementing aspects of the subject matter discussed herein includes a general-purpose computing device in the form of a computer 1110. A computer may include any electronic device that is capable of executing an instruction. Components of the computer 1110 may include a processing unit 1120, a system memory 1130, and one or more system buses (represented by system bus 1121) that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus also known as Mezzanine bus, Peripheral Component Interconnect Extended (PCI-X) bus, Advanced Graphics Port (AGP), and PCI express (PCIe).

The computer 1110 typically includes a variety of computer-readable media. Computer-readable media can be any available media that can be accessed by the computer 1110 and includes both volatile and nonvolatile media, and removable and non-removable media. By way of example, and not limitation, computer-readable media may comprise computer storage media and communication media.

Computer storage media (or "computer-readable storage media") includes both volatile and nonvolatile, removable and non-removable media implemented in any method or technology for storage of information such as computer-readable instructions, data structures, program modules, or other data. Computer storage media includes RAM, ROM, EEPROM, solid state storage, flash memory or other memory technology, CD-ROM, digital versatile discs (DVDs), Blu-ray Disc (BD) or other optical disk storage (e.g., Universal Serial Bus (USB) drive, hard disk drive), magnetic cassettes, magnetic tape, magnetic disk storage or other magnetic storage devices, or any other medium which can be used to store the desired information and which can be accessed by the computer 1110. "Computer storage media" is different from "communication media." Thus, as used herein, the term "computer-readable storage medium" is not a signal per se, nor any type of propagating signal per se.

"Communication media" typically embodies computer-readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct wired connection, and wireless media such as acoustic, RF, infrared and other wireless media. Combinations of any of the above should also be included within the scope of computer-readable media.

The system memory 1130 may include computer storage media in the form of volatile and/or nonvolatile memory such as read only memory (ROM) 1131 and random access memory (RAM) 1132. Nonvolatile memory may be substituted for some or all of the ROM 1131 and/or the RAM 1132. For example, memristor memory, phase-change memory (PCM), or some other type of nonvolatile memory may be used instead of, or in addition to, the ROM 1131 and/or the RAM 1132.

A basic input/output system 1133 (BIOS), containing the basic routines that help to transfer information between elements within computer 1110, such as during start-up, is typically stored in ROM 1131. RAM 1132 typically contains data and/or program modules that are immediately accessible to and/or presently being operated on by processing unit 1120. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disc drive 1155 that reads from or writes to a removable, nonvolatile optical disc 1156 such as a CD ROM, DVD, BD, or other optical media.

In one implementation, memristor memory, phase-change memory, or some other type of nonvolatile memory may be used instead of, or in addition to, the hard drive 1141.

Other removable/non-removable, volatile/nonvolatile computer storage media (or "computer-readable storage media") that can be used in the exemplary operating environment include magnetic tape cassettes, flash memory cards and other solid state storage devices, digital versatile discs, other optical discs, digital video tape, solid state RAM, solid state ROM, and the like. The hard disk drive 1141 may be connected to the system bus 1121 through the interface 140, and magnetic disk drive 1151 and optical disc drive 1155 may be connected to the system bus 1121 by an interface for removable nonvolatile memory such as the interface 1150.

The drives and their associated computer storage media, discussed above and illustrated in FIG. 11, provide storage of computer-readable instructions, data structures, program modules, and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers herein to illustrate that they may be different copies.

A user may enter commands and information into the computer 1110 through input devices such as a keyboard 1162 and pointing device 1161, commonly referred to as a mouse, trackball, or touch pad. Other input devices (not shown) may include a microphone (e.g., for inputting voice or other audio), joystick, game pad, satellite dish, scanner, a touch-sensitive screen, a writing tablet, a camera (e.g., for inputting gestures or other visual input), or the like. These and other input devices are often connected to the processing unit 1120 through a user input interface 1160 that is coupled to the system bus, but may be connected by other interface and bus structures, such as a parallel port, game port or a universal serial bus (USB).

Through the use of one or more of the above-identified input devices a Natural User Interface (NUI) may be established. A NUI, may rely on speech recognition, touch and stylus recognition, gesture recognition both on screen and adjacent to the screen, air gestures, head and eye tracking, voice and speech, vision, touch, gestures, machine intelligence, and the like. Some exemplary NUI technology that may be employed to interact with a user include touch sensitive displays, voice and speech recognition, intention and goal understanding, motion gesture detection using depth cameras (such as stereoscopic camera systems, infrared camera systems, RGB camera systems, and combinations thereof), motion gesture detection using accelerometers/gyroscopes, facial recognition, 3D displays, head, eye, and gaze tracking, immersive augmented reality and virtual reality systems, as well as technologies for sensing brain activity using electric field sensing electrodes (EEG and related methods).

A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include phone networks, near field networks, and other networks. Such networking environments are commonplace in offices, enterprise-wide computer networks, intranets, and the Internet.

When used in a LAN networking environment, the computer 1110 is connected to the LAN 1171 through a network interface or adapter 1170. When used in a WAN networking environment, the computer 1110 may include a modem 1172 or other means for establishing communications over the WAN 1173, such as the Internet. The modem 1172, which may be internal or external, may be connected to the system bus 1121 via the user input interface 1160 or other appropriate mechanism. In a networked environment, program modules depicted relative to the computer 1110, or portions thereof, may be stored in the remote memory storage device. By way of example, and not limitation, FIG. 11 illustrates remote application programs (RAP) 1185 as residing on memory device 1181. It will be appreciated that the network connections shown are exemplary and other means of establishing a communications link between the computers may be used.

In this context, a "processor" may include a single processor or multiple processors configured to process instructions associated with a computing system. A processor may thus include one or more processors executing instructions in parallel and/or in a distributed manner. For example, the system shown in FIG. 11 may include one or more processors (e.g., hardware processors).

For example, a system may include at least one hardware device processor, and a computer-readable storage medium storing executable instructions for execution by the device processor, for implementing an example key-value store as discussed herein.

For example, a system may include at least one hardware device processor, and a computer-readable storage medium storing executable instructions that, when executed, cause one or more of the at least one hardware device processor to control verification of integrity.

One skilled in the art of computing will appreciate that many different techniques may be used for implementing features discussed herein.

Performance overheads of integrating integrity into a high-performance, in-memory key-value store are discussed below. Example results are discussed below of comprehensive experiments that study the throughput and latency of the key-value store with and without support for integrity using the YAHOO CLOUD SERVICE BENCHMARK (YCSB).

Experimental results discussed below were performed using YCSB (see, e.g., Cooper et al., "Benchmarking Cloud Serving Systems with YCSB," *Proceedings of the 1st ACM Symposium on Cloud Computing* (SoCC'10), 2010, pages 143-154). This benchmark was specifically designed to study the performance of key-value stores. If not stated otherwise, the example bench-mark database included ten million key-value pairs. For this example, each key was an eight byte integer. For read and update-only workloads (no inserts), the keys were generated sequentially from 1 to N (N the size of the database) and then randomly permuted. For workloads with inserts (Workload D, see below), the keys were randomly generated in the domain [1 . . . 2*N], with N the size of the initial database before the first insert was executed. For this example, each value of a key-value pair was a random sequence of eight bytes.

The YCSB benchmark specifies four core workloads which were run, for experimental results discussed herein.
 a. Update-Heavy: This workload includes 50% lookup queries and 50% updates.
 b. Read-Heavy: This workload includes 95% lookup queries and 5% updates.
 c. Read-only: This workload includes 100% lookup queries.
 d. Inserts: This workload includes 95% lookup queries and 5% inserts of new key-value pairs.

For workloads A, B, and C, the keys of all lookup operations were in the range [1 . . . N] so that all these operations were successful. In all four workloads, the keys of all lookup and update operations were generated using a Zipf distribution, thereby ensuring that the frequently used keys were randomly sprinkled across the key domain and not clustered. Workload D may be special in this regard: Workload D also uses a Zipf distribution to select the keys for lookup operations, but Workload D specifies that newly inserted records are queried with a higher probability than existing, old records (see, e.g., Cooper et al., supra). The new records inserted as part of Workload D were generated similarly as the records of the initial Workload D database were generated (i.e., random keys in the range [1 . . . 2*N] and random values).

Due to insert operations, the size of the database may grow as time progresses in Workload D. This growing size of the database, however, did not noticeably impact the performance of the system so that response times of all operations were roughly the same at the beginning and end of all experimental benchmark runs.

Experiments were also run with Uniform (e.g., instead of Zipf) distributions to generate keys for lookup and update operations. YCSB results are discussed herein because the results were substantially the same.

In order to implement the benchmark, the workload generator provided as part of the YCSB software distribution was adapted in order to generate and verify MACs at the client for integrity. However, logically the same workload as the original YCSB workload generator was run. If not specified otherwise, the experiments were run as follows: Each experiment was repeated three times and in each of these three runs 100 million lookup, update, or insert operations were executed as specified by the workload. Both throughput and latency were measured. The throughput was measured as an average throughput over time (while a run was executed) and across the three runs. The variance was substantially low, so error bars are not shown in results. For the latency experiments, both the median and the 90% quantile over all operations of all three runs are shown. In addition to throughput and latency, the utilization of the PCIe bus was also measured, and CPU utilization for a bottleneck analysis. In many experiments, the number of cores in the UM (or TM) was varied. To measure the sensitivity of these example techniques to the verification rate, an experiment that varies this parameter is also discussed. The verification rate is configured as number of key-value operations per record. If not stated otherwise, this parameter was set to 16 which corresponds to verifying a cell of the key-value store after 16 lookup, update, or insert operations.

As a research platform for all experiments, the high-performance, in-memory key-value store was used. The key-value store was implemented as a library so that all threads executed both the YCSB benchmark implementation and the key-value store operations. This way, the experimental results do not include network effects which could dampen the overheads induced by integrity checking. Furthermore, the cost to create MACs and verify MACs at the client reduced the overall throughput of the system. As a result, the example experimental results may be conservative in the sense that the overheads of integrity checking may be expected to be relatively smaller in a distributed key-value store and in a system-setup in which client-side MAC generation and verification does not impact the throughput of the key-value store. For these example experiments, a main data structure used to index keys in the key-value store is a BW-tree (see, e.g., Levandoski et al., "The Bw-Tree: A B-tree for new hardware platforms", supra). For example, the BW-tree may achieve advantageous performance on current multi-core machines, at least because it allows lock-free and concurrent operations on the key-value store. Three different system configurations were measured experimentally:

None: This configuration of the key-value store provided no support for integrity. "None" serves as a baseline and represents the performance of current key-value stores.

CVTREE(SW): In this configuration, the CVTREE uses a TM implemented in software (e.g., using C++) and in a separate thread that is pinned to a dedicated core. Communication between UM and TM was implemented using shared memory. While such a software TM may not offer any protection from a malicious adversary, this configuration may be useful to study the performance tradeoffs of using secure hardware.

CVTREE (HW): In this configuration, the CVTREE uses a TM implemented using an FPGA as discussed above. This configuration may be secure assuming that the crypto is strong and the attacker cannot break into the FPGA (see, e.g., Eguro et al., supra).

For CVTREE (SW) and CVTREE (HW), all update and insert operations may be logged to disk for recoverability (recovery is discussed further herein). For None, logging was turned off, due to additional work done by the logging component of the experimental key-value store, that presented issues in isolating such additional work, for these experiments. Due to this asymmetry between None and the other two configurations, again, the results may be conservative and the overheads of supporting integrity may appear larger than they would be if logging were turned on for None, too.

If not stated otherwise, experiments were carried out on a 3.4 GHz machine with two sockets and 6 physical/12 logical cores per socket. The machine had 128 GB of main memory. Logs (for CVTREE (SW) and CVTREE (HW) were written to an SSD, a SAMSUNG MZHPU512HCGL SSD (PCIe 2.0×4) with a maximum sequential write bandwidth of 930 MBps and max sequential read bandwidth of 1170 MBps. The operating system for these experiments was WINDOWS SERVER 2012. The machine had an ALTERA FPGA (STRATIX V GSD5) with a PCIe 3.0×8 link (e.g., a theoretical max of over 7.8 GB/s in each direction). This FPGA was only used in the CVTREE (HW) experimental configuration. In theory, this FPGA may provide enough capacity to run up to 6 TMs in parallel. However, this large number of TMs was not saturated in the experiments discussed herein. As a consequence, results with one or two FPGA cores are discussed herein.

In order to study scale-out effects beyond 12 cores, experiments were also run on a 2.3 GHz machine with 10 physical/20 logical cores per socket. For the experiments with this machine, the same ALTERA FPGA board was used, as with the other machine.

Figure 13:
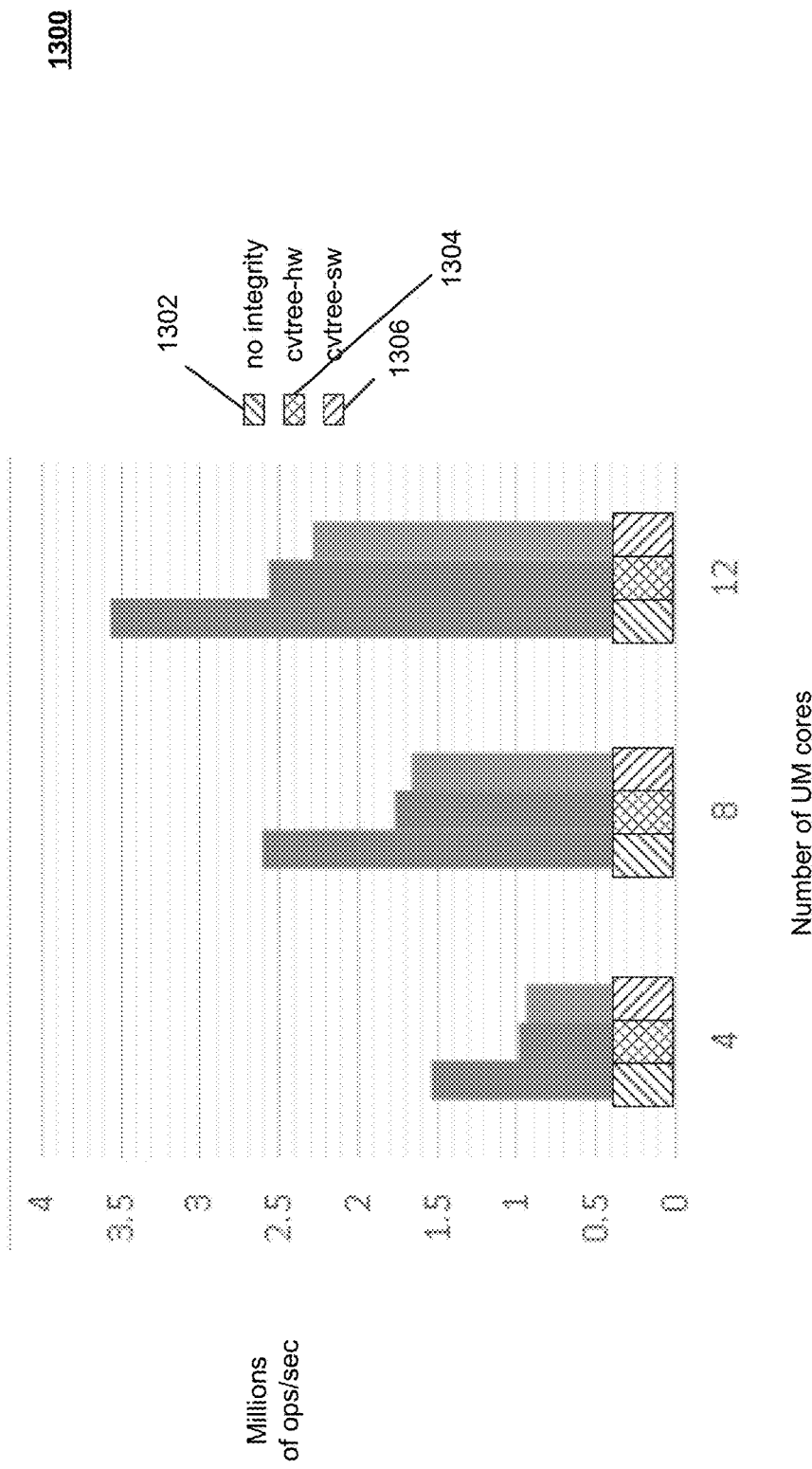
FIG. 13 illustrates example experimental results of throughput for workload A.
Figure 14:
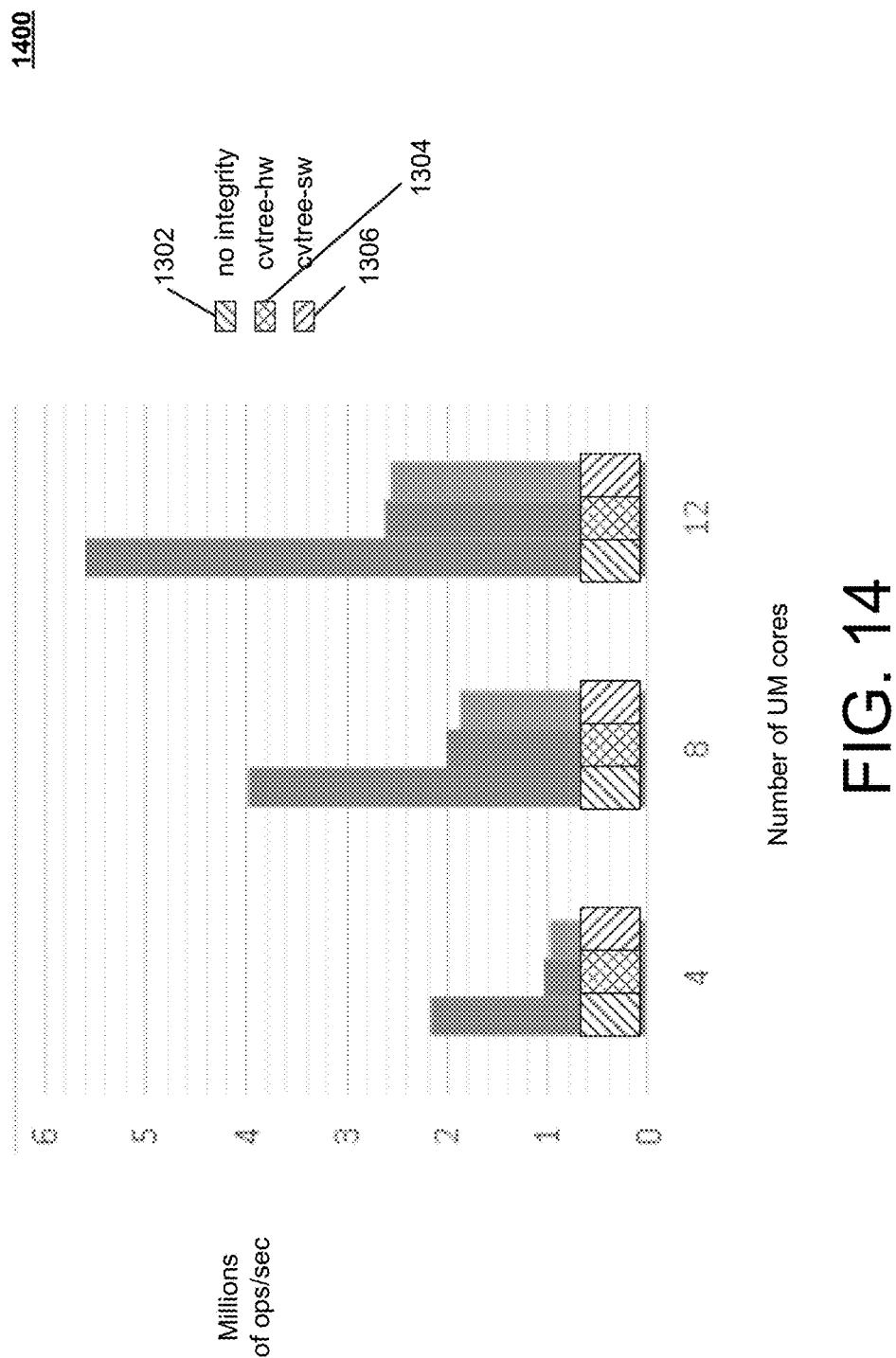
FIG. 14 illustrates example experimental results of throughput for workload B.

FIGS. 13-16 show the experimental result throughput (in millions of ops/sec) of the three approaches (None, CVTREE(SW), CVTREE (HW)) for the three core YCSB workloads with a varying number of UM cores. As shown in FIG. 13, legend hash-marking indicators are used for indicating bars in FIGS. 13-16 as representing experimental results for "none" 1302, "cvtree-hw" 1304, and "cvtree-sw" 1306.

In these experiments, there was only 1 TM core and the verification rate was set to 16. A first result indicates that independent of the workload and the number of cores, the performance of None and CVTREE (HW) is competitive. In the worst case, it may be off by a factor of two. Thus, support for integrity may advantageously be integrated into practical and mainstream systems. Conventional published results of other systems have indicated throughputs in the order of hundreds of operations per seconds, whereas the example techniques discussed herein (e.g., CVTREE (HW)) may support millions of operations per seconds.

A second result indicates that all three approaches may scale linearly with the number of cores. Again, these experiments indicate that integrity can be implemented in a scalable way. Conventional approaches have a single point of failure. In these particular experiments, the UM 104 was the bottleneck (discussed further herein) so that one TM 106 core was sufficient. However, the example techniques discussed herein also scale with the number of TM 106 cores.

Comparing CVTREE (SW) and CVTREE (HW), the results are almost the same. CVTREE (SW) may perform slightly more advantageously because it requires fewer CPU cycles from the UM 104: for example, preparing and sending a message to the FPGA via the PCIe bus consumes more CPU cycles than actually performing all the crypto operations in the TM in order to support integrity. This result indicates how light-weight and efficient the implementation of integrity in a TM 106 can be.

Figure 15:
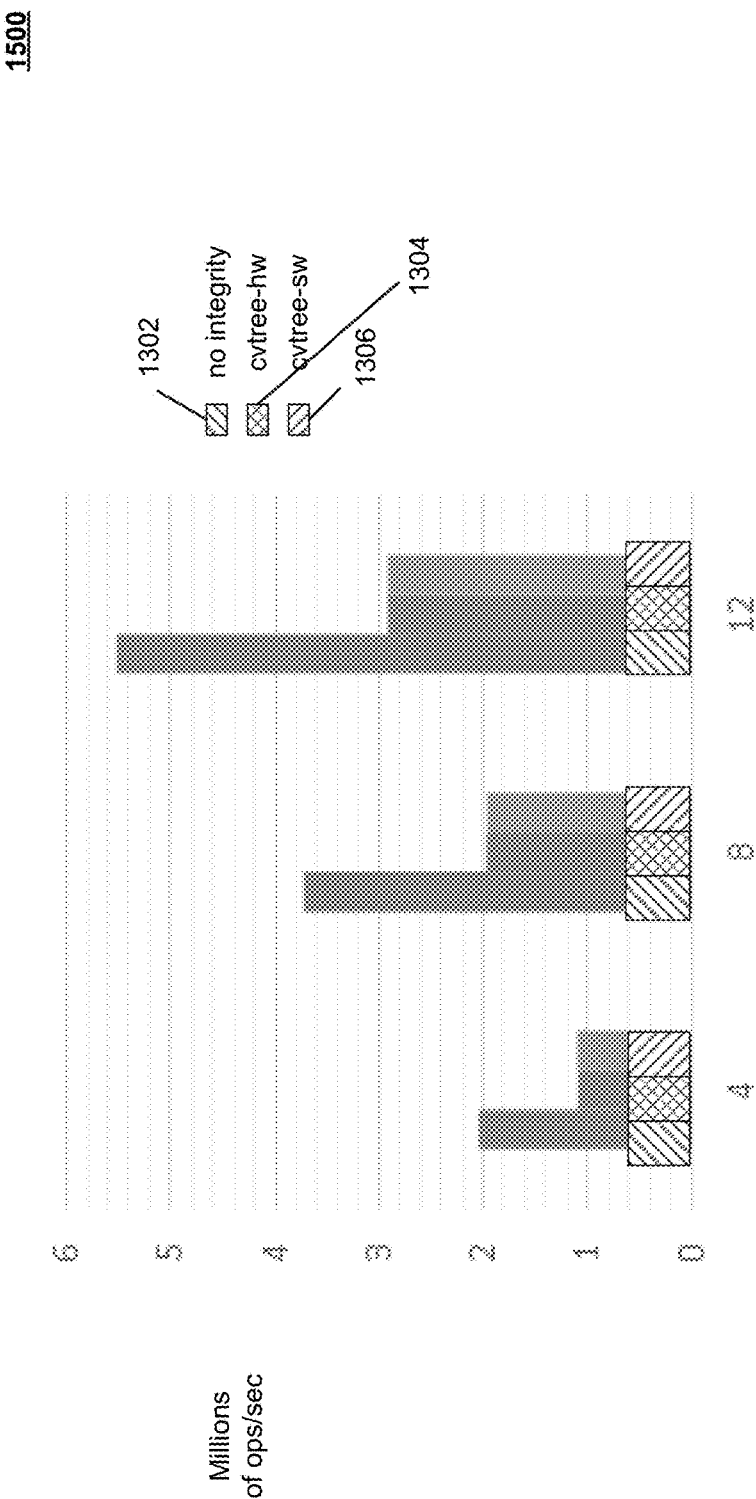
FIG. 15 illustrates example experimental results of throughput for workload C.
Figure 16:
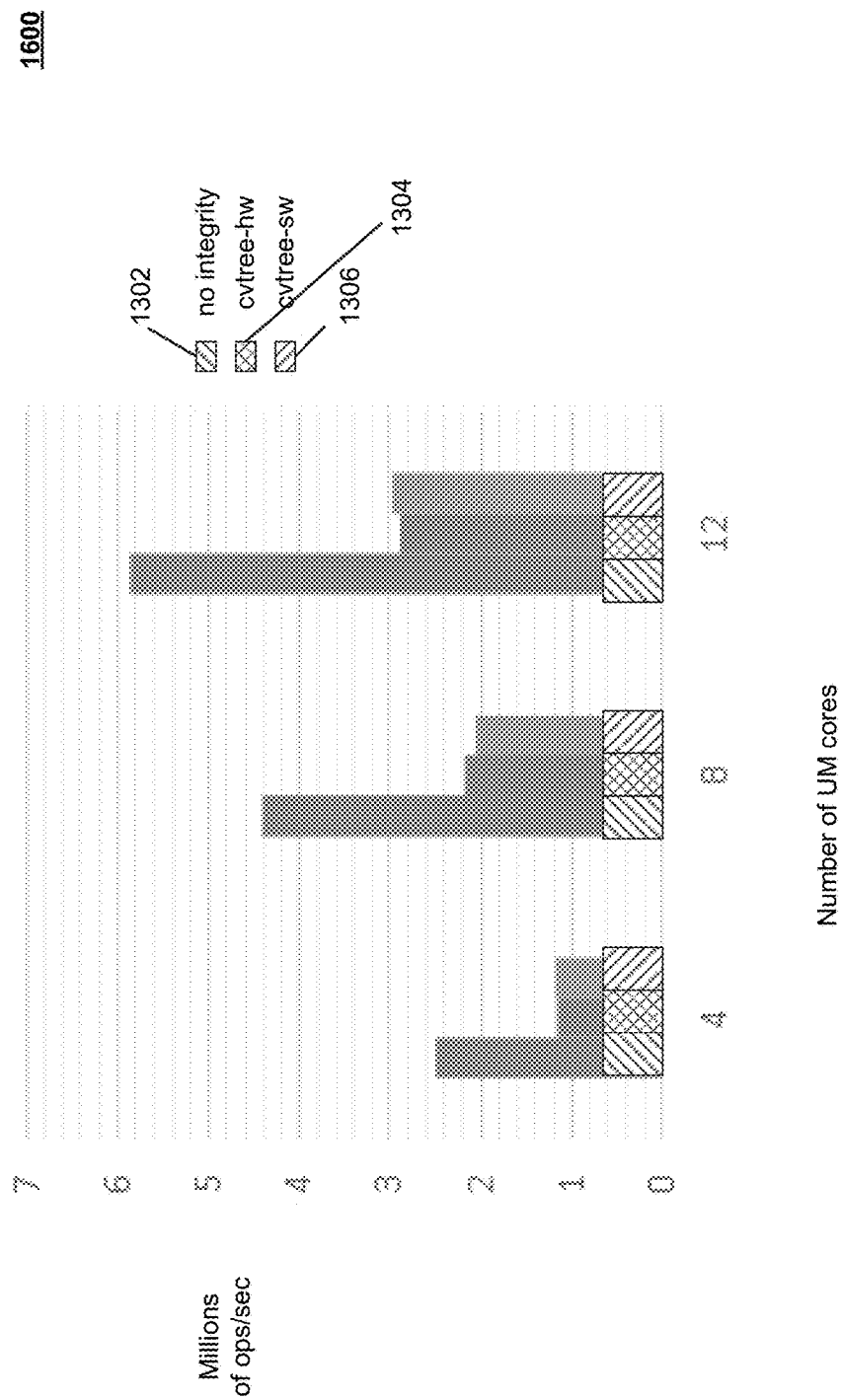
FIG. 16 illustrates example experimental results of throughput for workload D.

Comparing FIGS. 13 and 15 may provide insights into the relative costs of read and write operations. Not surprisingly, None may perform more advantageously for Read-only (and Read-mostly) workloads than for Update-intensive workloads. In this regard, the experimental key-value store may be no different from any other key-value store (e.g., CASSANDRA, HBASE, etc.). However, reads may be as expensive as writes with CVTREE. As a result, relatively speaking, the overheads of CVTREE may be biggest for the Read-only workload of FIG. 13. Nevertheless, even in this case, CVTREE (HW) indicates competitive performance and the overheads may seem affordable for the strong security guarantees that this example approach may provide.

Figure 17:
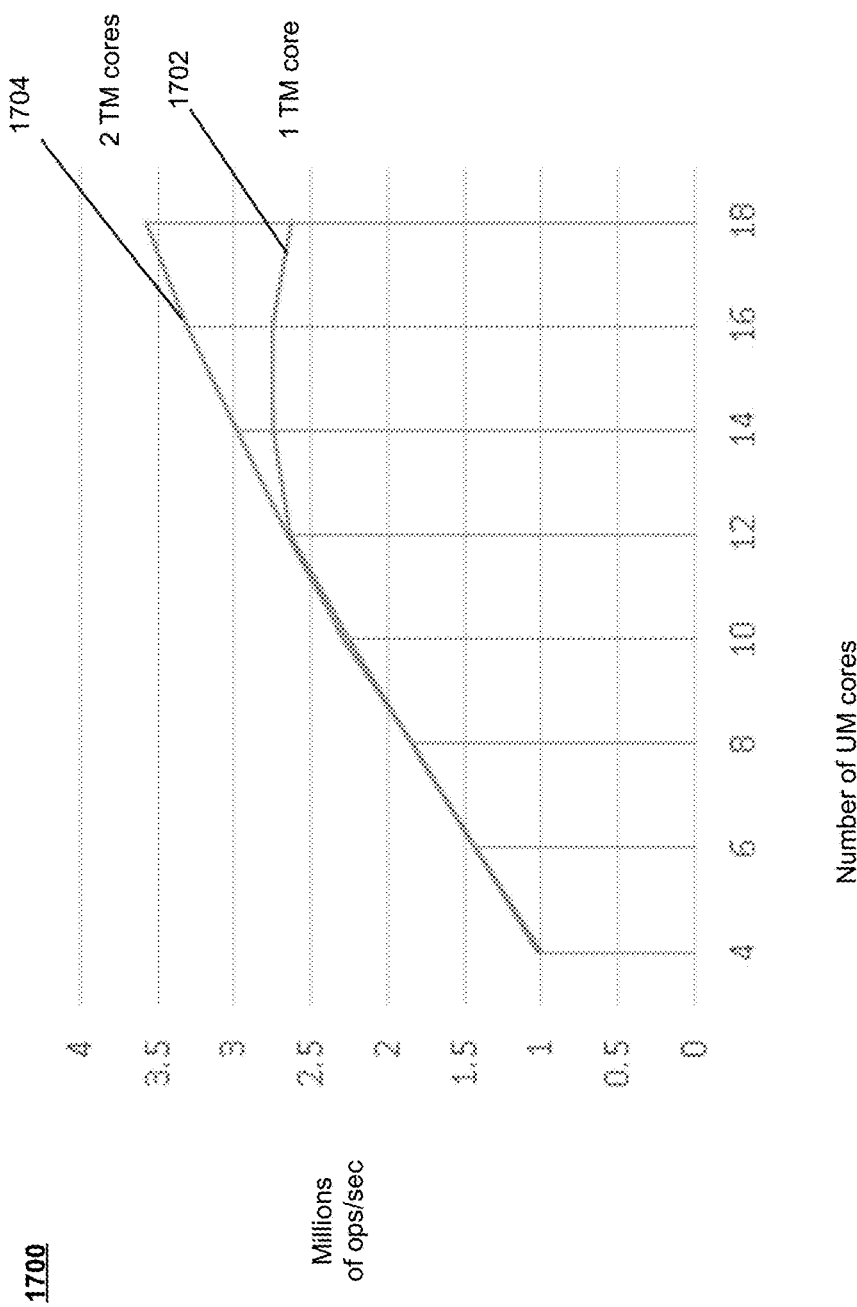
FIG. 17 illustrates example experimental results of throughput for workload C, varying a number of UM cores and TM cores.

In Experiment 1,12 UM cores were not sufficient to saturate a single TM 106 core. In order to study the scalability of CVTREE with more than one TM 106 core, experiments were performed with the 20-core machine. FIG. 17 shows the experimental throughput of CVTREE (HW) for Workload C, thereby varying the number of UM 104 cores from 1 to 18. A line 1702 shows the results for one TM 106 core, while a line 1704 shows the results for two TM 106 cores.

FIG. 17 indicates that CVTREE (HW) not only scales advantageously with the number of UM 104 cores, but also with the number of TM 106 cores. On the 20-core machine, a configuration with only one TM 106 core saturates the TM 106 if more than 12 UM 104 cores are used. At this point, the TM 106 may become the bottleneck. However, in a configuration with two TM 106 cores, the throughput may scale linearly beyond 12 cores; in this case, the UM 104 may continue to be the bottleneck of the system in the same way as in Experiment 1. It may be expected that machines may have hundreds of cores in the future. Even for such machines, the TM 106 may not become the bottleneck because at least 6 TMs 106 would fit on the experimental ALTERA FPGA board and the capacity of FPGA boards is currently growing at least at the same rate (if not faster) as the number of cores of CPUs.

In the architecture of FIG. 1, there are three potential bottlenecks that may possibly limit the throughput of the system: (a) the UM 104, (b) the interconnect between UM 104 and TM 106 (e.g., the PCIe bus), and (c) the TM 106. Experiments 1 and 2 indicated that CVTREE may scale linearly with the number of UM 104 and TM 106 cores. Adding additional PCIe bandwidth, however, may be more difficult in practice. However, with current hardware, the PCIe bus does not appear to provide a bottleneck.

Figure 18:
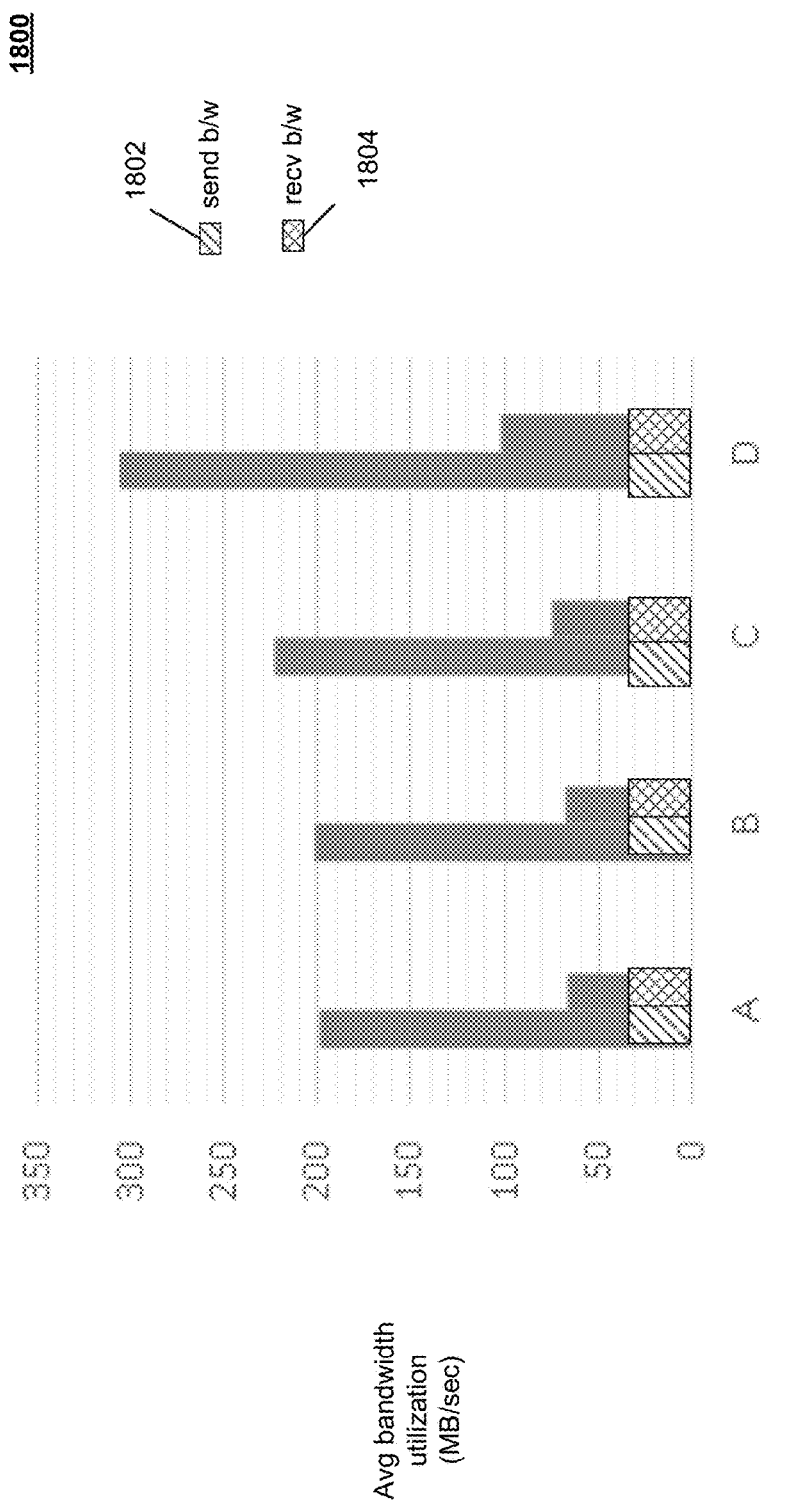
FIG. 18 illustrates example experimental results of PCIe utilization.

FIG. 18 illustrates the number of MB per second sent from the UM 104 to the TM 106 and received from UM 104 by the TM 106. For this experiment, 12 UM 104 cores and 1 TM 106 core were used, thereby achieving a maximum throughput and workload that may be sustained on a single machine with CVTREE. For higher throughputs, additional machines may be used, and the UM/TM traffic of those machines would not affect the PCIe bus utilization on this machine. Thus, FIG. 18 depicts a highest possible PCIe bus utilization on a single machine. As shown in FIG. 18, legend hash-marking indicators are used for indicating bars in FIG. 18 as representing experimental results for "send" bandwidth 1802 and "receive" bandwidth 1804.

FIG. 18 indicates that CVTREE does not consume more than 400 MB/sec of the PCIe bus bandwidth. For the experiments discussed herein, the benchmark machine had a PCIe Version in bus with close to 8 GBps bandwidth so that CVTREE utilized only 5% of the bandwidth of that machine. If other PCIe-hungry applications were run on the same machine, it may be unlikely that the PCIe bus would be saturated by CVTREE before other applications saturate it.

Experiments 1 to 3 indicated that CVTREE may scale advantageously in terms of throughput, and given the same amount of resources, may degrade the throughput by at most a factor of 2. The example latency of CVTREE (HW) is discussed below.

Figure 19:
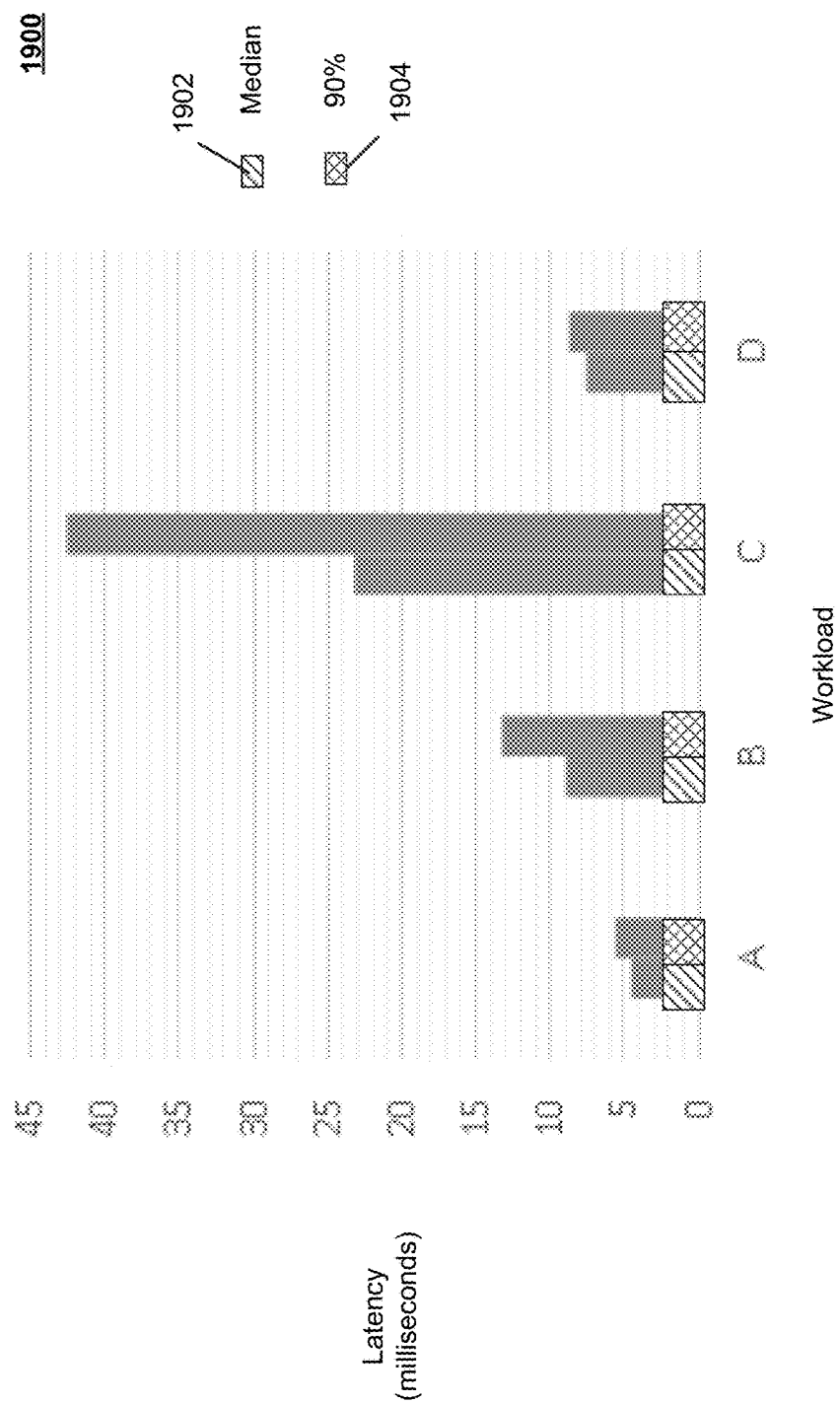
FIG. 19 illustrates example experimental results of latency.

FIG. 19 depicts example experimental results: in an example worst case, the latency of a read (or write) operation in CVTREE (HW) may go up to 50 milliseconds. In comparison, the latency of None may be only a few microseconds, or three orders of magnitude better. This result may indicate that while CVTREE may be an advantageous match for high-throughput applications, it may not be an advantageous match for latency-critical applications. However, if an application can tolerate 50-millisecond delays, then CVTREE may be acceptable.

This result may occur because operations carried out by CVTREE in order to support integrity may be on a critical path of a read or write operation. Thus, the client 110 may create a secure hash, the TM 106 may verify the secure hash, and UM/TM interaction via PCIe is also on the critical path. Example techniques discussed herein may achieve high throughput because they may achieve an advantageously high degree of concurrency between many concurrent operations that need to carry out these steps, but it may pay a price for these steps in terms of latency as these steps may be needed for the implementation of integrity. In other words, example techniques discussed herein may help to hide the overheads of integrity by executing the needed steps in parallel with other work, thereby achieving high throughputs. As shown in FIG. 19, legend hash-marking indicators are used for indicating bars in FIG. 19 as representing experimental results for "median" 1902 and "90%" 1904.

The design of CVTREE with its periodic verification may involve tradeoffs between performance and security. For example, the higher the verification rate, the lower the performance as more verification work is performed and the higher the security as the window of unsecurity is decreased. In this way, the verification may also control the amount of lost work after an integrity breach and until the system detects the breach.

Figure 20:
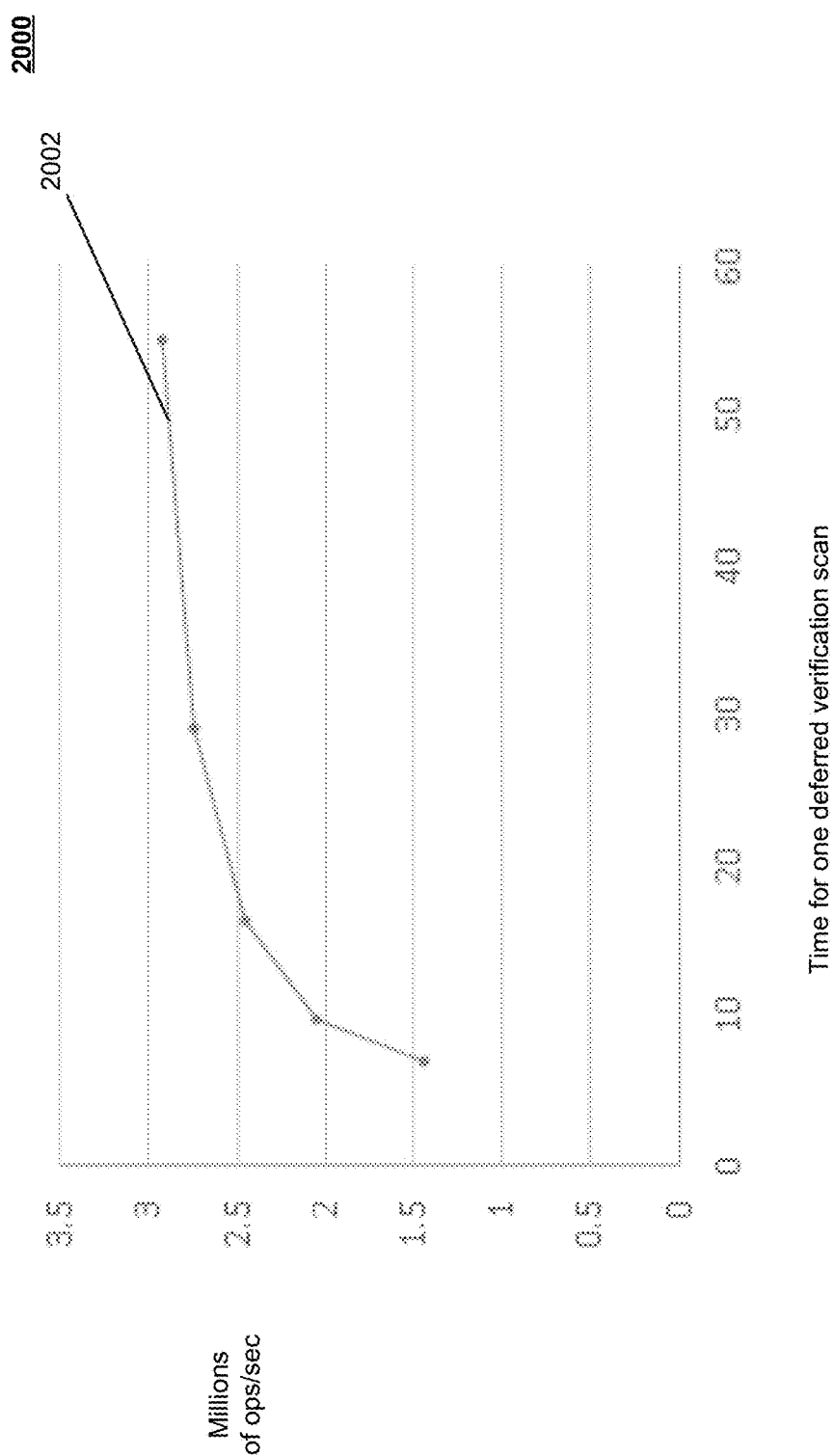
FIG. 20 illustrates example experimental results of throughput with deferred verification.

FIG. 20 illustrates this tradeoff, indicating, for example, that the throughput 2002 may degrade somewhat sharply for high frequency verifications. For example, a verification rate of 1 may correspond to roughly one verification every eight seconds. For example, a verification rate of 16 may correspond to roughly one verification every two minutes; at this point, CVTREE already performs advantageously and increasing the verification rate even further may result in marginal performance gains. Given that many current systems may not support any kind of integrity, and that integrity breaches may be somewhat rare, an example window of approximately two minutes may be advantageous for introducing integrity into mainstream, commodity systems.

In accordance with example techniques discussed herein, an example key-value store may provide integrity verification in addition to guarantees of atomicity and durability. As discussed herein, integrity checking may be incorporated at a less than 2× overhead over an example key-value store that may lack integrity. For example, results discussed herein may advantageously correspond to orders of magnitude performance improvement over conventional techniques (e.g., based on MERKLE trees). Example insights discussed herein may include (at least): (1) the use of deferred verification instead of online verification, (2) the use of a small amount of trusted code in a secure hardware in the server, and (3) reducing integrity checking to the problem of memory verification that may allow use of state-of-the-art lock-free index structures off-the-shelf. For example, techniques discussed herein may aid in development of high-performance tamper-resistant data management engines.

One skilled in the art of computing will understand that other instructions or operations may also be used to achieve this (or similar) functionality, without departing from the discussion herein.

III. Flowchart Description

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

Figure 21A:
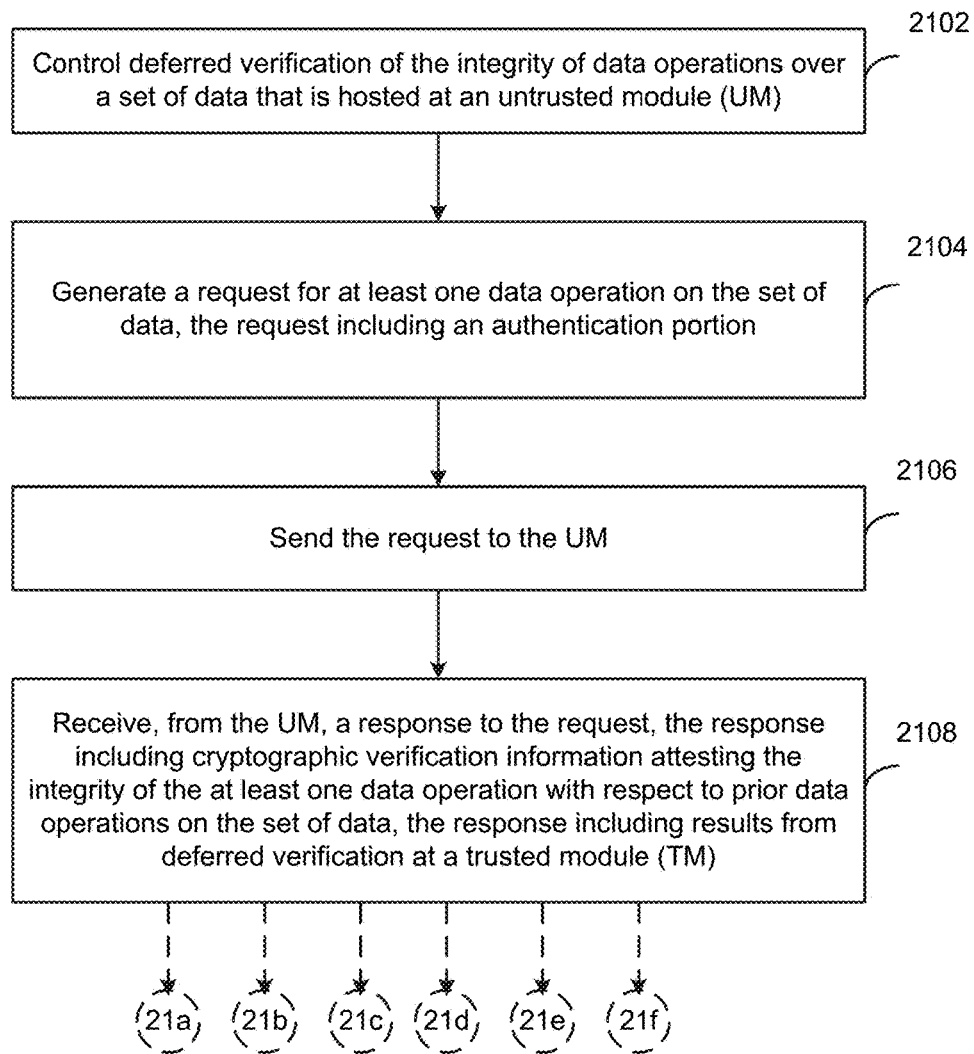
FIGS. 21A-21C are a flowchart illustrating example operations of the system of FIG. 11.
Figure 21B:
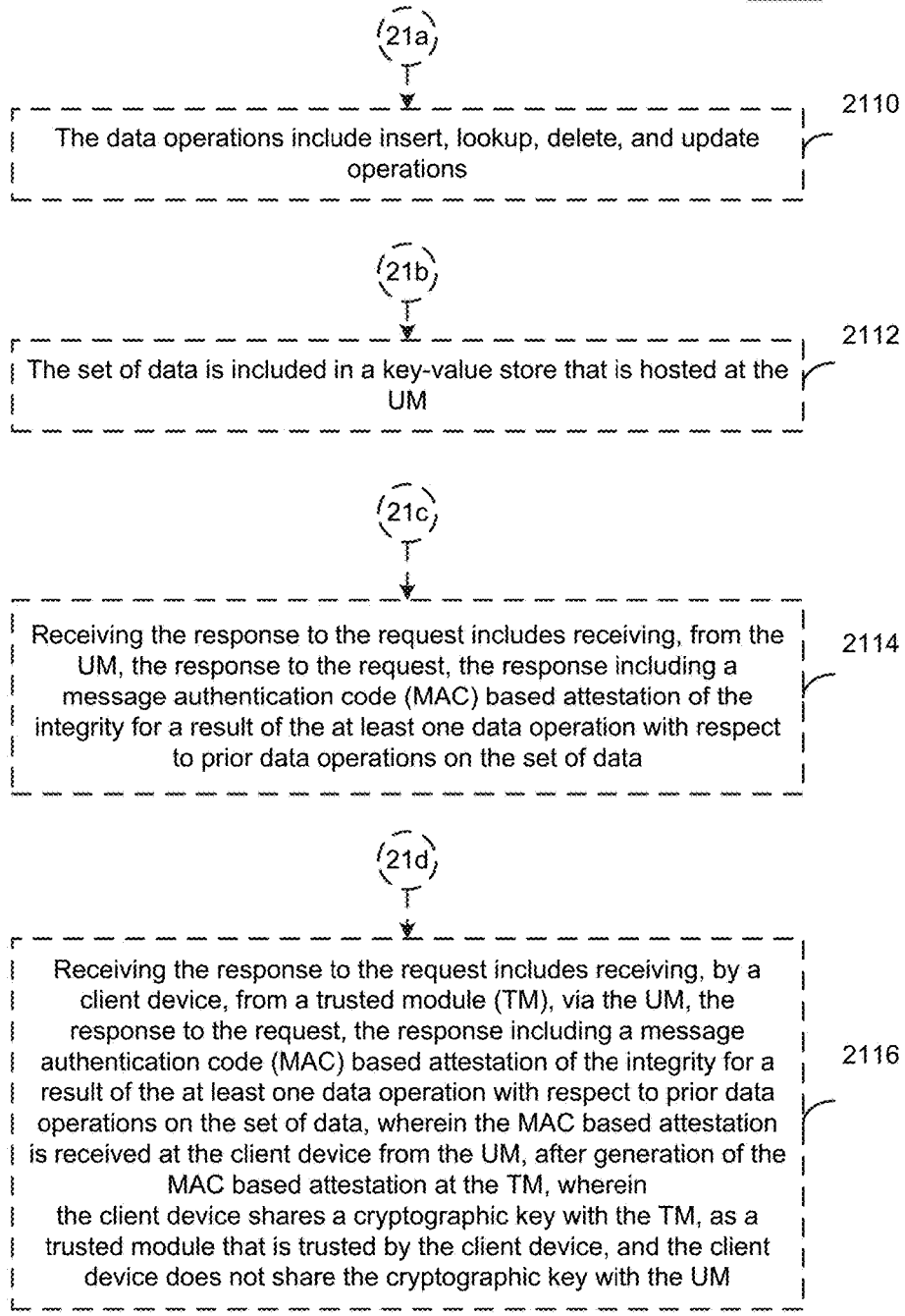
Figure 21C:
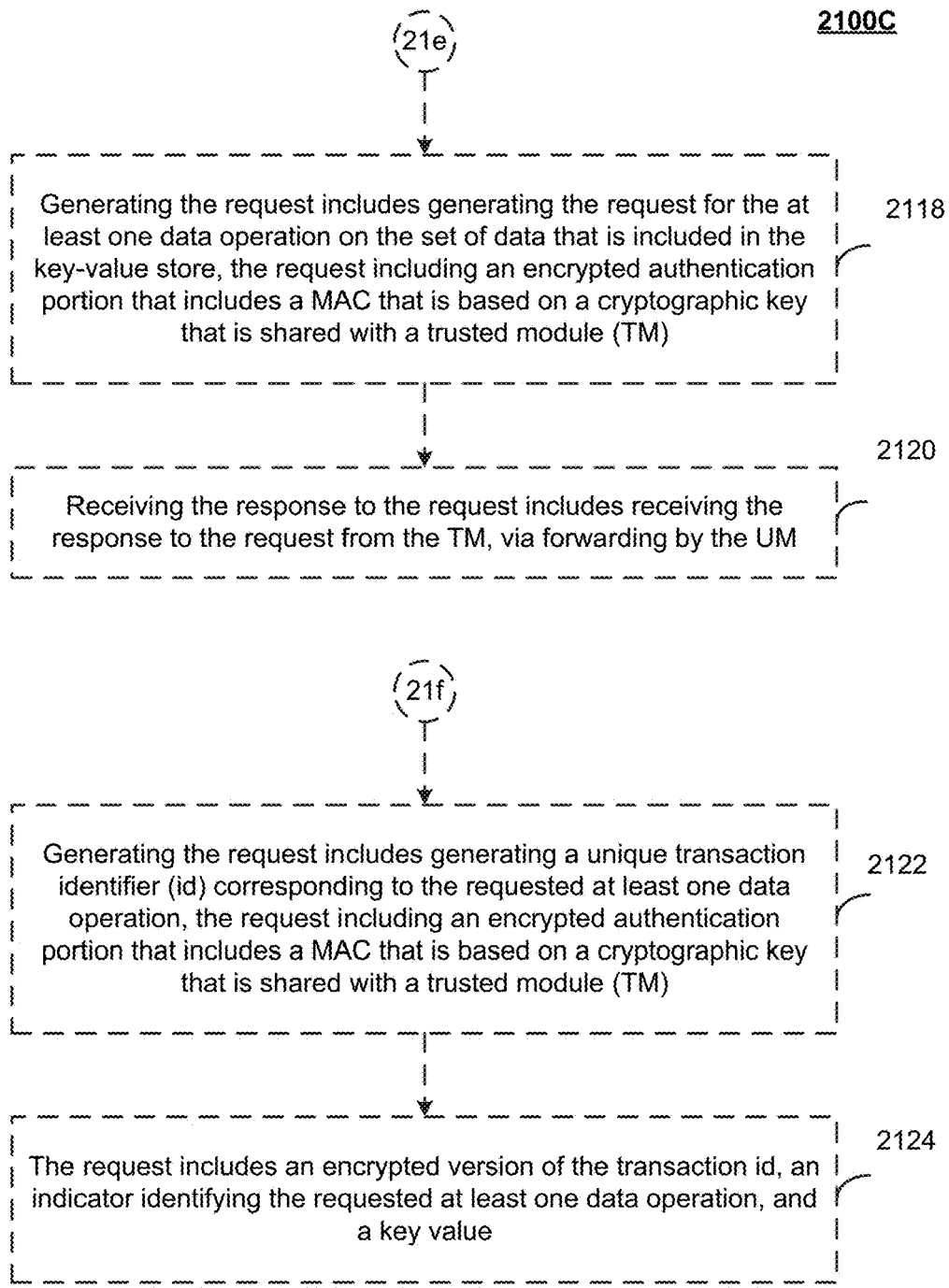

FIGS. 21A-21C are a flowchart illustrating example operations of the system of FIG. 11, according to example embodiments. As shown in the example of FIG. 21A, deferred verification of the integrity of data operations over a set of data that is hosted at an untrusted module (UM), is controlled (2102).

A request for at least one data operation on the set of data is generated, the request including an authentication portion (2104). For example, the client 110 may generate the request.

The request is sent to the UM (2106). For example, the client 110 may send the request to the UM 104 (e.g., for operations 114).

A response to the request is received from the UM, the response including cryptographic verification information attesting the integrity of the at least one data operation with respect to prior data operations on the set of data, the response including results from deferred verification at a trusted module (TM) (2108).

For example, the data operations may include insert, lookup, delete, and update operations (2110), in the example of FIG. 21B.

For example, the set of data may be included in a key-value store that is hosted at the UM (2112).

For example, receiving the response to the request may include receiving, from the UM, the response to the request, the response including a message authentication code (MAC) based attestation of the integrity for a result of the at least one data operation with respect to prior data operations on the set of data (2114).

For example, receiving the response to the request may include receiving, by a client device, from a trusted module (TM), via the UM, the response to the request, the response including a message authentication code (MAC) based attestation of the integrity for a result of the at least one data operation with respect to prior data operations on the set of data, wherein the MAC based attestation is received at the client device from the UM, after generation of the MAC based attestation at the TM, wherein the client device shares a cryptographic key with the TM, as a trusted module that is trusted by the client device, and the client device may not share the cryptographic key with the UM (2116).

For example, generating the request may include generating the request for the at least one data operation on the set of data that is included in the key-value store, the request including an encrypted authentication portion that includes a MAC that is based on a cryptographic key that is shared with a trusted module (TM) (2118), in the example of FIG. 21C.

For example, receiving the response to the request may include receiving the response to the request from the TM, via forwarding by the UM (2120).

For example, generating the request may include generating a unique transaction identifier (id) corresponding to the requested at least one data operation, the request including an encrypted authentication portion that includes a MAC that is based on a cryptographic key that is shared with a trusted module (TM) (2122).

For example, the request may include an encrypted version of the transaction id, an indicator identifying the requested at least one data operation, and a key value (2124).

Figure 22A:
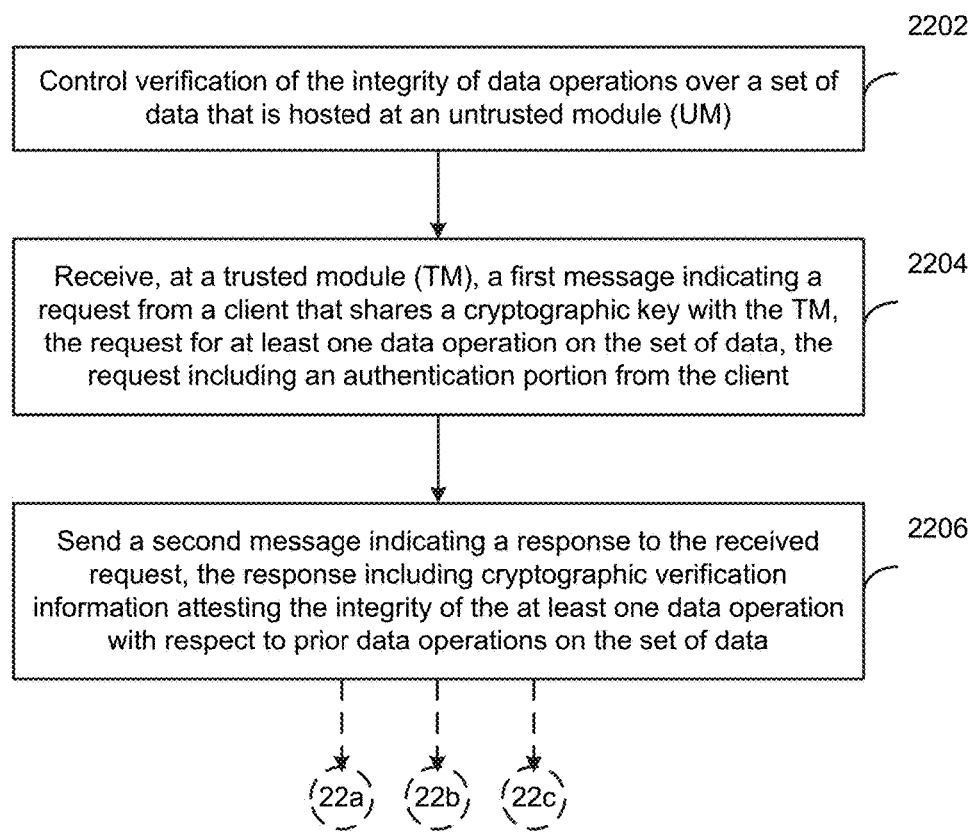
FIGS. 22A-22E are a flowchart illustrating example operations of the system of FIG.

FIGS. 22A-22E are a flowchart illustrating example operations of the system of FIG. 11, according to example embodiments. As shown in the example of FIG. 22A, verification of the integrity of data operations over a set of data that is hosted at an untrusted module (UM) may be controlled (2202).

A first message indicating a request from a client that shares a cryptographic key with the TM may be received at a trusted module (TM), the request for at least one data operation on the set of data, the request including an authentication portion from the client (2204). For example, the TM 106 may receive the first message indicating a request from the client 110.

A second message indicating a response to the received request may be sent, the response including cryptographic verification information attesting the integrity of the at least one data operation with respect to prior data operations on the set of data (2206).

Figure 22B:
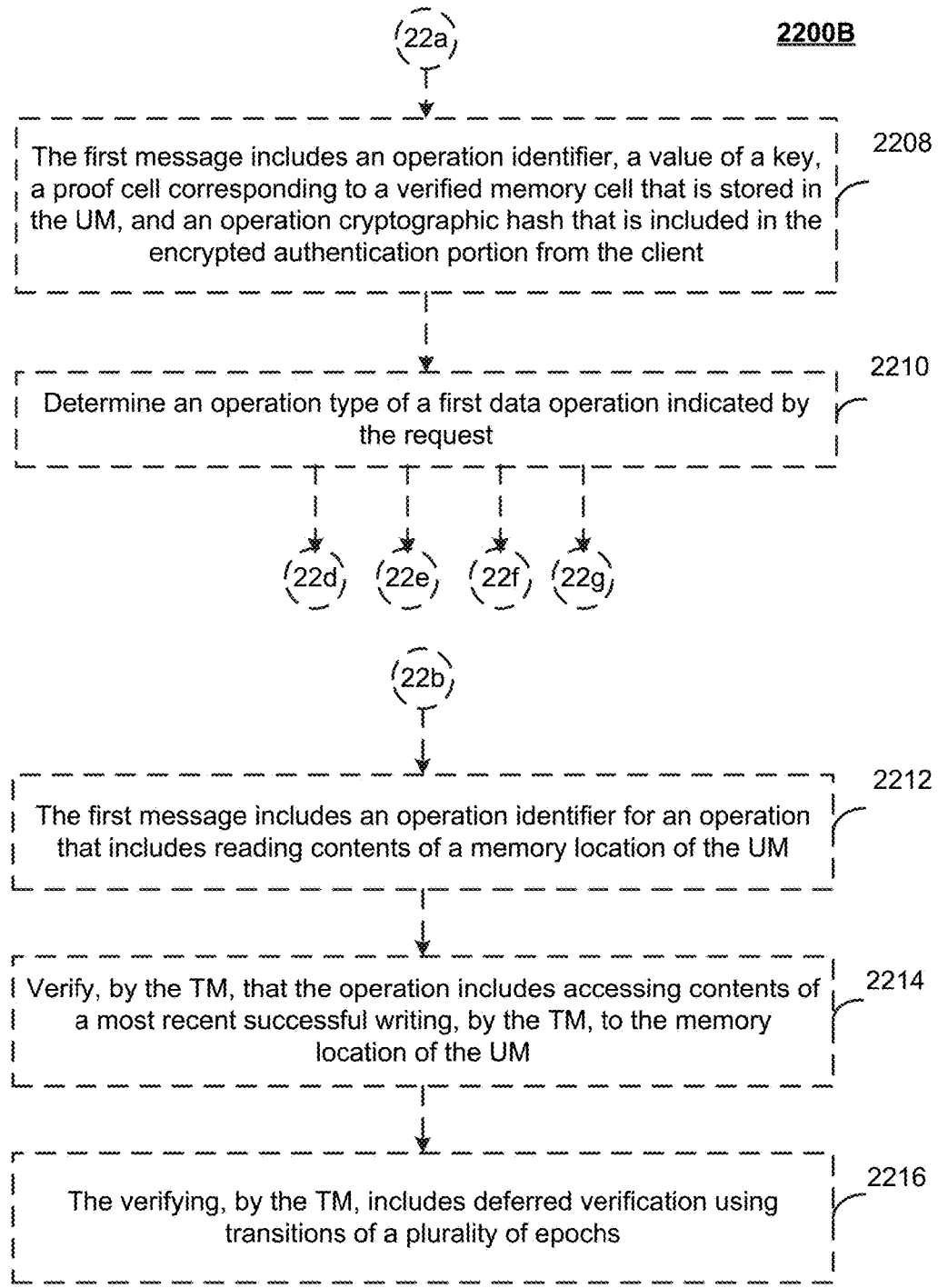

For example, the first message may include an operation identifier, a value of a key, a proof cell corresponding to a verified memory cell that is stored in the UM, and an operation cryptographic hash that is included in the encrypted authentication portion from the client (2208), in the example of FIG. 22B.

For example, an operation type of a first data operation indicated by the request may be determined (2210).

Figure 22C:
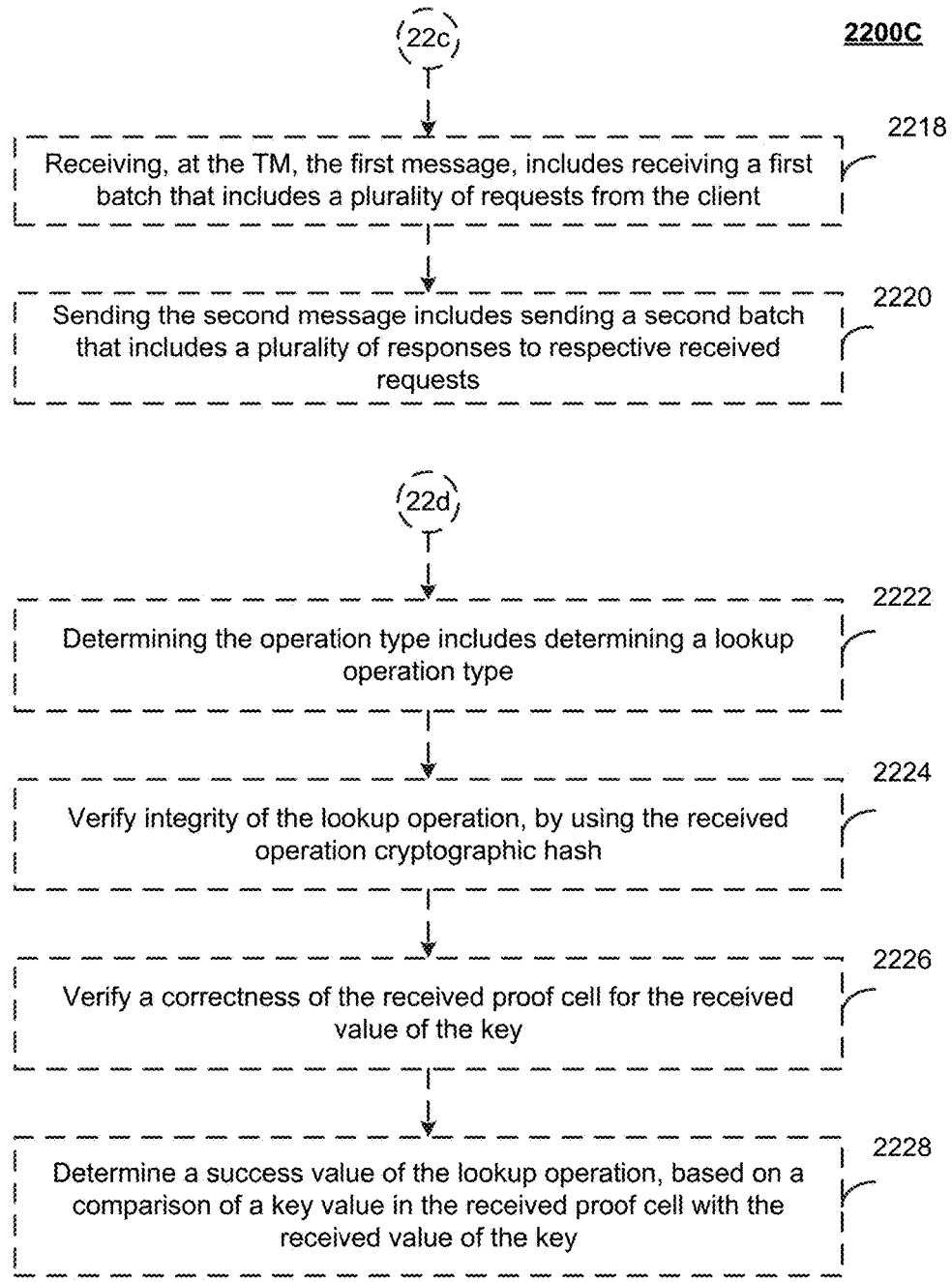

For example, determining the operation type may include determining a lookup operation type (2222), in the example of FIG. 22C.

For example, integrity of the lookup operation may be verified, by using the received operation cryptographic hash (2224).

For example, a correctness of the received proof cell for the received value of the key may be verified (2226).

For example, a success value of the lookup operation may be determined, based on a comparison of a key value in the received proof cell with the received value of the key (2228).

Figure 22D:
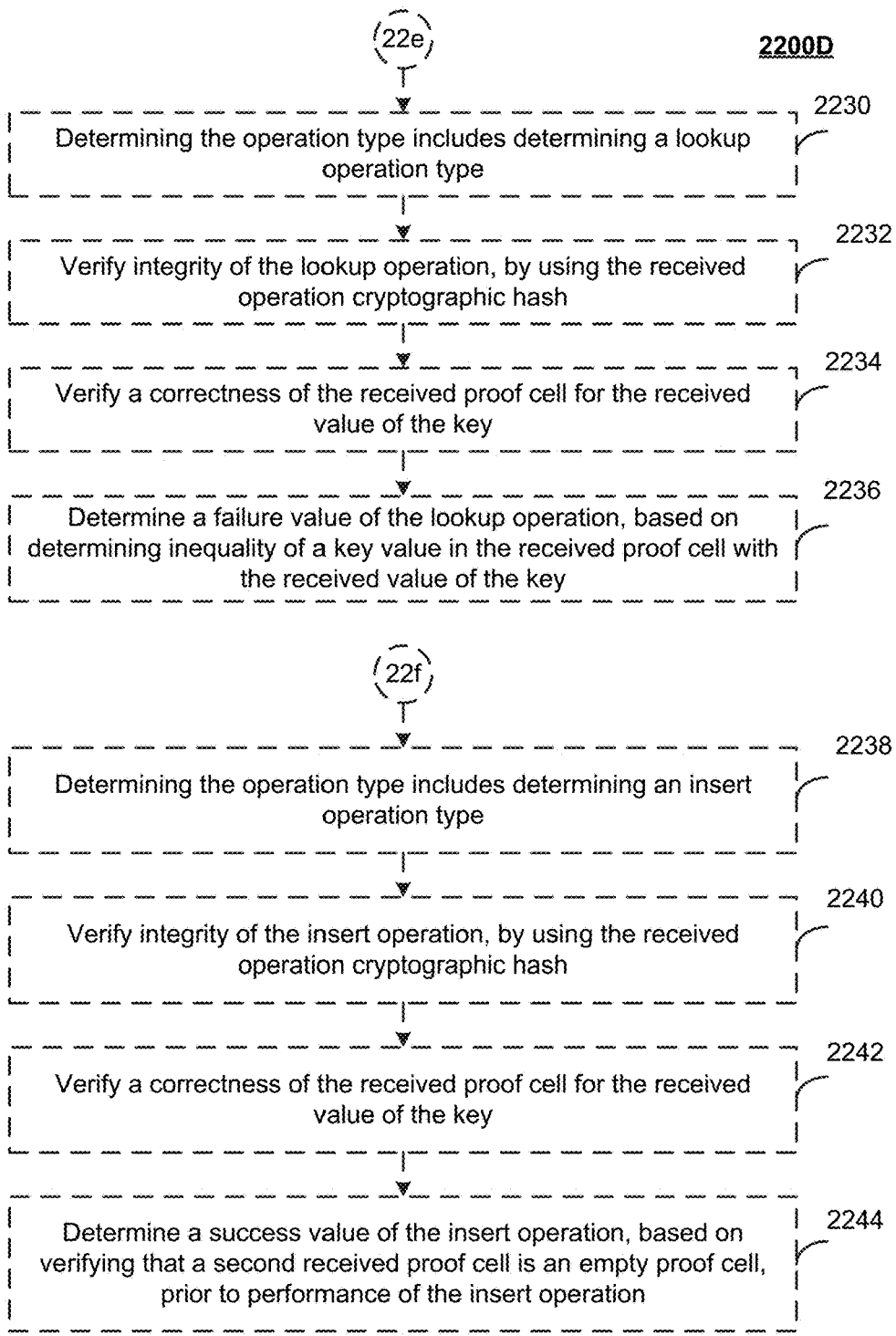

For example, determining the operation type may include determining a lookup operation type (2230), in the example of FIG. 22D.

For example, integrity of the lookup operation may be verified, by using the received operation cryptographic hash (2232).

For example, a correctness of the received proof cell for the received value of the key may be verified (2234).

For example, a failure value of the lookup operation may be determined, based on determining inequality of a key value in the received proof cell with the received value of the key (2236).

For example, determining the operation type may include determining an insert operation type (2238).

For example, integrity of the insert operation may be verified, by using the received operation cryptographic hash (2240).

For example, a correctness of the received proof cell for the received value of the key may be verified (2242).

For example, a success value of the insert operation may be determined, based on verifying that a second received proof cell is an empty proof cell, prior to performance of the insert operation (2244).

Figure 22E:
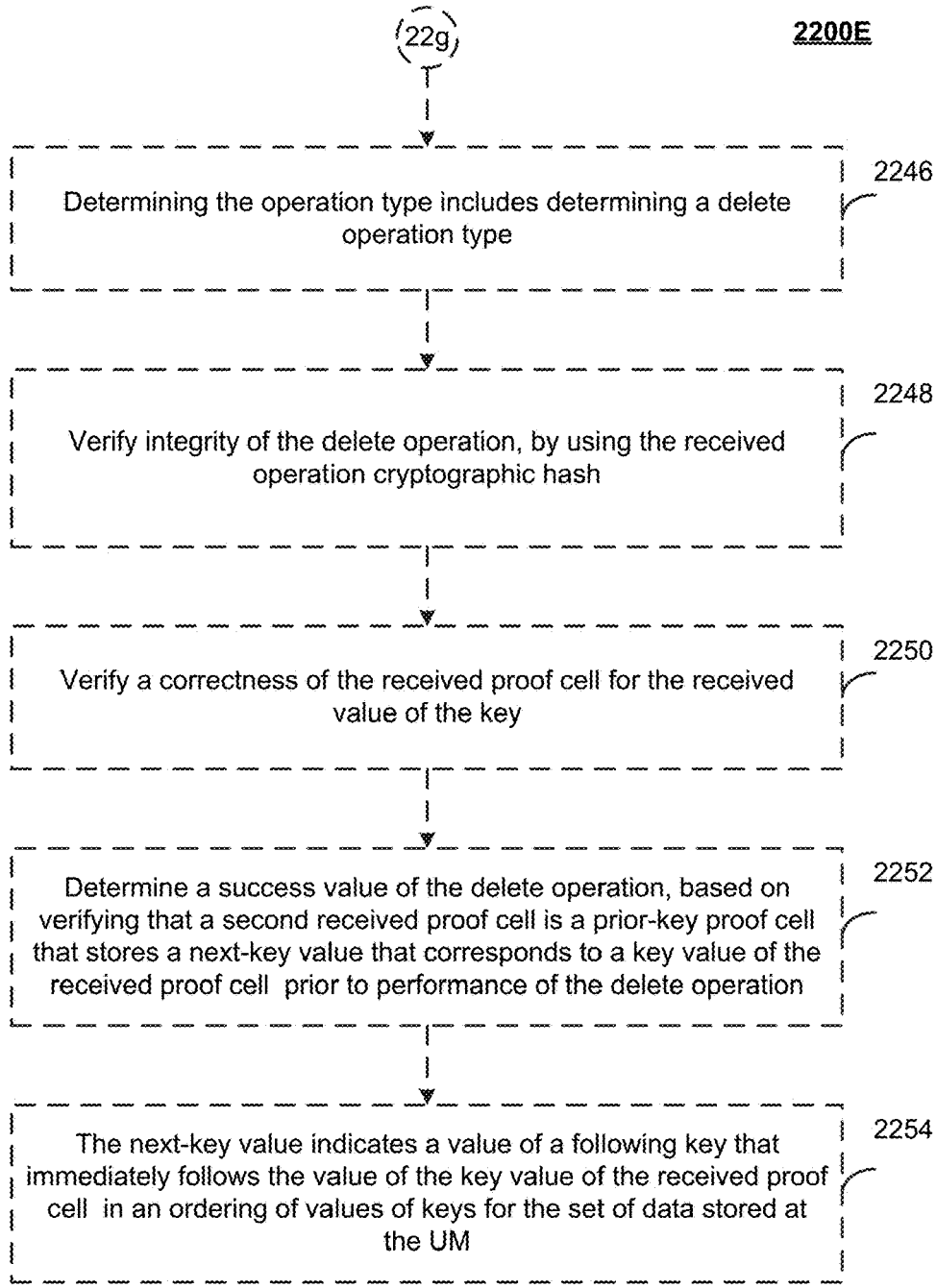

For example, determining the operation type may include determining a delete operation type (2246), in the example of FIG. 22E.

For example, integrity of the delete operation may be verified, by using the received operation cryptographic hash (2248).

For example, a correctness of the received proof cell for the received value of the key may be verified (2250).

For example, a success value of the delete operation may be determined, based on verifying that a second received proof cell is a prior-key proof cell that stores a next-key value that corresponds to a key value of the received proof cell prior to performance of the delete operation (2252).

For example, the next-key value indicates a value of a following key that immediately follows the value of the key value of the received proof cell in an ordering of values of keys for the set of data stored at the UM (2254).

For example, the first message may include an operation identifier for an operation that includes reading contents of a memory location of the UM (2212), in the example of FIG. 22B.

For example, it may be verified, by the TM, that the operation includes accessing contents of a most recent successful writing, by the TM, to the memory location of the UM (2214).

For example, the verifying, by the TM, may include deferred verification using transitions of a plurality of epochs (2216).

For example, receiving, at the TM, the first message, may include receiving a first batch that includes a plurality of requests from the client (2218), in the example of FIG. 22C.

For example, sending the second message may include sending a second batch that includes a plurality of responses to respective received requests (2220).

Figure 23A:
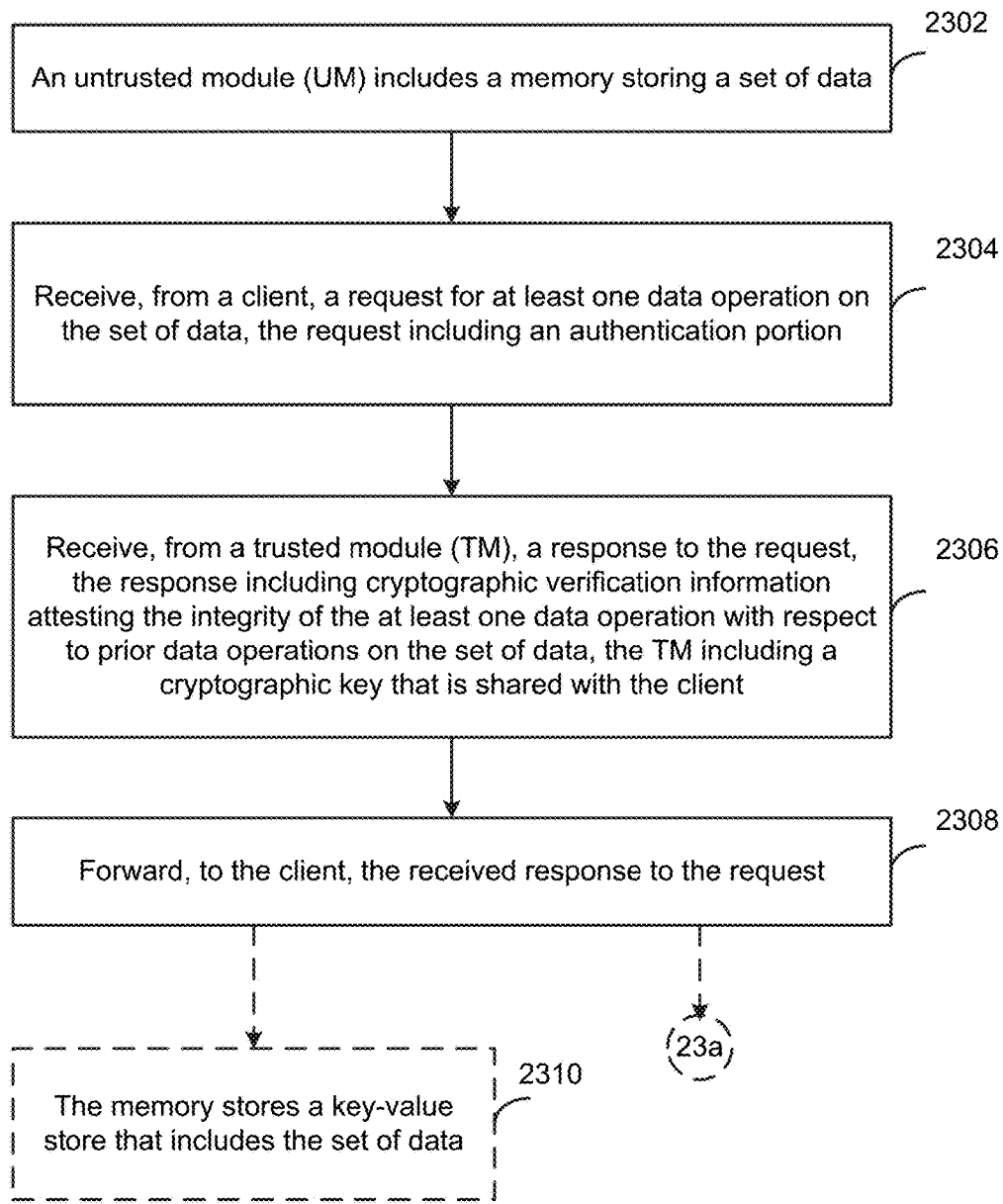
FIGS. 23A-23C are a flowchart illustrating example operations of the system of FIG. 11.
Figure 23B:
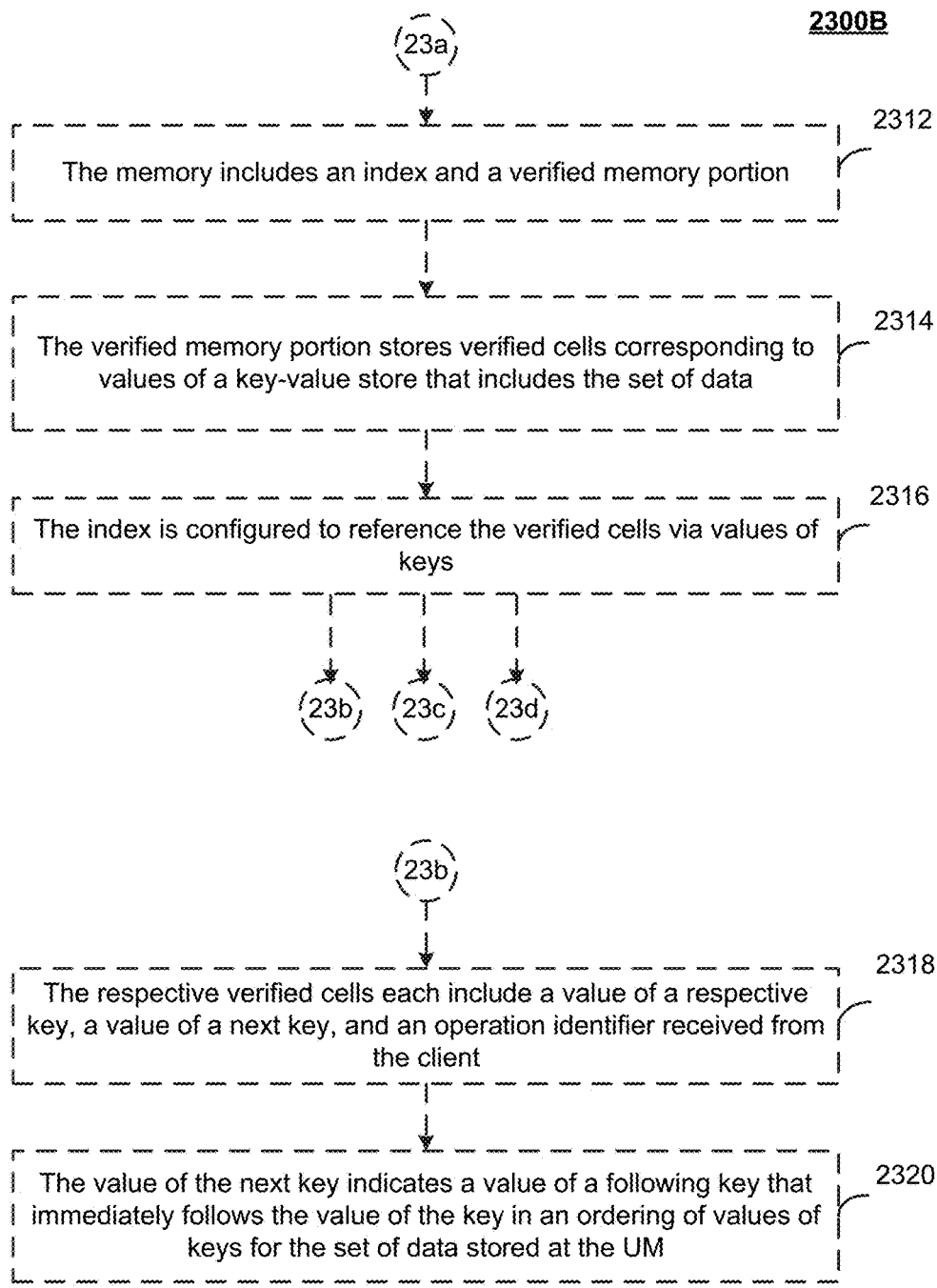
Figure 23C:
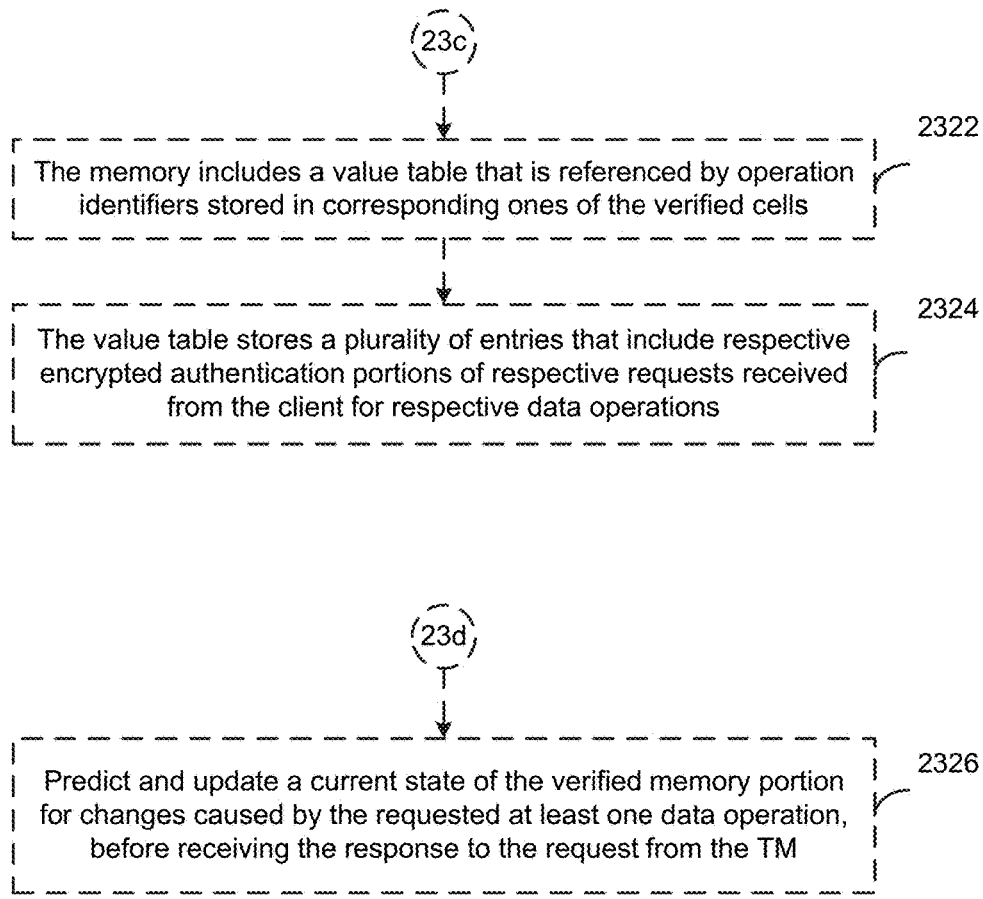

FIGS. 23A-23C are a flowchart illustrating example operations of the system of FIG. 11, according to example embodiments. As shown in the example of FIG. 23A, an untrusted module (UM) includes a memory storing a set of data (2302).

A request for at least one data operation on the set of data may be received from a client, the request including an authentication portion (2304). For example, the UM 104 may receive the request for operations 114 from the client 110.

A response to the request may be received from a trusted module (TM), the response including cryptographic verification information attesting the integrity of the at least one data operation with respect to prior data operations on the set of data, the TM including a cryptographic key that is shared with the client (2306).

The received response to the request may be forwarded to the client (2308).

For example, the memory may store a key-value store that includes the set of data (2310).

For example, the memory may include an index and a verified memory portion (2312), in the example of FIG. 23B.

For example, the verified memory portion may store verified cells corresponding to values of a key-value store that includes the set of data (2314).

For example, the index may be configured to reference the verified cells via values of keys (2316).

For example, the respective verified cells may each include a value of a respective key, a value of a next key, and an operation identifier received from the client (2318).

For example, the value of the next key may indicate a value of a following key that immediately follows the value of the key in an ordering of values of keys for the set of data stored at the UM (2320).

For example, the memory may include a value table that is referenced by operation identifiers stored in corresponding ones of the verified cells (2322), in the example of FIG. 23C.

For example, the value table may store a plurality of entries that include respective encrypted authentication portions of respective requests received from the client for respective data operations (2324).

For example, the UM may predict and update a current state of the verified memory portion for changes caused by the requested at least one data operation, before receiving the response to the request from the TM (2326).

One skilled in the art of computing will appreciate that many other types of techniques may be used for controlling verification of integrity of operations on data, without departing from the discussion herein.

Features discussed herein are provided as example techniques that may be implemented in many different ways that may be understood by one of skill in the art of computing, without departing from the discussion herein. Such features are to be construed only as example features, and are not intended to be construed as limiting to only those detailed descriptions.

In this context, a "processor" may include a single processor or multiple processors configured to process instructions associated with a computing system. A processor may thus include one or more processors executing instructions in parallel and/or in a distributed manner.

For example, the system 1100 may include one or more processors. For example, the system 1100 may include at least one tangible computer-readable storage medium (e.g., an article of manufacture) storing instructions executable by the one or more processors, the executable instructions configured to cause at least one processor to perform operations associated with various example components included in the system 1100, as discussed herein. For example, the one or more processors may be included in at least one processing apparatus. One skilled in the art of computing will understand that there are many configurations of processors and processing apparatuses that may be configured in accordance with the discussion herein, without departing from such discussion.

In this context, a "component" or "module" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components). For example, a "component" herein may refer to a type of functionality that may be implemented by instructions that may be located in a single entity, or may be spread or distributed over multiple entities, and may overlap with instructions and/or hardware associated with other components.

In this context, a "memory" may include a single memory device or multiple memory devices configured to store data and/or instructions. Further, the memory may span multiple distributed storage devices. Further, the memory may be distributed among a plurality of processors.

One skilled in the art of computing will understand that there may be many ways of accomplishing the features discussed herein.

Customer privacy and confidentiality have been ongoing considerations in computing environments for many years. Thus, example techniques for maintaining a database and/or key-value store may use user input and/or data provided by users who have provided permission via one or more subscription agreements (e.g., "Terms of Service" (TOS) agreements) with associated applications or services associated with such techniques. For example, users may provide consent to have their input/data transmitted and stored on devices, though it may be explicitly indicated (e.g., via a user accepted agreement) that each party may control how transmission and/or storage occurs, and what level or duration of storage may be maintained, if any. Further, identifiers that may be used to identify devices used by a user may be obfuscated, e.g., by hashing actual user information. It is to be understood that any user input/data may be obtained in accordance with the privacy laws and regulations of any relevant jurisdiction.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in signals (e.g., a pure signal such as a pure propagated signal). Such implementations will be referred to herein as implemented via a "computer-readable transmission medium," which does not qualify herein as a "computer-readable storage medium" or a "computer-readable storage device" as discussed below.

Alternatively, implementations may be implemented via a machine usable or machine readable storage device (e.g., a magnetic or digital medium such as a Universal Serial Bus (USB) storage device, a tape, hard disk drive, compact disk (CD), digital video disk (DVD), etc.), storing executable instructions (e.g., a computer program), for execution by, or to control the operation of, a computing apparatus (e.g., a data processing apparatus), e.g., a programmable processor, a special-purpose processor or device, a computer, or multiple computers. Such implementations may be referred to herein as implemented via a "computer-readable storage medium" or a "computer-readable storage device" and are thus different from implementations that are purely signals such as pure propagated signals (and thus do not qualify herein as a "computer-readable transmission medium" as discussed above). Thus, as used herein, a reference to a "computer-readable storage medium" or a "computer-readable storage device" specifically excludes reference to media and devices that are signals (e.g., propagated signals) per se.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback.

For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:
1. A client system comprising:
at least one hardware device processor; and
a memory storing a client secure key value, and storing executable instructions that, when executed, cause the at least one hardware device processor to:

control deferred verification of the integrity of data operations over a set of data that is hosted at a server having an untrusted module and a trusted module having secure hardware, the deferred verification being controlled by:
  generating a request for at least one data operation on the set of data, the request including an authentication portion generated using the client secure key value;
  sending the request from the client system to the server; and
  receiving, by the client system from the server, a response to the request, the response including cryptographic verification information attesting to the integrity of the at least one data operation with respect to multiple prior data operations on the set of data, the response including results from deferred verification generated by the secure hardware of the trusted module of the server,
  wherein the deferred verification by the secure hardware involves separate verification of multiple verification epochs, and at least one of the verification epochs includes two or more operations that are concurrently verified by the secure hardware of the trusted module.

2. The client system of claim 1, wherein:
the data operations include insert, lookup, delete, and update operations.

3. The client system of claim 1, wherein:
the set of data is included in a key-value store that is hosted at the untrusted module of the server.

4. The client system of claim 1, wherein the response to the request is received from the untrusted module of the server and the response to the request includes a message authentication code-based attestation of the integrity for a result of the at least one data operation with respect to the multiple prior data operations on the set of data.

5. The client system of claim 1, wherein:
generating the request comprises including, in the request, a message authentication code that is based at least on the client secure key value, the client secure key value being a cryptographic key that is shared with the trusted module of the server, and
receiving the response to the request includes receiving the response to the request from the trusted module of the server, via forwarding by the untrusted module of the server.

6. The client system of claim 1, wherein:
generating the request includes generating a unique transaction identifier corresponding to the at least one data operation, the request including an encrypted authentication portion that includes a message authentication code that is based at least on the client secure key value, the client secure key value being a cryptographic key that is shared with the trusted module of the server,
wherein the request includes an encrypted version of:
  the unique transaction identifier, and
  an indicator identifying the at least one data operation.

7. The client system of claim 1, wherein the executable instructions, when executed, cause the at least one hardware device processor to:
  in an instance when the response indicates the deferred verification has failed, resort to a previously-verified backup of the set of data.

8. A method performed by a trusted module of a computing device, the method comprising:
  controlling deferred verification of the integrity of data operations over a set of data that is hosted at an untrusted module by:
    receiving, at the trusted module, a first message indicating a request from a client that shares a cryptographic key with the trusted module, the request being for at least one data operation on the set of data;
    performing deferred verification of the at least one data operation with respect to multiple prior data operations by designating verification epochs and separately verifying the verification epochs, wherein at least one of the verification epochs includes multiple operations that are concurrently verified by secure hardware of the trusted module; and
    sending a second message from the trusted module in response to the request from the client, the response including cryptographic verification information generated by the trusted module using the cryptographic key, the cryptographic verification information attesting to the integrity of the at least one data operation with respect to the multiple prior data operations on the set of data.

9. The method of claim 8, wherein:
the first message includes a received operation identifier, a received value of a key, a received proof cell corresponding to a verified memory cell that is stored in the untrusted module, and a received operation cryptographic hash that is included in an authentication portion of the first message received from the client,
wherein the method includes:
  determining an operation type of a first data operation indicated by the request.

10. The method of claim 9, wherein the operation type is a lookup operation,
wherein the method includes:
  verifying integrity of the lookup operation, by using the received operation cryptographic hash;
  verifying a correctness of the received proof cell for the received value of the key; and
  determining a success value of the lookup operation, based at least on a comparison of a key value in the received proof cell with the received value of the key.

11. The method of claim 9, wherein the operation type is a lookup operation,
wherein the method includes:
  verifying integrity of the lookup operation, by using the received operation cryptographic hash;
  verifying a correctness of the received proof cell for the received value of the key; and
  determining a failure value of the lookup operation, based at least on determining inequality of a key value in the received proof cell with the received value of the key.

12. The method of claim 9, wherein the operation type is an insert operation,
wherein the method includes:
  verifying integrity of the insert operation, by using the received operation cryptographic hash;
  verifying a correctness of the received proof cell for the received value of the key; and
  determining a success value of the insert operation, based at least on verifying that a second received proof cell is an empty proof cell, prior to performance of the insert operation.

13. The method of claim 9, wherein the operation type is a delete operation,
wherein the method includes:
verifying integrity of the delete operation, by using the received operation cryptographic hash;
verifying a correctness of the received proof cell for the received value of the key; and
determining a success value of the delete operation, based at least on verifying that a second received proof cell is a prior-key proof cell that stores a next-key value that corresponds to a key value of the received proof cell prior to performance of the delete operation,
wherein the next-key value indicates a value of a following key that immediately follows the value of the key value of the received proof cell in an ordering of values of keys for the set of data stored at the untrusted module.

14. The method of claim 8, wherein:
the first message includes an operation identifier for an operation that includes reading contents of a memory location of the untrusted module,
wherein the method includes:
verifying, by the trusted module, that the operation includes accessing contents of a most recent successful write, the most recent successful write being performed by the trusted module to the memory location of the untrusted module.

15. The method of claim 8, wherein:
receiving the first message includes receiving a first batch that includes a plurality of requests from the client; and
sending the second message includes sending a second batch that includes a plurality of responses to respective received requests.

16. A server comprising:
a trusted module comprising secure hardware;
at least one hardware device processor; and
an untrusted module that includes a memory storing executable instructions that, when executed, cause the at least one hardware device processor to:
receive, at the untrusted module of the server from a client, a request for at least one data operation on a set of data, the request including an authentication portion;
receive, at the untrusted module of the server from the trusted module, a response to the request, the response including cryptographic verification information generated by the trusted module using a cryptographic key, the cryptographic verification information attesting to the integrity of the at least one data operation with respect to deferred verification of multiple prior data operations on the set of data performed by the trusted module; and
forward, from the untrusted module of the server to the client, the received response to the request,
wherein the secure hardware of the trusted module is configured to perform the deferred verification by designating verification epochs and separately verifying the verification epochs, and at least one of the verification epochs includes two or more operations that are concurrently verified by the secure hardware of the trusted module.

17. The server of claim 16, wherein:
the memory includes an index and a verified memory portion,
the verified memory portion stores verified cells corresponding to values of a key-value store that includes the set of data, and
the index is configured to reference the verified cells via values of keys.

18. The server of claim 17, wherein:
the respective verified cells each include a value of a respective key, a value of a next key, and an operation identifier received from the client, and
the value of the next key indicates a value of a following key that immediately follows the value of the respective key in an ordering of values of keys for the set of data stored at the untrusted module of the server.

19. The server of claim 17, wherein:
the memory includes a value table that is referenced by operation identifiers stored in corresponding ones of the verified cells, and
the value table stores a plurality of entries that include respective encrypted authentication portions of respective requests received from the client for respective data operations.

20. The server of claim 17, wherein the executable instructions, when executed, cause the at least one hardware device processor to:
predict and update a current state of the verified memory portion for changes caused by the at least one data operation, before receiving the response to the request from the trusted module of the server.

21. The server of claim 16, the secure hardware comprising a field-programmable gate array.

* * * * *